US012665474B2

(12) United States Patent
Pennington, III et al.

(10) Patent No.: US 12,665,474 B2
(45) Date of Patent: Jun. 23, 2026

(54) WIRELESSLY TRANSFERRING POWER WITHIN AN ELECTRIC MACHINE WITH ACTIVELY RECTIFIED ROTOR WINDINGS

(71) Applicant: Tau Motors, Inc., Redwood City, CA (US)

(72) Inventors: Walter Wesley Pennington, III, Portola Valley, CA (US); Ethan Bagget Swint, Redwood City, CA (US); Gregory Gordon Stevenson, San Carlos, CA (US); Michael Parker Owen, St. Augustine, FL (US); Anthony Da Costa, Los Altos, CA (US); Matthew J. Rubin, Indianapolis, IN (US); Matthias Preindl, New York, NY (US)

(73) Assignee: TAU MOTORS, INC., San Carlos, CA (US)

( * ) Notice: Subject to any disclaimer, the term of this patent is extended or adjusted under 35 U.S.C. 154(b) by 197 days.

(21) Appl. No.: 18/279,365

(22) PCT Filed: Mar. 4, 2022

(86) PCT No.: PCT/US2022/019040
§ 371 (c)(1),
(2) Date: Aug. 29, 2023

(87) PCT Pub. No.: WO2022/187714
PCT Pub. Date: Sep. 9, 2022

(65) Prior Publication Data
US 2024/0195269 A1      Jun. 13, 2024

Related U.S. Application Data

(60) Provisional application No. 63/157,560, filed on Mar. 5, 2021.

(51) Int. Cl.
H02K 11/33 (2016.01)
H02J 50/10 (2016.01)
(Continued)

(52) U.S. Cl.
CPC .............. H02K 11/33 (2016.01); H02J 50/10 (2016.02); H02K 1/16 (2013.01); H02K 3/28 (2013.01); H02K 11/05 (2016.01)

(58) Field of Classification Search
CPC . H02K 11/33; H02K 1/16; H02K 3/28; H02K 11/05; H02K 11/0094;
(Continued)

(56) References Cited

U.S. PATENT DOCUMENTS

| | | | |
|---|---|---|---|
| 2,711,502 A | 6/1955 | Alexanderson | |
| 2,803,757 A | 8/1957 | McFarland | |

(Continued)

FOREIGN PATENT DOCUMENTS

| | | | |
|---|---|---|---|
| EP | 0140041 B1 | 3/1988 | |
| EP | 0697759 B1 | 3/2000 | |

(Continued)

OTHER PUBLICATIONS

International Search Report and Written Opinion issued in corresponding PCT Application No. US2022/019040, issued Aug. 11, 2022.

*Primary Examiner* — Tulsidas C Patel
*Assistant Examiner* — Mohammed Ahmed Qureshi
(74) *Attorney, Agent, or Firm* — Quarles & Brady, LLP

(57) ABSTRACT

A stator defines multiple stator poles with associated stator windings. A rotor defines multiple rotor poles with associated rotor windings configured to be energized substantially by the stator. The rotor defines a rotor field energizable by magnetic fields produced by the stator windings to produce relative force between the rotor and the stator. An active (Continued)

rectifier is conductively coupled to one or more first rotor windings. The active rectifier is configured to control a direction of current flow through the one or more first rotor windings responsive to a signal received wirelessly from the stator by one or more second rotor windings.

55 Claims, 32 Drawing Sheets

(51) Int. Cl.

| | |
|---|---|
| *H02K 1/16* | (2006.01) |
| *H02K 3/28* | (2006.01) |
| *H02K 11/05* | (2016.01) |

(58) Field of Classification Search

CPC ...... H02K 11/042; H02K 19/12; H02K 19/26; H02K 21/042; H02K 1/223; H02K 1/26; H02J 50/10; H02P 9/302; H02P 25/03; F03D 9/25

See application file for complete search history.

(56) References Cited

U.S. PATENT DOCUMENTS

| | | | |
|---|---|---|---|
| 2,995,696 | A | 8/1961 | Stratton et al. |
| 3,335,348 | A | 8/1967 | Gossel |
| 3,818,294 | A | 6/1974 | Glukhov |
| 3,891,905 | A | 6/1975 | Muller |
| 4,025,960 | A | 5/1977 | Gray et al. |
| 4,078,189 | A | 3/1978 | Nash et al. |
| 4,078,190 | A | 3/1978 | Nash |
| 4,366,428 | A | 12/1982 | Bai |
| 4,460,860 | A | 7/1984 | Schwesig et al. |
| 4,492,999 | A | 1/1985 | Amagasa |
| 4,724,347 | A | 2/1988 | Reinhardt et al. |
| 4,857,784 | A | 8/1989 | Mukaekubo |
| 4,954,759 | A | 9/1990 | Fey |
| 5,200,661 | A | 4/1993 | Shramo et al. |
| 5,223,759 | A | 6/1993 | Shimoda et al. |
| 5,225,712 | A | 7/1993 | Erdman |
| 5,252,873 | A | 10/1993 | Hamamoto et al. |
| 5,337,374 | A | 8/1994 | Konishikawa |
| 5,459,385 | A | 10/1995 | Lipo et al. |
| 5,688,028 | A | 11/1997 | Kohno et al. |
| 5,770,900 | A | 6/1998 | Sato et al. |
| 5,932,942 | A | 8/1999 | Patyk et al. |
| 5,939,807 | A | 8/1999 | Patyk et al. |
| 5,973,426 | A | 10/1999 | Fujinaka et al. |
| 5,977,670 | A | 11/1999 | Numaya et al. |
| 5,986,370 | A | 11/1999 | Cheng |
| 6,081,056 | A | 6/2000 | Takagi et al. |
| 6,310,455 | B1 | 10/2001 | Siraky et al. |
| 6,445,099 | B1 | 9/2002 | Roseman |
| 6,515,399 | B1 | 2/2003 | Lauf et al. |
| 6,566,775 | B1 | 5/2003 | Fradella |
| 6,794,777 | B1 | 9/2004 | Fradella |
| 6,864,648 | B1 | 3/2005 | Stedman |
| 6,909,212 | B2 | 6/2005 | Uchiyama |
| 6,911,755 | B2 | 6/2005 | Lee et al. |
| 6,969,933 | B2 | 11/2005 | Mao et al. |
| 6,998,743 | B2 | 2/2006 | Fujii et al. |
| 6,998,813 | B2 | 2/2006 | Heizmann et al. |
| 7,034,498 | B2 | 4/2006 | Kerlin |
| 7,038,338 | B2 | 5/2006 | Sesselmann et al. |
| 7,151,359 | B2 | 12/2006 | Randall et al. |
| 7,193,343 | B2 | 3/2007 | Tsuge et al. |
| 7,222,409 | B2 | 5/2007 | Yoshida et al. |
| 7,248,008 | B1 | 7/2007 | Cummins |
| 7,294,944 | B2 | 11/2007 | Fujii |
| 7,492,070 | B2 | 2/2009 | Chen et al. |
| 7,498,701 | B2 | 3/2009 | Kikuchi et al. |
| 7,579,702 | B2 | 8/2009 | Park et al. |
| 7,592,712 | B2 | 9/2009 | Perlo et al. |
| 7,638,911 | B2 | 12/2009 | Lee |
| 7,675,206 | B2 | 3/2010 | Akutsu et al. |
| 7,719,147 | B2 | 5/2010 | Palmer, Jr. et al. |
| 8,102,138 | B2 | 1/2012 | Sekine et al. |
| 8,148,860 | B2 | 4/2012 | Wong et al. |
| 8,183,727 | B2 | 5/2012 | Fee et al. |
| 8,207,639 | B2 | 6/2012 | Horng |
| 8,247,937 | B2 | 8/2012 | Minato et al. |
| 8,304,942 | B2 | 11/2012 | Yamasaki et al. |
| 8,304,944 | B2 | 11/2012 | Sonoda et al. |
| 8,310,119 | B2 | 11/2012 | Uryu et al. |
| 8,310,121 | B2 | 11/2012 | Fujita et al. |
| 8,338,998 | B2 | 12/2012 | Yamasaki et al. |
| 8,378,540 | B2 | 2/2013 | Furukawa et al. |
| 8,456,049 | B2 | 6/2013 | Matsuda et al. |
| 8,497,611 | B2 | 7/2013 | Leung et al. |
| 8,508,179 | B2 | 8/2013 | Schmidt et al. |
| 8,564,161 | B1 | 10/2013 | Yamasaki |
| 8,581,559 | B2 | 11/2013 | Botts |
| 8,653,798 | B2 | 2/2014 | Berry et al. |
| 8,680,727 | B2 | 3/2014 | Cors et al. |
| 8,803,383 | B2 | 8/2014 | Miyachi et al. |
| 8,866,357 | B2 | 10/2014 | Yamasaki et al. |
| 8,896,251 | B2 | 11/2014 | Le et al. |
| 8,896,261 | B2 | 11/2014 | Bando et al. |
| 8,912,696 | B2 | 12/2014 | Kawakubo et al. |
| 8,924,081 | B2 | 12/2014 | Sonoda et al. |
| 9,000,633 | B2 | 4/2015 | Yamasaki et al. |
| 9,025,336 | B2 | 5/2015 | Minato et al. |
| 9,071,092 | B2 | 6/2015 | Hoehle et al. |
| 9,071,111 | B2 | 6/2015 | Isoda et al. |
| 9,088,195 | B2 | 7/2015 | Yamasaki et al. |
| 9,103,349 | B2 | 8/2015 | Oi et al. |
| 9,124,155 | B2 | 9/2015 | Yamasaki et al. |
| 9,130,413 | B2 | 9/2015 | Richter et al. |
| 9,178,456 | B2 | 11/2015 | Smith et al. |
| 9,225,226 | B2 | 12/2015 | Weber et al. |
| 9,370,083 | B2 | 6/2016 | Rittmeyer et al. |
| 9,397,591 | B2 | 7/2016 | Hyde et al. |
| 9,509,195 | B1 | 11/2016 | Edsinger et al. |
| 9,509,244 | B2 | 11/2016 | Wamble, III et al. |
| 9,570,913 | B2 | 2/2017 | Andresen et al. |
| 9,882,461 | B2 | 1/2018 | Shim et al. |
| 10,069,376 | B2 | 9/2018 | Chiou |
| 10,122,306 | B2 | 11/2018 | Rozman et al. |
| 10,283,256 | B2 | 5/2019 | Bertels |
| 10,305,342 | B2 | 5/2019 | Nishimura et al. |
| 10,320,262 | B2 | 6/2019 | Griffen |
| 10,454,339 | B2 | 10/2019 | Bruhn et al. |
| 10,530,218 | B2 | 1/2020 | Takagi |
| 10,784,753 | B2 | 9/2020 | Shimakawa et al. |
| 11,015,564 | B2 | 5/2021 | Namuduri et al. |
| 11,088,599 | B2 | 8/2021 | Suzuki et al. |
| 11,167,403 | B2 | 11/2021 | Hashimoto et al. |
| 11,489,420 | B2 | 11/2022 | Bulatow et al. |
| 11,621,613 | B2 | 4/2023 | Chung et al. |
| 11,637,481 | B1 * | 4/2023 | Pennington, III ........ H02P 6/08 310/68 D |
| 11,777,362 | B2 | 10/2023 | Maetani et al. |
| 11,815,857 | B2 | 11/2023 | Born et al. |
| 11,837,935 | B2 | 12/2023 | Jefferies et al. |
| 11,884,416 | B2 | 1/2024 | Huang et al. |
| 11,994,618 | B2 | 5/2024 | Pacala et al. |
| 12,126,298 | B2 | 10/2024 | Rothenhagen et al. |
| 12,166,385 | B2 | 12/2024 | Maier et al. |
| 12,191,719 | B2 | 1/2025 | Chien et al. |
| 12,191,733 | B2 | 1/2025 | Iwasaki et al. |
| 12,424,909 | B2 | 9/2025 | Porde et al. |
| 12,454,307 | B2 | 10/2025 | Maruhashi |
| 12,506,427 | B2 | 12/2025 | Labiano Andueza et al. |
| 2006/0226718 | A1 | 10/2006 | Yang |
| 2007/0290562 | A1 | 12/2007 | Takizawa et al. |
| 2008/0224553 | A1 | 9/2008 | Abe et al. |
| 2009/0039725 | A1 | 2/2009 | Kanatani et al. |
| 2009/0174188 | A1 | 7/2009 | Huang et al. |
| 2010/0060092 | A1 | 3/2010 | Blakesley et al. |
| 2010/0117469 | A1 | 5/2010 | Niederer et al. |
| 2011/0042965 | A1 | 2/2011 | Atallah et al. |
| 2011/0156545 | A1 | 6/2011 | Wen et al. |

(56) References Cited

U.S. PATENT DOCUMENTS

| | | |
|---|---|---|
| 2011/0234136 A1 | 9/2011 | Ramu |
| 2012/0001435 A1 | 1/2012 | Pearce et al. |
| 2012/0031215 A1 | 2/2012 | Feier |
| 2012/0194112 A1 | 8/2012 | Purohit |
| 2012/0269666 A1 | 10/2012 | Lin et al. |
| 2013/0057095 A1 | 3/2013 | Okinaga et al. |
| 2013/0193813 A1 | 8/2013 | Rozman et al. |
| 2013/0200623 A1 | 8/2013 | Powell et al. |
| 2013/0209293 A1 | 8/2013 | Kawano et al. |
| 2013/0313925 A1 | 11/2013 | Mergener et al. |
| 2013/0328455 A1 | 12/2013 | Wu |
| 2013/0334937 A1* | 12/2013 | Yamada ................. H02P 25/03 |
| | | 310/68 D |
| 2014/0035490 A1 | 2/2014 | Ramu |
| 2014/0042953 A1 | 2/2014 | Sul et al. |
| 2014/0312819 A1 | 10/2014 | Murata et al. |
| 2014/0368074 A1 | 12/2014 | Tangudi |
| 2015/0015101 A1 | 1/2015 | Murakami et al. |
| 2015/0028590 A1* | 1/2015 | Wamble, III ............ H02P 9/48 |
| | | 290/43 |
| 2015/0084446 A1 | 3/2015 | Atar |
| 2015/0171696 A1 | 6/2015 | Zhang et al. |
| 2015/0194863 A1 | 7/2015 | Rittmeyer et al. |
| 2015/0288247 A1 | 10/2015 | Lee |
| 2015/0364972 A1 | 12/2015 | Ito |
| 2016/0036296 A1 | 2/2016 | Kabune |
| 2017/0063280 A1 | 3/2017 | Li et al. |
| 2018/0226907 A1 | 8/2018 | Masolov et al. |
| 2018/0226908 A1 | 8/2018 | Masolov et al. |
| 2018/0358877 A1 | 12/2018 | Patel et al. |
| 2019/0156992 A1 | 5/2019 | Dai |
| 2020/0287492 A1 | 9/2020 | Sega |
| 2021/0296969 A1 | 9/2021 | Mergener et al. |
| 2023/0098140 A1 | 3/2023 | Nordhorn et al. |
| 2023/0098144 A1 | 3/2023 | Okamoto et al. |
| 2023/0226936 A1 | 7/2023 | Haghbin |
| 2023/0299659 A1 | 9/2023 | Banerjee et al. |
| 2023/0369929 A1 | 11/2023 | Toliyat et al. |
| 2024/0063736 A1 | 2/2024 | Rosso et al. |
| 2024/0186932 A1 | 6/2024 | Pennington, III et al. |
| 2024/0195269 A1 | 6/2024 | Pennington, III et al. |
| 2024/0204591 A1 | 6/2024 | Pennington, III et al. |
| 2024/0339878 A1 | 10/2024 | Dunston et al. |
| 2024/0429765 A1 | 12/2024 | Lee et al. |
| 2024/0429847 A1 | 12/2024 | Kozlowski et al. |
| 2025/0211059 A1 | 6/2025 | Jiang et al. |
| 2025/0364876 A1 | 11/2025 | Ruppert |
| 2025/0392196 A1 | 12/2025 | Lee |
| 2026/0005584 A1 | 1/2026 | Maeda et al. |

FOREIGN PATENT DOCUMENTS

| | | |
|---|---|---|
| EP | 1051797 B1 | 11/2003 |
| EP | 2228897 B1 | 7/2012 |
| EP | 2495853 A1 | 9/2012 |
| EP | 1990906 B2 | 7/2015 |
| EP | 3062422 B1 | 4/2019 |
| EP | 3151394 B1 | 7/2020 |
| EP | 3723267 A1 | 10/2020 |
| EP | 4084321 A1 | 11/2022 |
| EP | 4138274 A1 | 2/2023 |
| EP | 4470898 A1 | 12/2024 |
| EP | 3910786 B1 | 10/2025 |
| JP | 2001178198 A | 6/2001 |
| JP | 2003134765 A | 5/2003 |
| JP | 2015061409 A | 3/2015 |
| JP | 2017118603 A | 6/2017 |
| WO | 1993011604 A1 | 6/1993 |
| WO | 1998037625 A1 | 8/1998 |
| WO | 1999061193 A1 | 12/1999 |
| WO | 2001052385 A1 | 7/2001 |
| WO | 2004040748 A1 | 5/2004 |
| WO | 2005043720 A1 | 5/2005 |
| WO | 2010126408 A1 | 11/2010 |
| WO | 2011009901 A1 | 1/2011 |
| WO | 2011124355 A1 | 10/2011 |
| WO | 2011126836 A4 | 12/2011 |
| WO | 2012023245 A1 | 2/2012 |
| WO | 2014042341 A1 | 3/2014 |
| WO | 2013147316 A3 | 10/2014 |
| WO | 2016115563 A1 | 7/2016 |
| WO | 2019056072 A1 | 3/2019 |
| WO | 2019133780 A1 | 7/2019 |
| WO | 2022026957 A1 | 2/2022 |

* cited by examiner

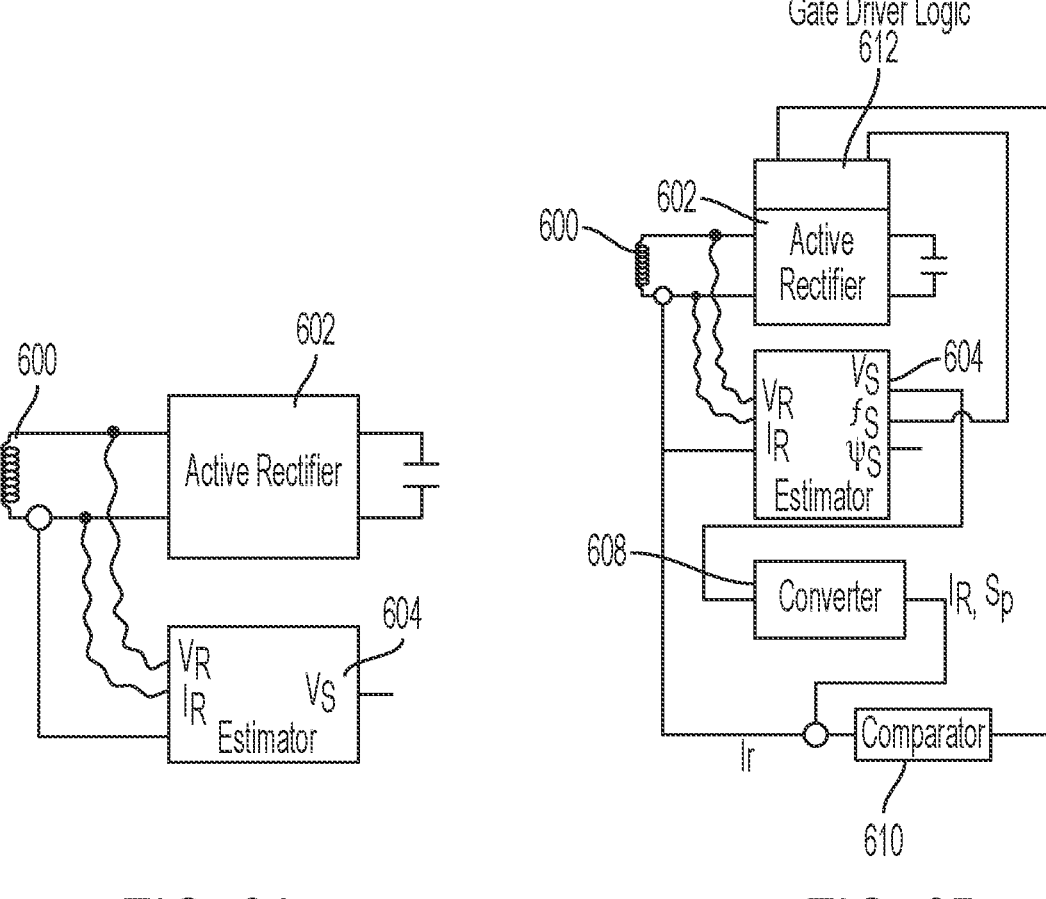
FIG. 6A                          FIG. 6B

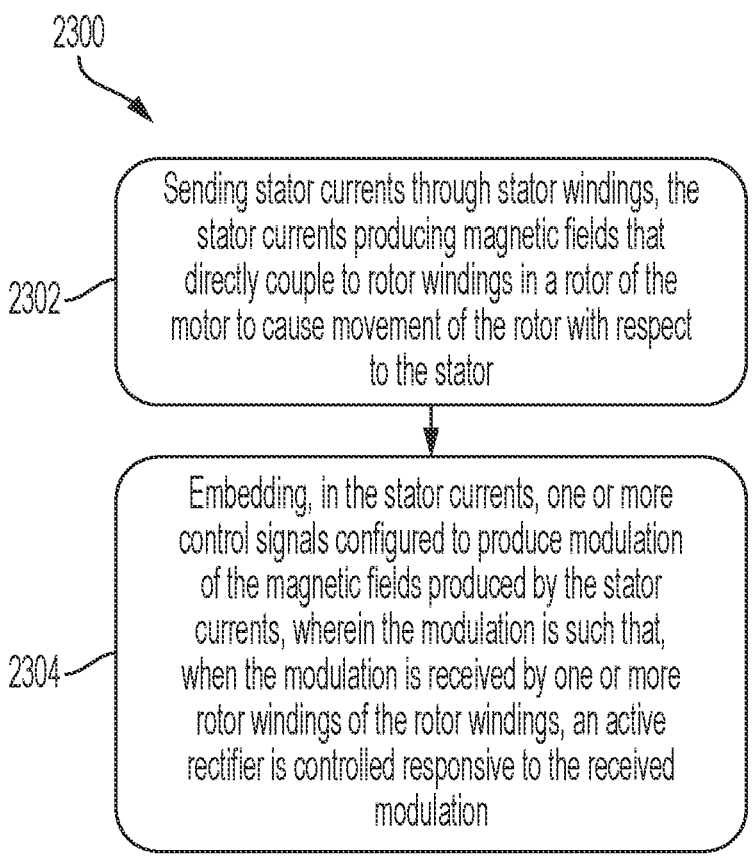

2300

2302 — Sending stator currents through stator windings, the stator currents producing magnetic fields that directly couple to rotor windings in a rotor of the motor to cause movement of the rotor with respect to the stator 2304 — Embedding, in the stator currents, one or more control signals configured to produce modulation of the magnetic fields produced by the stator currents, wherein the modulation is such that, when the modulation is received by one or more rotor windings of the rotor windings, an active rectifier is controlled responsive to the received modulation

FIG. 23

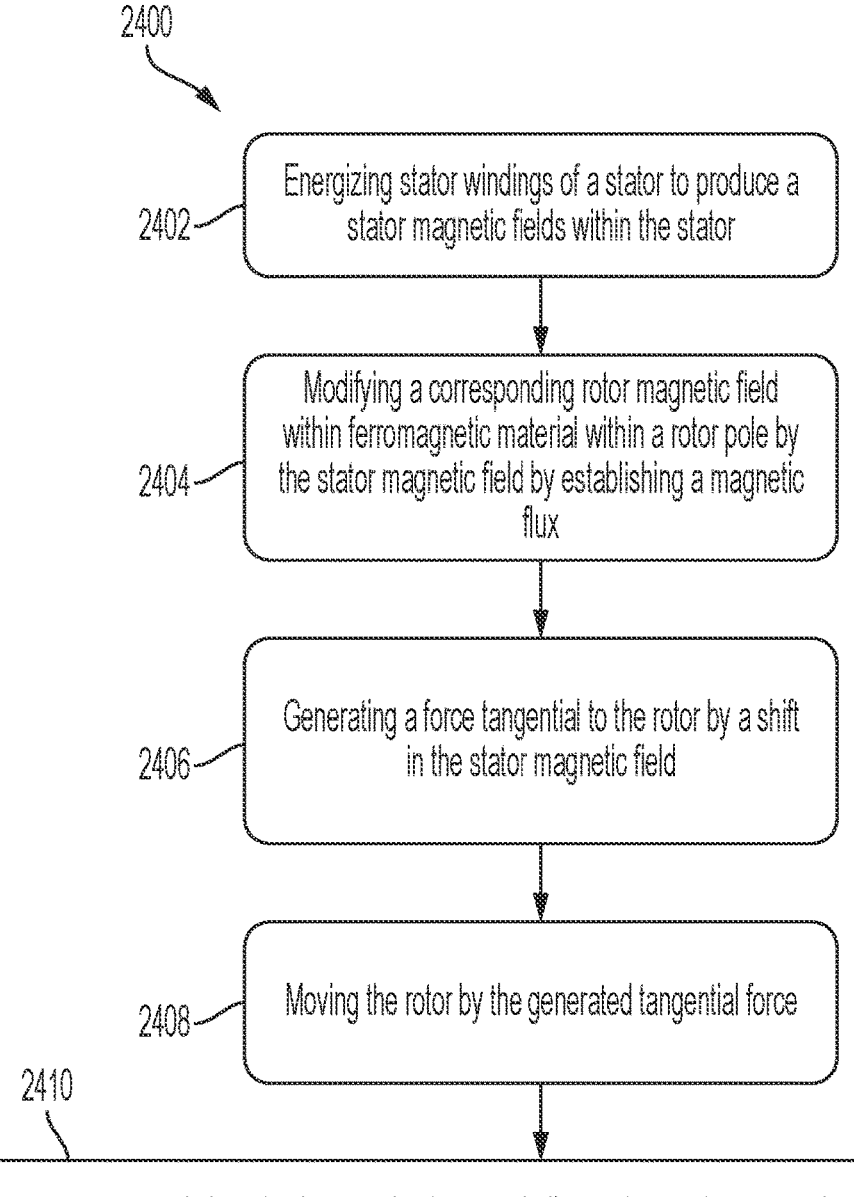

2400

2402 — Energizing stator windings of a stator to produce a stator magnetic fields within the stator 2404 — Modifying a corresponding rotor magnetic field within ferromagnetic material within a rotor pole by the stator magnetic field by establishing a magnetic flux 2406 — Generating a force tangential to the rotor by a shift in the stator magnetic field 2408 — Moving the rotor by the generated tangential force 2410 — Generating a control signal by the energized stator windings, wherein the control signal is such that, when the control signal is received by at least one rotor winding, an active rectifier is controlled responsive to the received control signal, to control a delay of energization of flux in an air gap, the air gap being defined between an inner surface of the stator and an outer surface of the rotor, and wherein, responsive to the received control signal, a decay of a magnetic flux within the rotor is controlled by current within the at least one rotor winding in response to the magnetic field shift

FIG. 24

WIRELESSLY TRANSFERRING POWER WITHIN AN ELECTRIC MACHINE WITH ACTIVELY RECTIFIED ROTOR WINDINGS

CROSS-REFERENCE TO RELATED APPLICATIONS

This application is a 371 application of PCT/US2022/019040 filed Mar. 4, 2022, which claims priority to U.S. Provisional Application No. 63/157,650, titled "Wirelessly Transferring Power with an Electric Machine with Actively Rectified Rotor Windings," filed on Mar. 5, 2021, which is hereby incorporated by reference in its entirety.

STATEMENT REGARDING FEDERALLY SPONSORED RESEARCH

N/A

TECHNICAL FIELD

This invention relates to electric motors and generators.

BACKGROUND

Electric motors generally include a stationary component, often referred to as a stator, and a rotational component often referred to as a rotor. Electric current is translated into electromagnetic fields which exert a mechanical force, or torque, between the stator and the rotor, which may be used to do work. Generators work on similar principles with mechanical force being translated into electric current. While primarily described in terms of rotational force, or torque, the principles described herein are also applicable to linear motors. For linear motors, in some implementations, the rotor acts as the stationary component while the stator acts as a translated component.

SUMMARY

Various aspects of this disclosure feature a motor with actively-rectified rotor windings. Active rectification of rotor currents can provide improved torque generation efficiency, increased control over motor state, and other benefits.

An example implementation of the subject matter described in this disclosure is an electric machine with the following features. A stator including stator windings configured to be energized to define stator poles. A rotor including rotor windings configured to be energized to define rotor poles that interact with the stator poles to produce relative force between the rotor and the stator. The rotor is configured to be magnetically coupled to the stator to receive a power transfer signal wirelessly from the stator. The electric machine further includes an active rectifier rotationally fixed to the rotor and conductively coupled to one or more first rotor windings of the rotor windings. The active rectifier is configured to: capture electrical energy from the power transfer signal, and control current flow through the one or more first rotor windings by directing the electrical energy captured from the power transfer signal to the one or more first rotor windings.

An example implementation of the subject matter described in this disclosure is a motor control method includes the following features: receiving, by a rotor, a power transfer signal wirelessly inductively from a stator, the stator including stator windings configured to be energized to define stator poles and the rotor including rotor windings configured to be energized to define fixed rotor poles that interact with the stator poles to produce relative force between the rotor and the stator; capturing, by an active rectifier rotationally fixed to the rotor, electrical energy from the power transfer signal, wherein the active rectifier is conductively coupled to one or more first rotor windings of the rotor windings; and controlling, by the active rectifier, current flow through the one or more first rotor windings by directing the electrical energy captured from the power transfer signal to the one or more first rotor windings.

Another example of an electric machine according to the present disclosure includes the following features. A stator that defines multiple stator poles with associated stator windings. A rotor that defines multiple fixed rotor poles with associated rotor windings configured to be energized substantially by the stator. The rotor defines a rotor field energizable by magnetic fields produced by the stator windings to produce relative force between the rotor and the stator. An active rectifier is conductively coupled to one or more first rotor windings. The active rectifier is configured to control a direction of current flow through the one or more first rotor windings responsive to a signal received wirelessly or inductively from the stator by one or more second rotor windings of the rotor windings.

An example implementation of the subject matter described in this disclosure is a motor control method with the following features. Stator currents are sent through stator windings in a stator of a motor, the stator currents producing magnetic fields that directly couple to one or more first rotor windings in a rotor of the motor to cause movement of the rotor with respect to the stator. One or more data signals are embedded in the stator currents. The one or more data signals are configured to produce modulation of the magnetic fields produced by the stator currents. The modulation is such that, when the modulation is received by one or more second rotor windings, an active rectifier is controlled responsive to the received modulation.

An example implementation of the subject matter described in this disclosure is a motor control method with the following features. Stator windings of a stator are energized to produce a stator magnetic field within the stator. A corresponding rotor magnetic field is modified within ferromagnetic material within a rotor pole by the stator magnetic field by establishing a magnetic flux. A force tangential to the rotor is generated by a shift in the stator magnetic field. The rotor is moved by the generated tangential force. A data signal is generated by the energized stator windings. The data signal is such that, when the data signal is received by one or more second rotor windings, an active rectifier is controlled responsive to the received data signal, to control a delay of energization of flux in an air gap, the air gap being defined between an inner surface of the stator and an outer surface of the rotor. Responsive to the received data signal, a decay of a magnetic flux within the rotor is controlled by current within one or more first rotor windings in response to the shift in the stator magnetic field.

Implementations previously described can include any, all, or none of the following features.

In some implementations, the electric machine includes a controller.

In some implementations, the controller is configured to energize the stator windings and to produce a stator magnetic field within the stator by sending a torque control signal to the stator windings by sending a current through the stator windings at a current angle measured relative to a closest one of the multiple fixed rotor poles. The controller may be also configured to send a data signal through the stator windings to control a change in magnetic flux within the rotor. The data signal may be different from the torque control signal.

In some implementations, the controller is configured to adjust the current angle in response to operating conditions and to adjust a current magnitude of the sent current in response to operating conditions. The rotor may be maintained in synchronicity with the magnetic fields produced by the stator windings during operation.

In some implementations, the rotor includes permanent magnets embedded within the rotor.

In some implementations, each rotor winding associated with one of the multiple fixed rotor poles is conductively coupled to a singular corresponding active rectifier.

In some implementations, the one or more second rotor windings receiving the signal include the one or more first rotor windings through which the direction of current flow is controlled.

In some implementations, the active rectifier includes a plurality of gates arranged in an H-bridge configuration. The active rectifier may include two diodes and two gates arranged in an H-bridge configuration. The two diodes may be arranged in series with the at least one rotor winding. The two gates may be arranged in series with the one or more first windings.

In some implementations, the gates actuate responsive to the signal received inductively from the stator by the one or more second rotor windings.

In some implementations, the gates include transistors.

In some implementations, the electric machine includes a rotor control unit configured to detect, in the one or more second rotor windings, an electrical signal induced by the magnetic fields produced by the stator windings. The rotor control unit may be configured to extract, from the electrical signal, a data signal indicative of an operating setpoint for the rotor. The rotor control unit may be configured to control switching operations of the active rectifier responsive to the operating setpoint.

In some implementations, the data signal is embedded in the electrical signal by amplitude modulation or frequency modulation.

In some implementations, the operating setpoint includes a rotor winding voltage setpoint, a rotor winding current setpoint, or a rotor voltage frequency setpoint.

In some implementations, controlling the switching operations includes causes a rotor winding voltage to lead a corresponding stator winding voltage, causing active weakening of rotor winding currents.

In some implementations, the electric machine includes a rotor control unit configured to detect, in the one or more second rotor windings, an electrical signal induced by the magnetic fields produced by the stator windings. The rotor control unit may be configured to estimate, based on the detected electrical signal, an operating state of the stator. The rotor control unit may be configured to control switching operations of the active rectifier responsive to the estimated operating state.

In some implementations, the operating state of the stator includes a stator winding voltage.

In some implementations, n rotor windings of the rotor windings are conductively coupled to one another. The electric machine may include a controller configured to apply, to the stator windings, a voltage including n voltage components, each voltage component coupling to a respective one of the n rotor windings by magnetic fields produced by a current corresponding to the voltage component. The n voltage components may be each characterized by a distinct phase, the distinct phases being separated from one another by about 360/n degrees.

In some implementations, the n rotor windings are included in different respective pole pairs of the rotor.

In some implementations, the active rectifier includes a shared capacitor conductively coupled to each of the n rotor windings, the shared capacitor storing energy while the active rectifier controls the direction of current flow in each of the n rotor windings.

In some implementations, the rotor includes n additional rotor windings.

In some implementations, each of the n additional rotor windings is included in a pole pair with a corresponding one of the n rotor windings.

In some implementations, the n rotor windings are conductively coupled to the n additional rotor windings by the active rectifier.

In some implementations, the n additional rotor windings are conductively coupled in a delta configuration with respect to the active rectifier.

In some implementations, the n rotor windings are conductively coupled in series. The n rotor windings may be conductively coupled in series with alternating polarities with respect to the n voltage components.

In some implementations, the electric machine includes a low-pass filter conductively coupled to the active rectifier and to the one or more first rotor windings. A DC output of the low-pass filter may be conductively coupled to a DC output of the active rectifier.

In some implementations, the active rectifier is configured to introduce a zero-sequence into a periodic voltage induced in the one or more first rotor windings by the stator windings.

In some implementations, the active rectifier is configured to cause, in the one or more first rotor windings, a periodic voltage shifted about 90 degrees compared to a corresponding periodic voltage in the stator windings.

In some implementations, the active rectifier is configured to produce a non-zero DC current through the one or more first rotor windings.

In some implementations, the magnetic fields produced by the stator windings include a D component substantially in-line with a corresponding rotor pole, and a Q component that is 90° ahead of the corresponding rotor pole within an electrical reference frame.

In some implementations, the signal is included in modulations of the D component.

In some implementations, the signal is included in modulations of the Q component.

In some implementations, the signal is included in modulations of both the D component and the Q component.

In some implementations, the one or more first rotor windings are configured to be energized substantially by the stator along a first controllable axis on which the stator and rotor are inductively coupled, and the signal is received inductively along a second, different controllable axis on which the stator and rotor are inductively coupled.

In some implementations, the one or more first rotor windings are configured to be energized substantially by the stator along a first controllable axis on which the stator and rotor are inductively coupled, and the signal is received inductively along the first controllable axis.

In some implementations, the magnetic fields couple to the one or more second rotor windings along a controllable axis, and the signal is received inductively by the one or more second rotor windings by power transfer on the controllable axis based on modulated amplitudes of the magnetic fields, modulated frequencies of the magnetic fields, or both.

In some implementations, the magnetic fields produced by the stator windings include a D component substantially in-line with a corresponding rotor pole, a Q component 90° ahead of the corresponding rotor pole within an electrical reference frame, and a z component orthogonal to the D component and the Q component. The signal is included in modulations of the z component.

In some implementations, the magnetic fields couple to the one or more first rotor windings and the one or more second rotor windings on one or more controllable axes.

In some implementations, the relative force is produced by a coupling along a first controllable axis of the one or more controllable axes, and the signal is received inductively along the first controllable axis.

In some implementations, the active rectifier is configured to produce a substantially DC current in a first set of the rotor windings and a substantially oscillating current in a second, different set of the rotor windings.

In some implementations, the active rectifier is included in a circuit board mounted on the rotor.

In some implementations, the one or more second rotor windings include the one or more first rotor windings.

In some implementations, a frequency of the signal is independent of a frequency of a torque control signal, different from the signal, that is transmitted from the stator to the rotor.

In some implementations, the rotor defines multiple rotor poles. The stator windings may be energized. A stator magnetic field may be produced within the stator by sending a torque control signal to the stator windings by sending a current through the stator windings at a current angle measured relative to a closest one of the multiple rotor poles. The data signal may be sent through the stator windings to control a change in magnetic flux within the rotor, the data signal being different from the torque control signal.

In some implementations, a current angle is adjusted in response to operating conditions.

In some implementations, a current magnitude of the stator currents is adjusted in response to operating conditions.

In some implementations, the rotor is maintained in synchronicity with the magnetic fields produced by the stator currents during operation.

In some implementations, one or more gates are actuated in the active rectifier.

In some implementations, an electrical signal induced by the magnetic fields produced by the stator currents is detected in the one or more second rotor windings. A data signal indicative of an operating setpoint for the rotor may be extracted from the detected electrical signal. The one or more gates may be controlled responsive to the operating setpoint.

In some implementations, the data signal is embedded in the electrical signal by amplitude modulation or frequency modulation.

In some implementations, the operating setpoint includes a rotor winding voltage setpoint, a rotor winding current setpoint, or a rotor voltage frequency setpoint.

In some implementations, an electrical signal induced by the magnetic fields produced by the stator currents is detected in the one or more second rotor windings. An operating state of the stator may be estimated based on the detected electrical signal. The one or more gates may be actuated responsive to the estimated operating state. The operating state of the stator may include a stator winding voltage.

In some implementations, the magnetic fields produced by the stator currents induce rotor currents.

In some implementations, the active rectifier is controlled such that a DC component of the rotor currents is at least about twice a magnitude of ripples in the rotor currents.

In some implementations, a zero-sequence is introduced into a periodic voltage induced in the one or more first rotor windings by the magnetic fields.

In some implementations, a periodic voltage shifted substantially 90 degrees compared to a corresponding periodic voltage in the stator windings is caused in the one or more first rotor windings.

In some implementations, n periodic voltages are applied to the stator windings. The n periodic voltages may be timed to couple respectively, by stator currents associated with the n periodic voltages, to n rotor windings, the n rotor windings conductively coupled to one another. The n periodic voltages may be each characterized by a distinct phase, the distinct phases being separated from one another by about 360/n degrees.

In some implementations, low-pass filtering is applied to voltages in the one or more first rotor windings.

In some implementations, energy is stored in a shared capacitor common to at least two of the one or more first rotor windings.

In some implementations, the magnetic fields produced by the stator currents include a D component substantially in-line with a corresponding rotor pole, and a Q component 90° ahead of the corresponding rotor pole within an electrical reference frame.

In some implementations, the one or more data signals are included in modulations of the D component.

In some implementations, the one or more data signals are included in modulations of the Q component.

In some implementations, the one or more data signals are included in modulations of both the D component and the Q component.

In some implementations, the magnetic fields couple to the one or more first rotor windings along a first controllable axis on which the stator and rotor are inductively coupled, and the modulation is received inductively along a second, different controllable axis on which the stator and rotor are inductively coupled.

In some implementations, the magnetic fields couple to the one or more first rotor windings along a first controllable axis on which the stator and rotor are inductively coupled, and the modulation is received inductively along the first controllable axis.

In some implementations, the magnetic fields couple to the one or more first rotor windings along a controllable axis, and the modulation is received inductively along the controllable axis based on modulated amplitudes of the magnetic fields, modulated frequencies of the magnetic fields, or both.

In some implementations, the magnetic fields produced by the stator currents include a D component substantially in-line with a corresponding rotor pole, a Q component 90° ahead of the corresponding rotor pole within an electrical reference frame, and a z component orthogonal to the D component and the Q component. The one or more data signals are included in modulations of the z component.

In some implementations, the magnetic fields couple to the one or more first rotor windings and the one or more second rotor windings on one or more controllable axes.

In some implementations, the movement is produced by a coupling along a first controllable axis of the one or more controllable axes, and the one or more data signals are received inductively along the first controllable axis In some implementations, a substantially DC current is imposed in a first set of rotor windings, and a substantially oscillating current is imposed in a second set of rotor windings In some implementations, a frequency of the one or more data signals is independent of a frequency of the stator currents that produce magnetic fields that directly couple to one or more first rotor windings in a rotor of the motor to cause movement of the rotor.

In the absence of active rectification, rotor-side currents in motors have timings and generation/decay characteristics that are dependent on the stator-side currents to which they are coupled and on the passive components coupled to the rotor windings (e.g., passive components defining an LC time constant). Active rectification allows for the precise selection, tuning, and on-the-fly modification of rotor winding currents to maximize efficiency (e.g., power transfer efficiency and torque efficiency) and define modes of operation of the motor.

Much of this disclosure relates to active rectification implementations that increase efficiency and/or avoid circuit design constraints. For example, windings of different pole pairs may share all or some of an active rectification circuit, not only reducing total circuit components needed but also improving circuit operations (e.g., decreasing peak voltages). Some implementations relate to the separation of AC and DC currents within sets of coupled rotor windings, which can reduce maximum power in active rectifier circuits, among other possible advantages. Some implementations include the separation of AC and DC currents in different windings within a pole pair.

Some portions of this disclosure relate to control of the active rectification circuitry. Self-synchronizing control designs can reduce necessary circuit complexity. Some designs are signal-based, with data signals from stator windings being transmitted to rotor windings. The transmission of data signals in this manner (as opposed to, e.g., separate brushes, sensors, or wireless components) can also reduce circuit complexity and cost. A high degree of design flexibility is enabled by separating, torque control, power transfer, and data signal function across different excitation axes.

The details of one or more implementations of the subject matter described in this disclosure are set forth in the accompanying drawings and the description below. Like reference numerals will be used to refer to like parts from Figure to Figure in the following description. Other features, aspects, and advantages of the subject matter will become apparent from the description, the drawings, and the claims.

BRIEF DESCRIPTION OF THE DRAWINGS

FIGS. 6A and 6B are schematic diagrams of example rotor control circuit topology that can be used with aspects of this disclosure.

FIG. 23 is a flowchart of a method that can be used with aspects of this disclosure.

FIG. 24 is a flowchart of a method that can be used with aspects of this disclosure.

Like reference numbers and designations in the various drawings indicate like elements.

DETAILED DESCRIPTION

Figure 1:
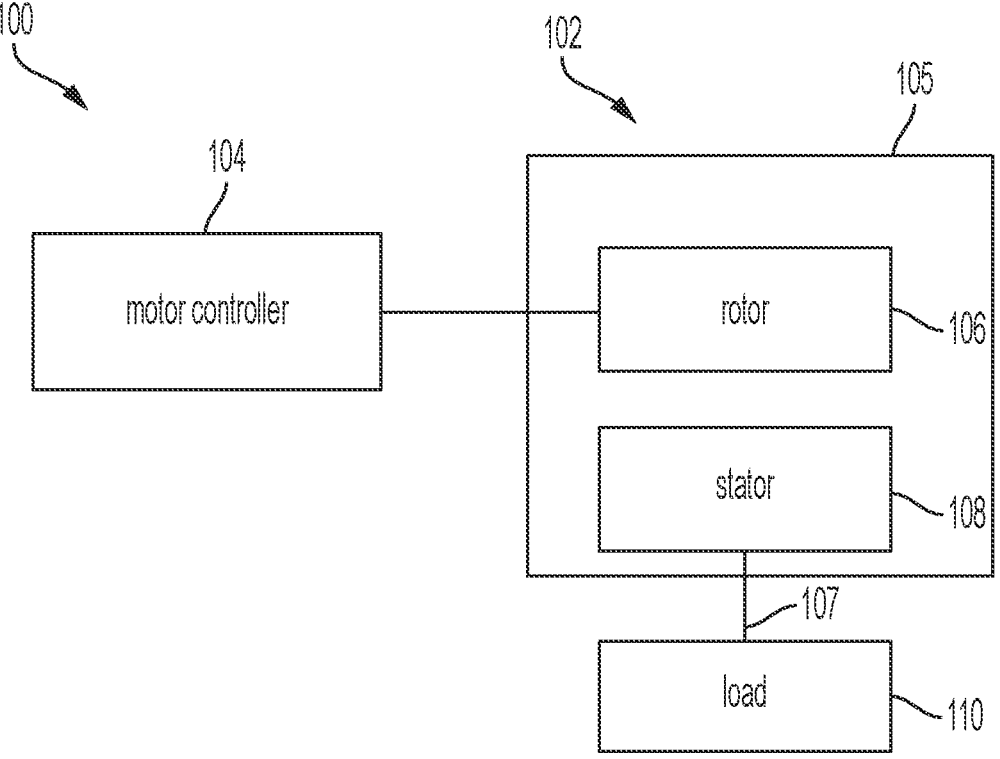
FIG. 1 is a schematic illustration of an example of an electric drive system.

In implementations according to this disclosure, rotor windings in a motor are charged by oscillating currents in stator windings. When charged, the rotor windings carry a rotor current that couples to magnetic fields produced by currents in the stator windings, producing an electromotive force on the rotor.

However, some characteristics of the rotor current may negatively affect the functioning of the motor. For example, because the magnitude of the electromotive force is related to the strength of the rotor currents, ripple in the rotor currents may cause ripple in an electromotive torque on the rotor, leading to uneven motor operation. As another example, ripple in the rotor currents can represent power loss, either directly (because the rotor windings must be "recharged") or indirectly (because the ripple causes increased eddy current losses, e.g., in the rotor laminations). Therefore, it may be beneficial to introduce control elements conductively coupled to the rotor windings, the control elements configured to, for example, reduce rotor current ripple.

As a first step, the rotor windings may be passively rectified by, for example, passive rectifiers (e.g., diodes) shorted to the rotor windings. Such passive rectifiers force the current within the rotor windings to be unidirectional, producing an asymmetric inductive response to the oscillating drive currents of the stator windings and reducing rotor current ripple during motor operation.

However, passive rectification may come with drawbacks. First, passive rectifiers implemented with diodes introduce loss into the rotor coils, because each diode introduces a corresponding voltage drop over the diode (e.g., several tenths of a volt). Besides representing wasted power transferred to the rotor windings, this voltage drop produces dissipated heat that may have to be accounted for (e.g., by cooling) or may compromise rectifier operation.

Second, in some cases, implementing passive rectification means introducing a locking state into the rotor current cycle. In the locking state, the rotor current through a rotor winding is reduced to zero, such that repulsive torque on the rotor winding is also reduced to zero.

Therefore, as described in this disclosure, rotor windings may be actively rectified, reducing current ripple (in comparison to passively rectified systems) and increasing motor efficiency. In other words, the stator windings may wirelessly transfer power to the rotor windings (a net power transfer from stator to rotor), and an active rectifier may capture electrical energy from the wirelessly transferred power and control the application of this electrical energy to the rotor windings to generate a rotor magnetic field. The rotor magnetic field interacts with a stator magnetic field generated by the stator windings to generate a torque and rotate the rotor. In some implementations, the active rectifier is controlled by signals sent from the stator windings themselves, reducing motor complexity compared to systems that incorporate brushes and/or sensors.

Direct stator-rotor coupling for such wireless power transfer and control signaling can have several advantages. First, it can reduce the complexity and tolerance stack up of maintaining two systems (e.g., the stator and rotor) in proper alignment under dynamic conditions. Second, it can decrease the stack height of the rotor, allowing for more compact packaging because the rotor does not include slip rings or other secondary coupling assemblies that increase rotor axial length. Third, it can allow liquid cooling without the liquid cooling interfering with a secondary coupling. Fourth, it can obviate or reduce the need for a secondary power inverter by causing the primary multiphase stator inverter to be utilized for both signal and power. Further, employing active rectification for the direct stator-rotor coupling for wireless power transfer can provide several advantages over passive rectification including one or more of: increased torque output, lower torque ripple, rotor current can remain relatively constant, lower power dissipation, improved transient performance, lower stress on the stator inverter, no "dead zone" in commutation for charging, lower core losses in terms of hysteresis (e.g., ripple in flux linkage minimized) and eddy current (lower amplitude of ripple reduces eddy current losses), ability to control polarity of rotor field windings, ability to reconfigure rotor field polarity or rotor poles, and/or additional opportunities for flux weakening (e.g., active control to weaken flux instead of L/R time constant to weaken flux).

FIG. 1 illustrates an electric drive system 100 that includes an electric motor 102 and a motor controller 104 coupled to the electric motor 102. The motor controller 104 is configured to operate the electric motor 102 to drive a load 110. The load 110 can be an additional gear train such as a gear set, a vehicle wheel, a pump, a compressor, or another motor where multiple motors can be linked and operated in parallel.

The electric motor 102 has an output shaft 107 rotatable with respect to a motor housing 105, which is considered to be a datum with respect to rotations and other motions of motor components. In use, the output shaft 107 can be coupled to the load 110 to which the electric motor 102 can impart rotary power when electrically activated by appropriate electrical power and signals from the motor controller 104. The output shaft 107 may extend through the motor and be exposed at both ends, meaning that rotary power can be transmitted at both ends of the motor. The motor housing 105 can be rotationally symmetric about the rotation axis of output shaft 107, but may be of any external shape and can generally include means for securing the motor housing 105 to other structures to prevent housing rotation during motor operation.

The electric motor 102 includes an active magnetic component 106, such as a stator, and a passive magnetic component 108, such as a rotor. For illustration purposes, in the following, "stator" is used as a representative example of the active magnetic component and "rotor" is used as a representative example of the passive magnetic component.

The rotor 108 is associated with the stator 106 and can be disposed within the stator 106, e.g., in an internal rotor radial-gap motor; parallel to the stator, e.g., in an axial-gap motor or in a linear motor; or around the stator, e.g., in an outer rotor radial-gap motor. As described more fully below, electrical activity in the stator 106, properly controlled, drives motion of the rotor 108. The rotor 108 is rotationally coupled to the output shaft 107, such that any rotational component of resultant rotor motion is transmitted to the output shaft 107, causing the output shaft 107 to rotate. The stator 106 is fixed to the housing 105 such that during operation, the rotor 108 moves about the stator 106 or parallel to the stator 106.

Current flowing through a loop of electric wire will result in a substantially uniform magnetomotive force (MMF) resulting in a motor pole within the wound, or encircled, region. In a typical motor, such a loop has a sufficient diameter to carry the desired current load, but is thin enough that a skin depth of the drive frequency fully penetrates the loop. Many turns, or coextending loops of wire wound as a group, may be used to increase the pole magnetic field strength. This topology is typically referred to as a wound field pole. Such a set of coextending loops wound as a group is referred to as a coil. For the purposes of this disclosure, one or more coils acting together within the stator or rotor are referred to as a winding.

In some instances, coils can overlap and encompass multiple teeth on either a rotor or a stator. Such overlapping coils can be referred to as an armature or a distributed winding. A pole is a magnetic center of this distributed winding, and as such, the pole can move relative to the individual coils within such a distributed winding depending upon the drive current passing through the winding.

The stator 106 defines multiple stator poles with associated electrical windings and the rotor 108 includes multiple rotor poles, such as the examples illustrated with further details throughout this disclosure. The rotor 108 defines, together with the stator 106, a nominal air gap between the stator poles and the rotor poles, such as the example as illustrated with further details throughout this disclosure. The rotor 108 is movable with respect to the stator 106 along a motion direction.

Figure 2:
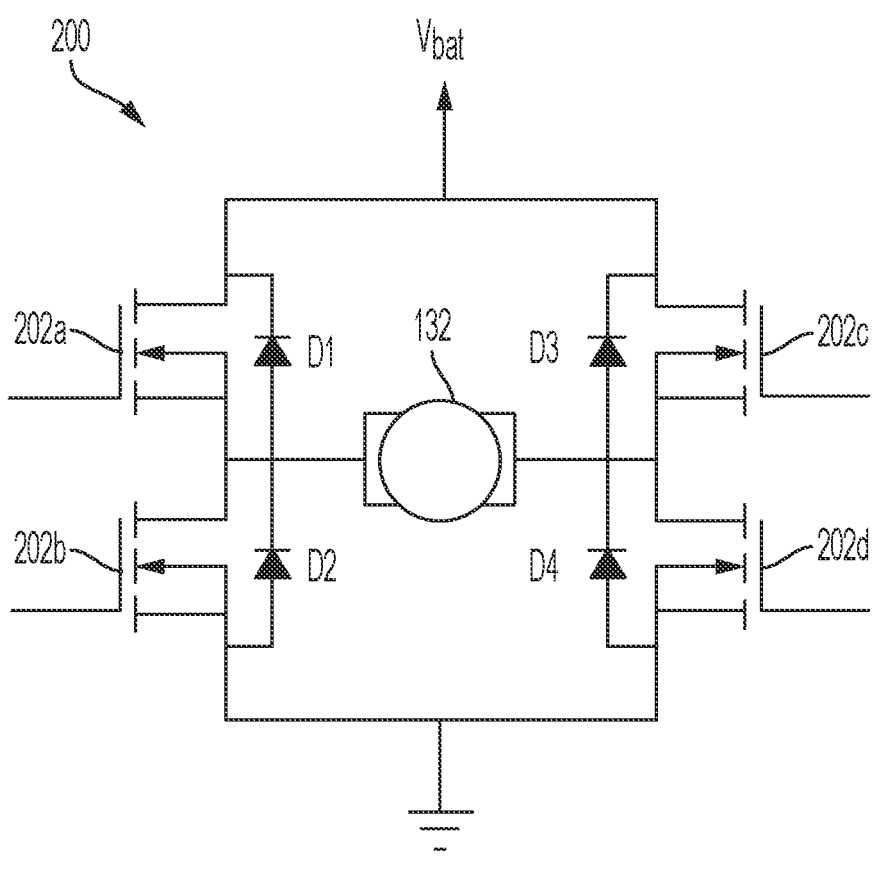
FIG. 2 is a schematic illustration of an example power switch for an electrical winding.

FIG. 2 shows another example power switch 200 for an individual electrical winding 132. The power switch 200 can have an H-bridge circuit including four switching elements 202a, 202b, 202c, and 202d, with the electrical winding 132 at the center, in an H-like configuration. The switching elements 202a, 202b, 202c, and 202d can be bi-polar or FET transistors. Each switching element 202a, 202b, 202c, and 202d can be coupled with a respective diode D1, D2, D3, and D4. The diodes are called catch diodes and can be of a Schottky type. The top-end of the bridge is connected to a power supply, e.g., a battery $V_{bat}$, and the bottom-end is grounded. Gates of the switching elements 202a, 202b, 202c, and 202d can be coupled to the motor controller 104 (FIG. 1) which is operable to send a respective control voltage signal to each switching element 202a, 202b, 202c, and 202d. The control voltage signal can be a direct current (DC) voltage signal or an alternating current (AC) voltage signal.

The switching elements 202a, 202b, 202c, and 202d can be individually controlled by the motor controller 104 (FIG. 1) and can be turned on and off independently. In some cases, if the switching elements 202a and 202d are turned on, the left lead of the stator is connected to the power supply, while the right lead is connected to ground. Current starts flowing through the stator, energizing the electrical winding 132 in a forward direction. In some cases, if the switching elements 202b and 202c are turned on, the right lead of the stator is connected to the power supply, while the left lead is connected to ground. Current starts flowing through the stator, energizing the electrical winding 132 in a reverse, backward direction. That is, by controlling the switching elements, the electrical winding 132 can get energized/activated in either of two directions. While primarily illustrated and described as using a single phase H-bridge configuration, a typical six switch inverter system can be used for multiphase machines without departing from this disclosure.

The motor controller 104 can be configured to sequentially operate the switches 200 for respective pole energization duty cycles to generate magnetic flux across the air gap between the stator poles and rotor poles, as described with further details throughout this disclosure. The switches can be controlled to sequentially energize stator poles to create a local attraction force pulling on the rotor. Such a sequential energization (or activation) can cause a rotation of the rotor 108, the output shaft 107, and the load 110.

Motor components and controls are sometimes discussed in reference to a D-axis 312 (example illustrated in FIG. 3A) and Q-axis of a motor rotor and/or stator. The direct axis, or D-axis 312, in a motor may be defined as the center line of a pole 308 perpendicular to the air gap 314, and may be applied to either a stator pole or rotor pole 308. A rotor may be characterized with a D-axis 312 for each pole as viewed in the synchronous reference frame. In a wire wound rotor, the D-axis 312 is the center point of the resultant magnetic center of a coil or field winding regardless of whether the field winding is concentrated to a single, large slot or spread across multiple, smaller slots. Stator poles can be similarly characterized.

The Q-axis is normal (e.g., electrically 90° for a machine with four rotor poles, or, in some implementations, $360°/n_p$ for a machine with $n_p$ poles) to the D-axis (e.g., where the D-axis is at 0°) within the magnetic reference frame. In some implementations, the Q-axis is electrically normal to the D-axis, and both lie in a plane in which the rotor rotates. In general, forces along the Q-axis generate an electromotive force, such as torque. Topologically, the Q-axis of a rotor or a stator is typically located directly between two poles.

Axes may be described as "major" or "minor" with respect to their relationship to a rotor pole. The example embodiments described herein, when referring to D-axes and Q-axes, refer to major D-axes and major Q-axes unless indicated otherwise. However, in some implementations according to this disclosure, stator-rotor coupling (e.g., power transfer and/or data signal transfer) may be conducted on a minor axis. For example, a rotor coil having a D-axis that is misaligned from the rotor pole D-axis can be said to have its own, minor D-axis In such a system where control signals can be transformed into D-Q-axis components, a third z-axis component is also present and can be described as the signal quantities that do not map directly onto the D- or Q-axis (e.g., in some embodiments it can be described as a component orthogonal to the plane in which the Q and D components can be found).

Figure 3A:
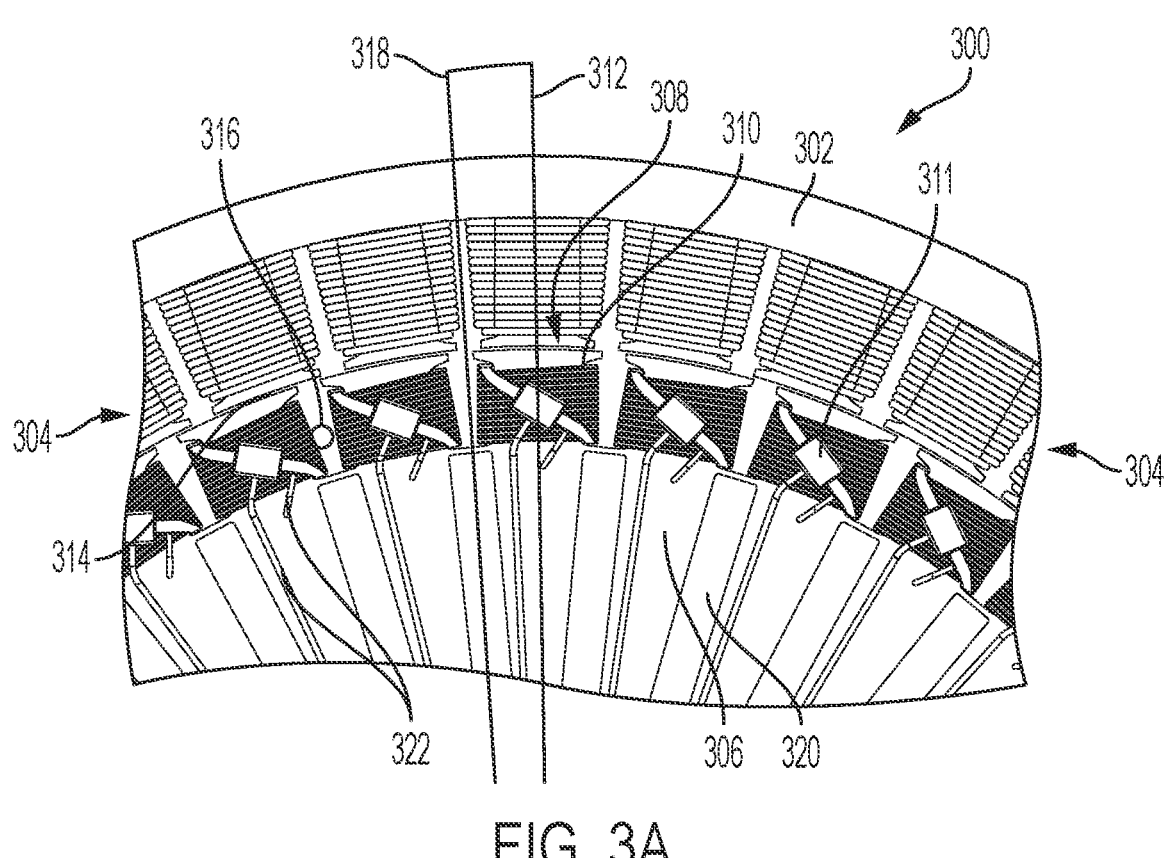
FIGS. 3A and 3B are a side view and perspective view of an example electric machine with actively rectified rotor windings.

A current phasor angle 318 is the relative angle of a rotor D-axis 312 to the magnetic center of the stator (example illustrated in FIG. 3A). A positive current phasor angle indicates that the magnetic center of the stator is ahead of the rotor pole in a direction of motion. Such a situation results in the magnetic center of the stator "pulling" the rotor pole towards the magnetic center of the stator. Similarly a negative current angle indicates that the magnetic center of the stator is behind the rotor pole. Such a situation "pulls" the rotor pole in the opposite direction. Such a negative current phasor angle 318 can be used in braking situations. In some implementations, a current phasor angle 318 of greater than 90° can be used. Such a large phasor current angle 318 can "push" an adjacent pole in the direction of motion. Similarly, a current phasor angle 318 of less than −90° can be used to "push" an adjacent pole in an opposite direction, such as during braking operations. Converting the current phasor angle 318 between the stationary and synchronous reference frames can be done using the following equation:

$$\theta_e = (P/2)\theta_m, \tag{1}$$

where $\theta_e$ is the current phasor angle in the synchronous reference frame, P is the number of stator poles, and $\theta_m$ is a current phasor angle in the stationary reference frame. Regardless of the current phasor angle, it can be broken down into a D-axis component and a Q-axis component. In general, for the motors and generators described herein, the D-axis component acts to "charge" or modulate the field within a rotor pole while the Q-axis component acts to impart a force or torque onto the rotor pole. In this embodiments and other embodiments described herein, the power transfer does not interfere with the torque performance of the electric machine because the modulated field is orthogonal to the primary torque production channel. The D-axis may also be used for parallel transmission of data signals directly from the stator windings to the rotor windings or as a component of control signal, or both, as described throughout this disclosure in detail.

Figure 3B:
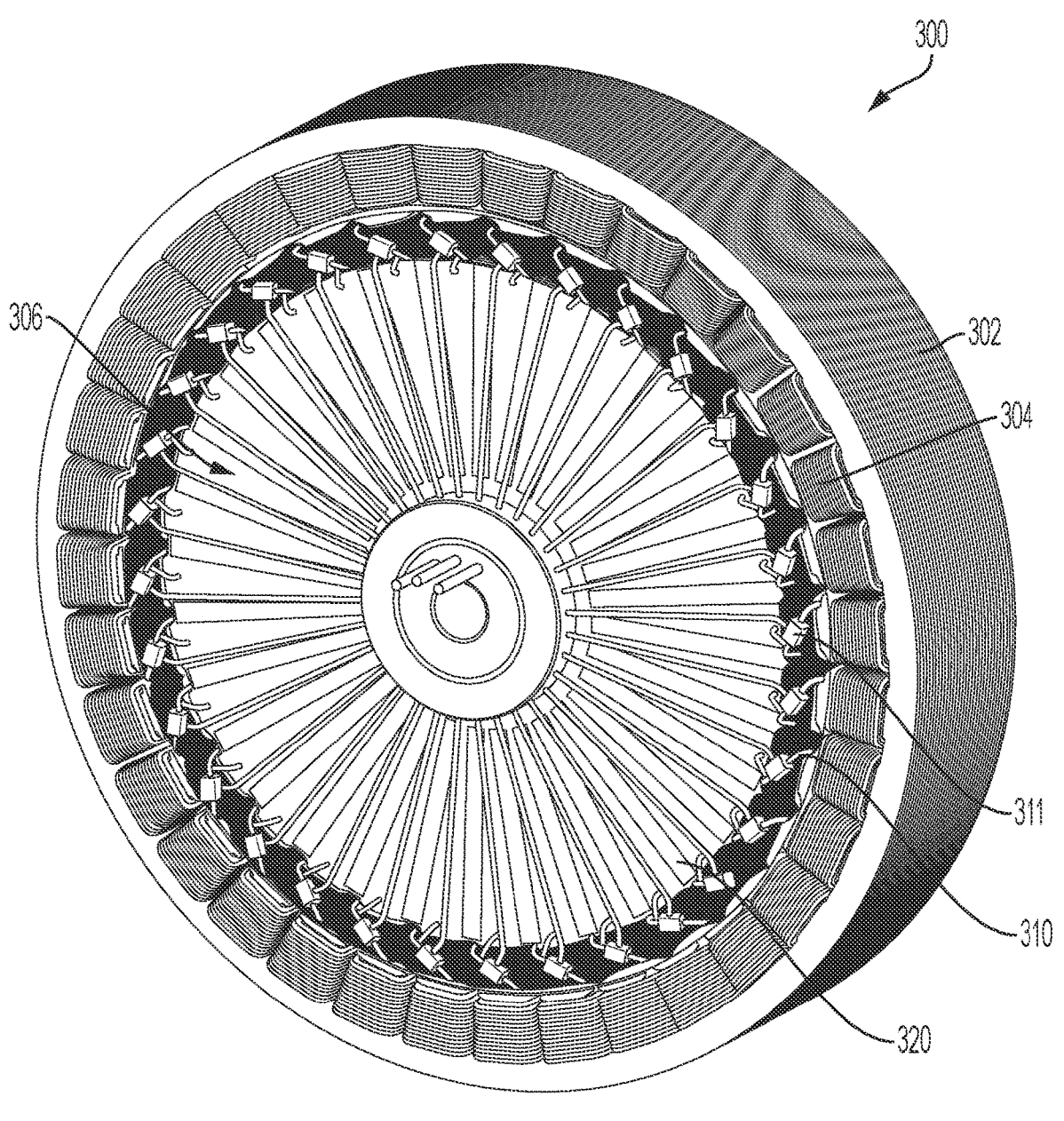

FIGS. 3A and 3B are a side view and a perspective view of an example electric machine 300. The electric machine 300 includes a stator 302 defining multiple stator poles with associated stator windings 304. A "motor pole" may be described as a topological section on either a stator or rotor that emits a single polarity of magnetic flux across the air gap at a given point in time. Flux carried in the back-iron of the stator or rotor is considered when determining the pole number or location in an electric motor. Poles are typically characterized by high field regions, which may exceed 5,000 gauss. Poles may result from permanent magnets or from electromagnetic fields. While the number of poles on a stator or rotor are often fixed during manufacturing, in some implementations described herein, the number of poles for the rotor, stator, or both, can be changed during operation.

While the presently illustrated stator 302 is presently illustrated as having salient, concentrated stator windings 304, distributed and/or non-overlapping stator windings can similarly be used without departing from this disclosure. A rotor 306 defines multiple rotor poles 308 with associated rotor coils 310.

Further details on various stator and rotor topologies and drive mechanisms can be found in U.S. Provisional patent application Ser. No. 17/151,978, the entirety of which is hereby incorporated by reference.

As illustrated, each of the rotor coils 310 is shorted to an active rectifier 311. While illustrated as having an active rectifier for each coil 310, other arrangements can be used without departing from this disclosure. For example, multiple rotor coils can be conductively coupled to a single active rectifier in series or in parallel. Examples of active rectifier topology are provided throughout this disclosure. Component selection for the active rectifier is a function of a variety of factors, including voltage drop, reverse voltage breakdown, and recovery time. Different components may be used depending on the desired operating conditions. The active rectifier allows current to selectively travel in a desired direction through each of the rotor coils 310 and at a desired magnitude, with reduced ripple compared to passive rectification schemes.

Although the active rectifiers 311 are shown as being disposed on respective coils 310, in some implementations the active rectifiers are located elsewhere in or on the rotor. For example, in some implementations, the active rectifiers 311 are disposed in or on the rotor core.

Figure 4A:
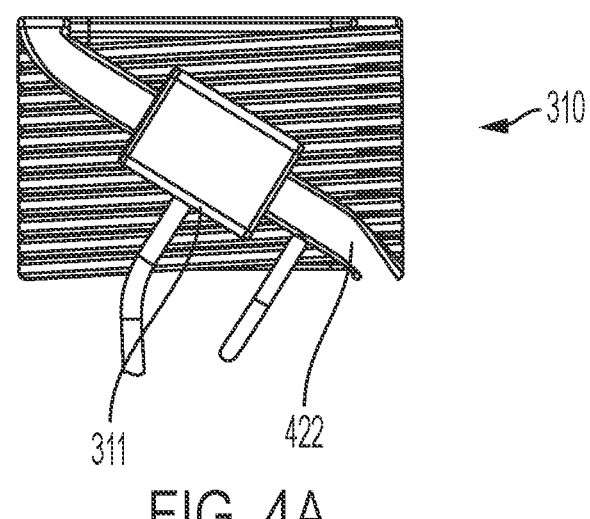
FIGS. 4A-4C are front, perspective, and side views of an example actively rectified rotor winding.
Figure 4B:
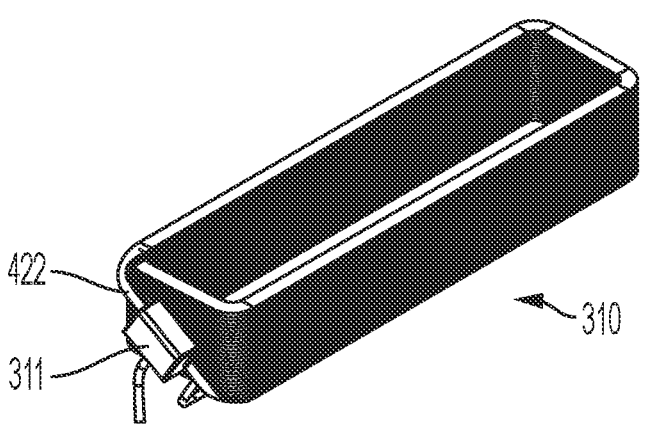

The active rectifier 311 is conductively coupled to the rotor coil 310 by a circuit coupler 422 (see FIGS. 4A-B). In some implementations, the circuit coupler 422 is an extension of the rotor coil 310 itself, e.g., an insulated length of the copper wiring that forms the rotor coil 310. In some implementations, the circuit coupler 422 is a separate component, e.g., a cable that plugs into the active rectifier 311 and is also attached (e.g., by clamps or clips) to the rotor coil 310.

The active rectifier 311 itself, in some implementations, includes an enclosure encapsulating circuit components inside the enclosure. The enclosure may be made of, for example, plastic or another insulating material.

Within the enclosure, a combination of circuit components (e.g., transistors, capacitors, diodes, inductors, and/or resistors, in some implementations integrated into integrated circuits and/or on circuit boards) implements active rectification of currents in the rotor coil 310, as described in more detail throughout this disclosure. In some implementations, a potting material fills some or all of the space inside the enclosure that is not occupied by circuit components.

In some implementations, the active rectifier 311 includes one or more coil interconnects 322. A coil interconnect 322 is a region of wire that may connect one or multiple coils or wound field poles to each other or to a separate electrical circuit. Interconnects only generate small local MMFs during operation. This coupled to the fact that interconnects are typically substantially perpendicular to the stator and rotor slots, and therefore do not significantly contribute to uniform field production across the motor air-gap. While the illustrated implementations include active control circuitry (e.g., the active rectifier 311), other discrete components can be included within the coil interconnects 322. For example, a passive rectifying component, such as a diode, can be included. Alternatively or in addition, active circuitry, such as a transistor or a tetrode, can be included.

The rotor poles 308 are topologically and electrically fixed upon a rotor surface. A fixed-pole rotor is a rotor in which the poles are topographically and electromagnetically fixed or held static relative to a synchronous reference frame of the motor, for example, rotor 306 is a fixed-pole rotor. That is, the rotor 306 will always rotate at substantially the same speed as, or in sync with, the drive frequency provided by the stator (allowing for inherent levels of torque ripple). The synchronous reference frame is the same as the magnetic reference frame. Fixed-pole motors are often referred to as "synchronous" motors for this reason. Field wound rotors, surface PM rotors, reluctance motors, and interior PM rotors are all examples of fixed pole rotors. Fixed pole rotor designs maximize the utilization of ferromagnetic material in the rotor D-axis 312 region (center of a rotor pole), and in the case of wound field rotors, ensuring that the effective magnetic center aligns with the D-axis 312. As a result, fixed pole rotors are considered to be more efficient than shifting pole rotors for a given size and power rating; however, fixed pole rotors are difficult to control in that maintaining a fixed pole rotor at a constant current phasor angle under dynamic load conditions and dynamic running speeds is challenging. For example, accelerating the motor or maintaining speed during a change in load involves actively adjusting the current phasor angle 318, the current magnitude, and/or drive frequency based on input from a position sensor 316. The concepts described herein are primarily applicable to synchronous machines as the stator magnetic field and the rotor, for example, the rotor 306, maintain synchronicity with one another during operation.

In contrast, the poles of shifting pole rotors are not topographically or electromagnetically fixed and will move under operation relative to the stationary reference frame. That is, the rotor will always "slip" and lag behind, or be out of synch with, the drive frequency provided by the stator. As such, these motors are often referred to as "asynchronous" motors. Examples of shifting pole rotors include wire wound and squirrel cage induction rotors, armature wire wound rotors, brush motors, and other similar motors. While shifting pole rotors are able to self-regulate the current phasor angle 318 during operation, design concessions between D-axis ferromagnetic material and Q-axis field windings must be made to enable the pole to move evenly across the rotor surface. As a result, electrical resistance in such motors is higher, more starting current is required, and field strength is lower in shifting pole rotors of a given size and power rating.

The field of the rotor 306 is ultimately configured to be energized by a magnetic field produced by the stator windings 304 as the magnetic field transfers power to the rotor field, which is captured and then used as a source for the energization. The rotor 306 and the stator 302 are configured to move relative to one another responsive to the energized rotor field. The rotor 306 is substantially energetically isolated from components of the stator 302 except for the stator windings 304.

Within electric machines, a stator and a rotor can be coupled to enable power transfer, data signal transfer, and/or field modulation during operation. Couplings may be classified as direct coupling or indirect coupling. Direct coupling occurs between the stator and rotor along the primary operating air gap, such as the air gap 314. Indirect coupling occurs along a secondary interface away from the primary operating air gap.

Direct couplings are typically characterized as inductively coupled, for example, a squirrel cage induction rotor is considered to be directly coupled to the stator. While direct coupling is common and easily controlled in an asynchronous machine, direct coupling with synchronous machines, for reasons described throughout this disclosure, are difficult to control. For example, a rotor position often needs to be known to ensure that a current magnitude and/or frequency is properly maintained.

Indirect couplings operate along a secondary coupling and may be radial oriented or axially oriented, and may communicate via electrical contacts, inductive couplings along a separate air gap, capacitively couplings, or optically couplings. While a secondary coupling may be used for a variety of functions to improve the efficiency and/or overall controllability of an electric machine, additional components are often required that can increase the weight, complexity, failure frequency, and costs (both operating and capital costs) of machines that take advantage of such systems.

Energetically isolated motors and generators, such as those described throughout this disclosure, primarily (within standard electromagnetic shielding tolerances) use direct coupling to transmit power and signals between the stator and the rotor without the use of an indirect or secondary coupling. The electric machines described herein include direct coupling between the rotor 306 and the stator 302 for both power coupling and signal coupling. Direct signal coupling can be used, for example, to control a state of the active rectifier 311. Direct power coupling can be used, for example, to provide power for the active rectifier 311 via the rotor field windings and, ultimately, back to the rotor field windings (e.g., which may be controlled by the direct signal coupling).

The rotor 306 includes permanently magnetic material 320 embedded within the rotor 306. As illustrated, the rotor 306 includes channels of permanently magnetic material 320 arranged in a substantial spoke like arrangement in between each rotor pole; however, other arrangements of the permanently magnetic material 320 can be used without departing from this disclosure. The permanently magnetic material 320 can include a variety of material, including ferrite, AlNiCo, SmFeN, NdFeB, or SmCo. While lower power permanently magnetic material is typically used, higher powered magnetic material in lower quantities can be used without departing from this disclosure. The permanently magnetic material 320 can extend across the entire longitudinal length of each rotor pole 308 or partially across each rotor pole 308. In some implementations, the permanently magnetic material 320 can be made-up of multiple layers or laminations.

As illustrated, the permanently magnetic material 320 results in a net magnetic force that is substantially between each rotor pole 308. In some implementations the permanent magnetic material can be arranged such that the net magnetic force from the permanent magnetic material 320 is aligned with the rotor poles 308. In general, the arrangement of the permanent magnetic material 320 is dependent upon the desired cross-sectional flux density of the magnetic materials within the rotor. In implementations where the permanent magnetic material 320 is located within a rotor coil 310, the flux for each set of permanent magnetic material 320 can be individually adjusted and/or modulated by adjusting the charge of the surrounding rotor coil 310. Such implementations also protect the magnets from demagnetization that can be caused by a strong stator field. In implementations where the permanent magnetic material 320 is not surrounded by a rotor coil, an adjustment in flux caused by the stator field can affect multiple sets of permanent magnetic material 320 within the rotor 306. While illustrated and described as including permanently magnetic material 320, the subject matter of this disclosure is still applicable to rotors that do not include permanent magnetic materials.

Figure 4C:
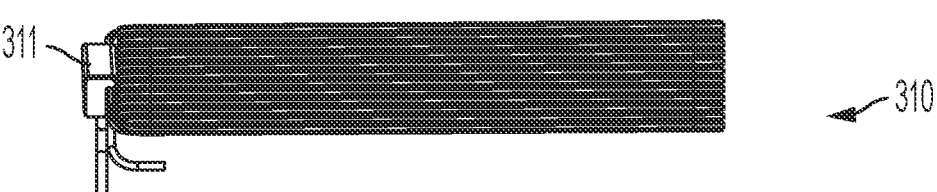

FIGS. 4A-4C are front, side, and perspective views of example rotor coils 310. As illustrated in FIGS. 3A and 3B, each rotor coil 310 acts as its own winding with a single coil around each pole, such as rotor pole 308. As such, the rotor can be described as including concentrated, salient, and/or non-overlapping windings. In some implementations, the winding direction of each coil can alternate with each adjacent rotor pole 308. For example, in implementations using a stator with salient, concentrated, and/or non-overlapping windings, such an arrangement can be used. Alternatively, the rectification direction of the active rectifier 311 can be controlled to alternate with each adjacent pole with similar results. In some implementations, the winding direction does not need to alternate between adjacent rotor poles. For example, in implementations using a stator with distributed windings, such an arrangement can be used. While the rotor coils 310 are illustrated as a single coil of wire shorted upon itself (for example, via the active rectifier 311), other geometries can be used so long as each coil shorts upon itself and does not overlap with an adjacent coil. In some implementations, poles with like polarities can be shorted to one another, for example, to share an active rectifier. Such configurations are described throughout this disclosure. Similarly, poles with opposite polarities can be shorted to one another depending on the winding direction of each pole. In general, rotor coils are often configured such that the electrical current skin depth of the power transfer frequency fully penetrates the conductor of the coil. "Electrical current skin depth" in the context of this disclosure refers to the depth from the surface of a conductor at which electric current mainly flows, particularly eddy current induced from a magnetic field changing at a given frequency. For a given material, skin depth can be calculated as:

$$\delta \approx 1/\sqrt{\rho f \mu \sigma} \tag{2}$$

where 'f' is the magnetic switching frequency, $\mu$ is the magnetic permeability (in H/mm) of the material, and $\sigma$ is the electrical conductivity of the material. Achieving full skin depth penetration within the rotor coils 310 allows for a uniform inductance within the rotor coils 310. In some implementations, drive frequencies can extend between 0 hertz and 20 hertz. In some implementations, drive frequencies can range between 100 hertz and 3000 hertz. In general, the rotor coils are arranged such that a decay of a magnetic flux within the rotor is resisted by current within rotor coils in response to a magnetic field shift from the stator.

Traditionally, synchronous motors do not have magnetizing current to magnetize a material so magnets have to be magnetized at the factory or prior to installation. To that effect, if the magnetic material demagnetizes under operation (e.g., because the stator is putting too much of a load on it) the magnet can be damaged, or the motor can be rendered inoperable entirely. The rotor coils 310 help protect the permanent magnets from the potential demagnetization effects of the stator.

The active rectifier 311 coupled to each of the rotor coils 310 helps reduce torque ripple in the motor during operation. The active rectifier 311 does this, in part, by reducing a delay of energization of flux in an air gap 314. While the rotor coils 310 resist a decay of a magnetic flux within the rotor by current within rotor windings in response to the magnetic field shift, the rotor coils 310, without rectification, perform this function regardless of the portion of the drive cycle the rotor coils 310 are exposed to. That is, unrectified rotor coils are symmetrical to both a positive portion of a drive frequency and a negative portion of the drive frequency. Such an arrangement can produce a measurable amount of torque ripple.

For rotor coils that are passively rectified, the rotor coils allow a first change of flux by inducing a first voltage in a first direction within the rotor windings until the first current decreases to zero, allowing a second change in flux to induce a current in a second direction within the rotor windings. In an actively controlled rotor circuit, volt-seconds of energy can be added to the rotor without decreasing the rotor pole current to zero. For example, the current within the rotor windings can be selectively unidirectional, significantly reducing torque ripple during operations.

For example, in various implementations, a DC component of the rotor currents is at least twice a magnitude of ripples in the rotor currents, at least five times a magnitude of ripples in the rotor currents, at least ten times a magnitude of ripples in the rotor currents, at least twenty times a magnitude of ripples in the rotor currents, at least fifty times a magnitude of ripples in the rotor currents, or at least 100 times a magnitude of ripples in the rotor currents.

In operation, the current flowing through the coils 310 and the active rectifier 311 can be allowed to reduce to a desired amount, such as zero or non-zero, or are actively brought to zero or non-zero by the active rectifier 311. In instances where the current is allowed to reduce to the desired amount, the operation can be performed by reducing the current phasor angle 318 to less than 90° (that is, "pulling" the pole, rather than "pushing" the next adjacent pole). The current within the coil 310 and the rectifier 311 are allowed to decay within a duration of time that the current phasor angle is less than 90°. Such a duration of time can range from a few milliseconds to two seconds depending upon the speed and saturation of the rotor. A resulting field can be energized through interaction with the D-axis of the rotor field coil which may be done through D-axis modulation or, in some embodiments, the modulation of the current phasor angle or magnitude of the machine (typically between 0°-90°).

In some implementations, the active rectifier 311 can actively reduce the decay time significantly. For example, the decay time may be reduced by ten times, 100 times, 1000 times, or more, compared to passively-rectified system. After decay, the current phasor angle (or phasor magnitude) is increased as current within the coils 310 increases. Throughout this process, the current magnitude can be modulated in conjunction with the current phasor angle 318 and the direction of rectification to counteract ripple current when adjusting current phasor angle 318.

During certain motor operations, for example, during locked-rotor conditions (e.g., start-up), high levels of charge are used when operating between the Q-axis (90°) and the negative D-axis (180°), with substantial inductive decay (e.g., maintaining a field). Under such a control scheme (combined with the coils 310), the rotor field can be modulated based upon the current phasor angle 318 or current magnitude. This can translate into a wide operating envelope during operations. The negative D-axis to Q-axis operation provides a shielding effect that protects (at least partially) the permanent magnetic material 320, which allows less magnetic material, lower coercivity material, or both, to be used in comparison to a permanent magnet synchronous motor. Another benefit is that the field weakening with D-axis injection is not constant, as compared to that of a permanent magnet motor. Similarly, the rotor field can be modulated by the current magnitude passing through the stator. In many cases, both the current magnitude and the current phasor angle can be adjusted simultaneously for desired rotor field modulation.

Figure 5B:
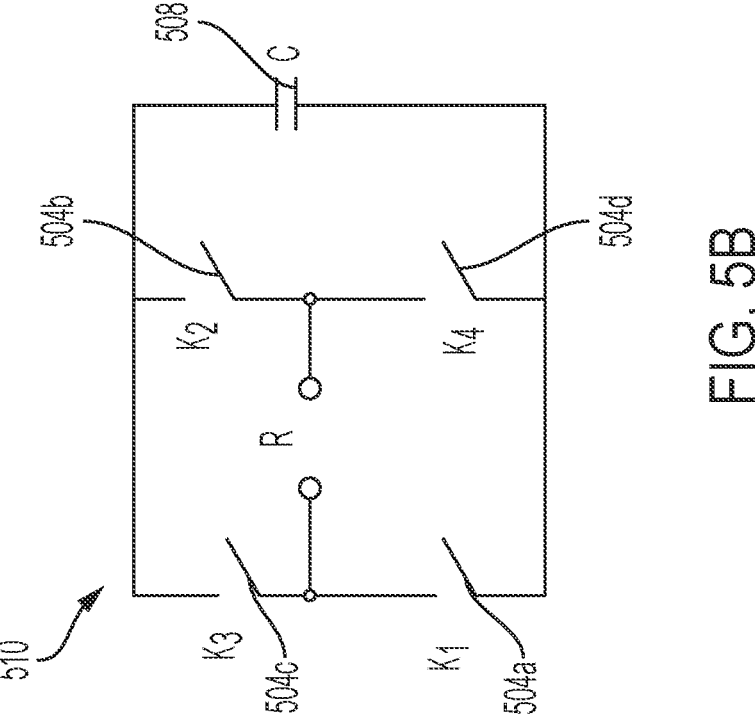
FIGS. 5A and 5B are circuit diagrams of example active rectifiers that can be used with aspects of this disclosure.
Figure 5A:
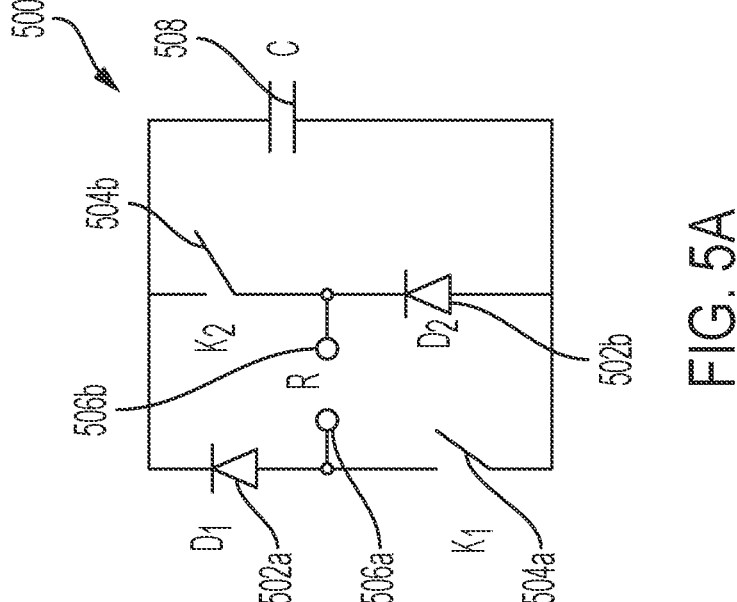

FIG. 5A is an example topology for at least part of an active rectifier that can be used for the active rectifier 311 previously described. The active rectifier includes an asymmetric bridge circuit 500 including two diodes 502a, 502b and two switches 504a, 504b. Diode 502a and switch 504a are each coupled to a first node 506a of a rotor winding, and diode 502b and switch 504b are each coupled to a second node 506b of the rotor winding. Nodes 506, each between a respective diode/switch pair, correspond to two ends of a rotor winding. A capacitor 508 is wired in parallel with the diode/switch/rotor winding assembly. Examples of circuit components that control the switches 504a, 504b are not shown in FIG. 5A, but are described in reference to FIGS. 6A-7B.

Several types of diodes can be used, for example, a p-n junction diode, a gas diode, a Zener, or a Schottky diode. In some implementations, when a Schottky diode is used, the Schottky diode can be a silicon carbide diode. Diode selection is a function of a variety of factors, including voltage drop, reverse voltage breakdown, and recovery time. Different diodes may be used depending on the desired operating conditions. While several types of diodes have been listed, other diodes may be used without departing from this disclosure.

In some implementations, each switch 504a, 504b includes one or more transistors. Several types of transistors can be used, for example, bipolar junction transistors, FETs (e.g., MOSFETs), heterojunction bipolar transistors, and insulated-gate bipolar junction transistor. In some implementations, the switches 504a, 504b can include relays. Because rotor winding currents pass through the switches 504a, 504b, transistors included in the switches 504a, 504b may be rated for high currents, e.g., multiple amps.

FIG. 5B shows an example full-bridge rectifier circuit 510. The full-bridge rectifier circuit 510 operates similarly to the asymmetric bridge circuit 500, except that diodes 502a, 502b are replaced by switches 504c, 504d. This replacement may, in some implementations, reduce conductions losses in the full-bridge rectifier circuit 510 compared to in the asymmetric bridge circuit 500, at least because each switch may have a lower effective on-resistance than the corresponding diode. Besides switches 504c, 504d, the full-bridge circuit also includes switches 504a, 504b and capacitor 508, as described in reference to FIG. 5A. Examples of circuit components that control the switches 504a, 504b are not shown in FIG. 5B, but are described in reference to FIGS. 6A-7B.

In general, the stator windings may be driven with three types of signals: torque control signals, power transfer signals, and data signals. Torque control signals generate a magnetic field in the stator winding(s) that receive the torque control signals, which interact with the magnetic field of the rotor winding(s) to drive movement of the rotor with respect to the stator. Power transfer signals are modulations or modulated signals (e.g., modulated in amplitude or frequency) that transfer power wirelessly (or, inductively) from the stator to the rotor, which may ultimately be used, e.g., to energize rotor windings to generate a magnetic field for magnetomotive coupling and to power circuit(s) on the rotor. Data signals are modulations that transfer data (e.g., encoded control information) wirelessly (or, inductively) from the stator to the rotor. In some examples, a stator winding is driven with a signal that may be classified as more than one of the types of stator signals (e.g., a multi-purpose signal). For example, a stator winding may be driven with a signal that may be classified as both a torque control signal and a power transfer signal in that the signal generates a magnetic field in the stator winding to drive movement of the rotor with respect to the stator, and also transfers power inductively from the stator to the rotor. In some examples, a stator winding may be driven by one or more of these stator signals simultaneously such that the signal through the stator winding is a superimposition of the one or more of these stator signals. In some examples, the rotor windings may also be driven with torque control signals (e.g., to generate magnetic fields in the respective rotor windings to interact with the magnetic field(s) of the stator winding(s) to rotate the rotor); power transfer signals (e.g., to inductively transfer surplus power back to the stator windings); and/or with data signals (e.g., to inductively transfer data from the rotor windings to the stator windings).

A D/Q coupling approach may be taken to control a machine included in this disclosure such that a D/Q system may be established and utilized to generate and control torque in a machine using magnetic field D/Q components (controllable channels/axes), as well as to transfer power between the stator and the rotor and/or exert command over the rotor circuit.

From the perspective of a rotor winding in the synchronous D/Q reference frame, in some implementations, the torque control signals may appear as nominal DC signals; power transfer signals from the stator may appear as AC or DC signal components modulated from these nominal DC signals; and data signals may appear as AC or DC signal components modulated from these nominal DC signals.

Mathematically, in a D/Q representation, torque control currents in stator windings can be represented as $I_q = I_{mag} * \sin(\theta_e)$, $I_d = I_{mag} * \cos(\theta_e)$, and $I_z = 0$, where $\theta_e$ is the current phasor angle in the synchronous reference frame and $I_{mag}$ is the magnitude of current for a given excitation that converted to $I_q$ and $I_d$ via the Park transform. The z-axis is an axis orthogonal to the D and Q axes. In some implementations, $I_z$ is zero, or substantially zero (e.g., a field of negligible strength), and can be neglected; however, in other implementations, power transfer and/or data signal transfer may be conducted on the z-axis, given appropriate machine topology.

Power transfer and/or data signal modulations can be superimposed on one or more of these components, such that $I_{D,total} = I_D + I_{D,mod}$, $I_{Q,total} = I_Q + I_{Q,mod}$, and $I_{z,total} = I_z + I_{z\_mod}$, and each $I_{mod}$ can include power transfer signals, data signals, or both.

Operating in pure quadrature in a four pole rotor embodiment ($\theta_e = 90°$, $I_Q = I_{mag}$, $I_D = 0$, and $I_z = 0$, such that $I_{D,mod}$ and/or $I_{z,mod}$ are modulations imposed over 0 signals. However, $I_{D,mod}$ and/or $I_{z,mod}$ need not be modulations over a 0 signal. For example, if $\theta_e \neq 90°$, then $I_{D,mod}$ is a modulation over a non-zero DC value in the synchronous reference frame. Note that "DC" signals in the D/Q reference frame are nominal DC signals representing a transformation of, for example, three-phase alternating signals into the synchronous reference frame for a given operating point, and the DC signals can change for different motor states.

In some implementations, data signals included in $I_{D,mod}$, $I_{Q,mod}$, and/or $I_{z\_mod}$ are separate data signal excitations carrying independent data and can be treated essentially separately. However, in some implementations, data signals are embedded in a combination of two or more of $I_{D,mod}$, $I_{Q,mod}$, and $I_{z\_mod}$, e.g., in a modulation of current angle and/or total current magnitude. In some implementations, the rotor circuit configuration can help define the controllable axes available for interaction with the stator through data signal excitations.

"Power transfer" and associated terms refer to stator-rotor couplings that energize the rotor windings sufficiently to generate non-negligible magnetomotive force. "Data signal transfer" and associated terms (e.g., data signals) refer to stator-rotor couplings that primarily represent data transfer, e.g., do not energize the rotor windings sufficiently to generate non-negligible electromotive force.

In some cases, power transfer may be differentiated from data signal transfer by a magnitude of power transferred. For example, power transfer may be associated with at least ten times, at least 100 times, or at least 1000 times as much power transferred from the stator windings to the rotor windings as data signal transfer. In some cases, power transfer may be differentiated from data signal transfer by a magnitude of associated stator voltages. For example, stator voltages associated with power transfer may at least ten times, at least 100 times, or at least 1000 times stator voltages associated with data signals. In some cases, power transfer may be differentiated from data signal transfer by a frequency at which the transfer occurs. For example, currents and/or magnetic fields representative of data signal transfer may oscillate at frequencies that are at least ten times, at least 100 times, or at least 1000 times the frequencies of currents and/or magnetic fields representative of power transfer. In some cases, power transfer may be differentiated from data signal transfer by forms of the respective stator currents.

The relationship between the stator D-axis and rotor winding may be modeled using an equivalent circuit that includes the stator D-axis winding and rotor winding with an air gap. For example, using this technique for a three-phase wound field synchronous motor, a D-axis current ($I_S$) for power transfer may be represented by:

$$I_S = \frac{L_m}{L_S \cdot L_R + L_m \cdot L_R + L_S \cdot L_m} \cdot \frac{1}{\omega} \cdot$$

$$\sqrt{V_R^2 + 2 \cdot V_R V_S \cdot \left(1 + \frac{L_R}{L_m}\right) \cdot \cos\varphi + \left(1 + \frac{L_R}{L_m}\right)^2 V_S^2}$$

where $I_S$ is the D-axis current, $L_m$ is magnetizing inductance, $L_S$ is stator D-axis inductance, $L_R$ is rotor winding inductance, $\omega$ is frequency, $V_R$ is rotor winding voltage, $V_S$ is stator D-axis voltage, and $\varphi$ is phasor angle. If we assume $\varphi$ to be near the 90°, and leakage inductance to be small compared to the magnetizing inductance, the amplitude of $I_S$ can be approximated as:

$$I_S \simeq \frac{V_S + V_R}{\omega \cdot L_k}$$

Additionally, the power transfer between stator and rotor windings may be stepped up or down based on the turns ratio of the windings (i.e., the number of turns in each coil set).

Implementations are not limited to the D-axis coupling and Q-axis coupling examples described explicitly in this disclosure. In general, field coupling (torque control, power transfer, and/or data signals) from the stator to the rotor can be implemented across a variety of controllable channels (axes) within the motor. Torque control, power transfer, and/or data signal transfer may be performed using oscillating stator-side currents that control torque, couple or transfer power, and/or transfer data signals on one, two, or more of these axes, based on appropriate stator topologies, rotor topologies, and/or excitation patterns. In some cases, axes are shared between functions, and in some cases an axis is dedicated exclusively to a single function. For example, power transfer may be performed on a first axis, and data signals may be transmitted over a second, different axis, or one axis may be used for both, given appropriate rotor circuit topology.

In some examples, the stator and rotor are controlled via other controllable channels (axes). For example, the electric machine may be described in terms of another synchronous reference frame that may be referred to as the MK reference frame. The MK reference frame includes a mutual inductance axis (M-axis), a leakage inductance axis (K-axis), a quadrature axis (Q-axis), and a null axis (N-axis), each of which may be a controllable axis that may be used to control torque, transfer power, and/or transfer data signals in the electric machine as described above (e.g., with respect to the D-axis, Q-axis, and N-axis). For example, by introducing modulations into the M-axis, D-axis, Q-axis, and/or N-axis, the rotor can receive power transform signals and/or data signals inductively from the stator windings.

Like the direct-quadrature-null-rotor (DQNR) reference frame having the D-axis and Q-axis described herein, a controller may translate between a stationary reference frame (e.g., including the phases of the stator and the rotor as controllable axes) and the MK reference frame, or between the DQNR reference frame and the MK reference frame, using an appropriate transform. For example, an MK transform applied to transform from the A, B, C, R (stationary) reference frame to the (rotating) MK reference frame may be:

$$T_{ABCR \rightarrow MKQN} = \frac{1}{\sqrt{3}} \times$$

$$\begin{bmatrix} \cos\theta & \cos\left(\theta - \frac{2\pi}{3}\right) & \cos\left(\theta + \frac{2\pi}{3}\right) & \sqrt{\frac{3}{2}} \\ \cos\theta & \cos\left(\theta - \frac{2\pi}{3}\right) & \cos\left(\theta + \frac{2\pi}{3}\right) & -\sqrt{\frac{3}{2}} \\ -\sqrt{2}\sin\theta & -\sqrt{2}\sin\left(\theta - \frac{2\pi}{3}\right) & -\sqrt{2}\sin\left(\theta + \frac{2\pi}{3}\right) & 0 \\ 1 & 1 & 1 & 0 \end{bmatrix}$$

For example, to determine $I_M$, $I_K$, $I_Q$, and $I_{Null}$, the motor controller 135 may multiply the MK transform by a one dimensional current matrix of $I_A$, $I_B$, $I_C$, and $I_R$ to obtain a one dimensional current matrix in the MK reference frame of $I_M$, $I_K$, $I_Q$, and $I_{Null}$.

Relative to control schemes for wound field synchronous motors using the direct axis (D-axis), quadrature axis (Q-axis), null axis (N-axis), rotor field axis (R-axis) (DQNR) reference frame, control schemes using the MK reference frame can reduce control complexity by eliminating or nearly eliminating a cross-coupling between the D-axis and R-axis. Additional details and description of the MK reference frame and its use in an electric machine may be found in co-pending U.S. Provisional Application 63/219, 096, filed Jul. 7, 2021, which is hereby incorporated by reference.

In addition, although some embodiments according to this disclosure do not include stator-rotor coupling elements besides windings, some embodiments do include additional coupling elements, e.g., brushes, slip-rings, optical transmitters/sensor, etc. These additional coupling elements may, in some embodiments, be used for data signal transmission and/or power transfer, representing alternative controllable axes alongside the field-coupled axes.

Besides the various ways in which functions can be distributed across different controllable axes, functions can also be distributed across different rotor windings. A first rotor winding may be used for data signal transfer, a second, different rotor winding may be used for power transfer, and torque control may be performed by couplings to one or both of the first and second rotor windings, or by a coupling to a third winding. Moreover, windings that perform different functions may be exposed to the same flux from the stator (e.g., form a pole pair), or may be exposed to different fluxes. In some implementations, one rotor winding is used for both data signal transfer and power transfer.

For example, in FIG. 16 (described in more detail below), windings 1602*a* and 1604*a* form a first pole pair exposed to first magnetic fluxes, and windings 1602*b* and 1604*b* form a second pole pair exposed to second magnetic fluxes. In some implementations, power transfer is conducted through both magnetic fluxes, e.g., in order to energize windings 1604*a*, 1604*b* by AC power transfer through windings 1602*a*, 1602*b*. However, data signals, as distinct from power transfer signals, may be transferred through the first magnetic fluxes, the second magnetic fluxes, or both magnetic fluxes. For example, data signals in the first magnetic fluxes may be extracted (e.g., from currents/voltages in rotor windings 1602*a* and/or 1604*a*) and used to determine active rectifier switching not only for windings 1602*a*, 1604*a* but also for windings 1602*b*, 1604*b* and for other windings in the rotor, without data signals necessarily also being included in the second magnetic fluxes.

Figure 16:
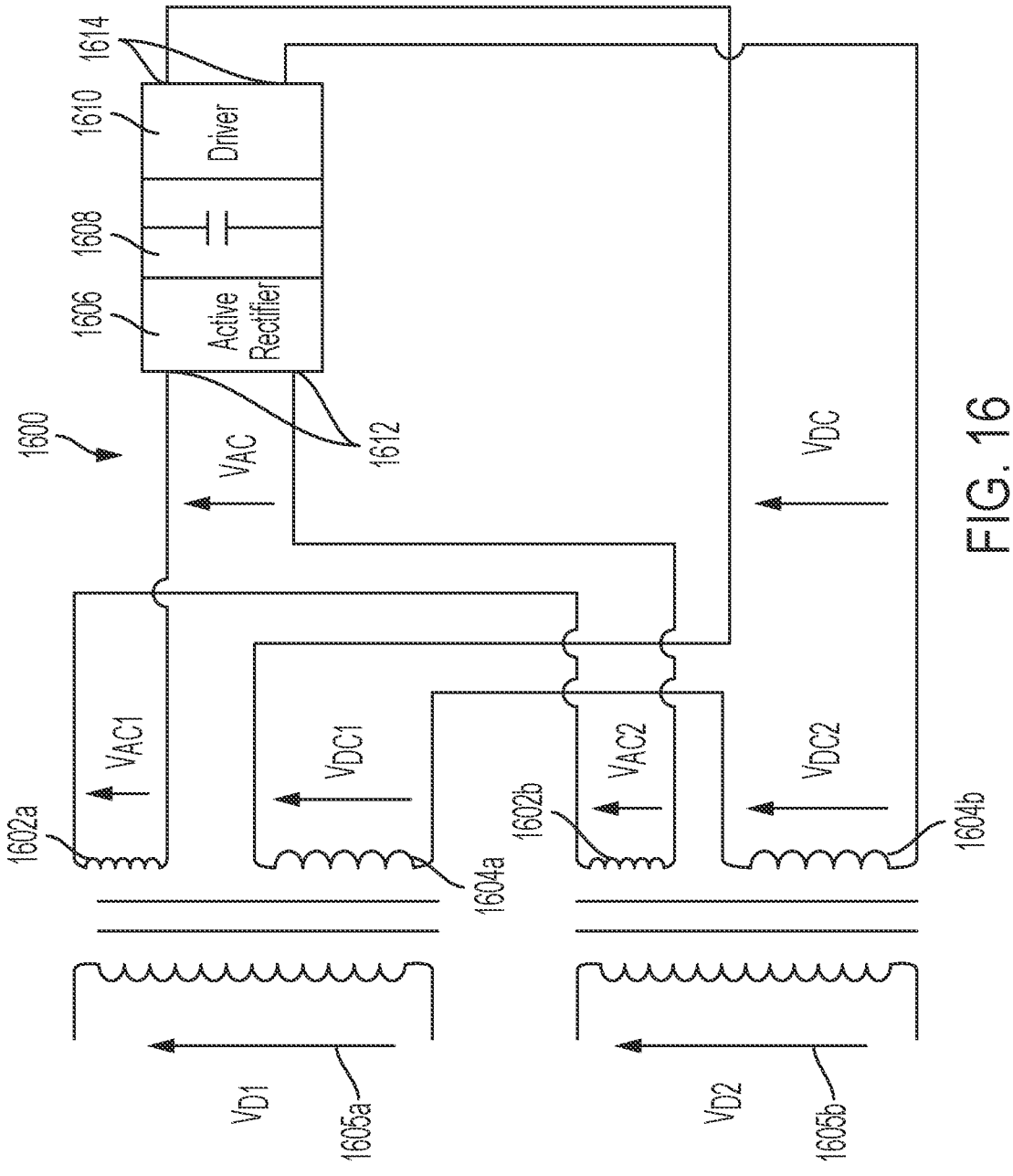
FIG. 16 is a schematic diagram of a circuit topology that can be used with aspects of this disclosure.

In an example of function-winding linkage in a self-synchronizing rotor control scheme in the context of FIG. 16, a state of the stator (e.g., voltages and/or currents in stator windings) may be estimated based on voltages and/or currents in rotor winding 1602*a*, and the result of the estimation used to control active rectification not only in rotor winding 1602*a* but also, in some implementations, in other rotor windings, e.g., rotor windings 1604*a*, 1602*b*, 1604*b*, and/or other rotor windings.

Various control schemes may be used for control of active rectifier circuits. Some control schemes are "self-synchronizing" in that they do not require the transmission of special data signals from the stator to the rotor; rather, rotor-side circuits control the active rectifier circuits based on currents induced in the rotor windings by the same D-axis and/or Q-axis currents that energize the rotor windings and drive movement of the rotor (e.g., based on power transfer signals and/or torque control signals). Other control schemes are "signal-driven" in that they include encoded data signals e.g., data signals that are embedded into stator winding-to-rotor winding D-axis currents and/or Q-axis currents (e.g., embedded into power transfer signals or torque control signals) to pass motor status data from the stator to the rotor. Signal-driven control schemes may alternatively or additionally include data signals on an axis separate from axes used for power transfer and/or torque control. Some control schemes include both self-synchronizing and signal-driven features.

Because stator-side currents may correspond to stator-side voltages, a scheme including signals embedded in currents may correspond to an equivalent scheme including signals embedded in voltages. Implementations described in this disclosure in reference to signals in stator-side voltages may be equivalent to, and may also describe, signals in stator-side currents, and vice-versa.

These schemes do not necessarily require additional stator-to-rotor coupling elements; rather, in some implementations, signals are transmitted using the stator windings and rotor windings that are already used for rotor winding energization and movement. This can help reduce costs and increase performance and flexibility compared to schemes that incorporate special detectors, sensors, wired or wireless connections, or brushes to transmit signals from stator to rotor.

FIG. 6A shows an example circuit schematic for rotor control. In this example, a rotor winding 600 is coupled to an active rectifier circuit 602 that rectifies currents in the rotor winding 600. An estimator unit 604 is configured to measure or estimate rotor current $I_R$ and rotor voltage $V_R$ and, based on these values, determine an estimated stator AC voltage $V_S$. Based on $V_S$, the estimator unit 604 controls switchable elements of the active rectifier circuit 602 to impose the desired timings and levels on the rotor currents.

For example, for some configurations of the stator and voltage windings, the stator voltage $V_S$ is related to $I_R$ and $V_R$ by the equation $V_S=L_k \cdot dI_k/dt+V_R$, where $L_k$ is an effective leakage inductance between the stator and rotor and $I_k$ is the rotor leakage current (the injection component of the rotor current). Rotor-side measurement or estimation of $I_k$ and $V_R$ therefore allows for the estimation of $V_S$. This is a self-synchronizing calculation because $V_S$ is estimated based on rotor currents/voltages induced by power transfer signals and/or torque control signals, not based on distinct data signals.

While this equation represents one possible model of the stator-rotor system, other models may alternatively be used to estimate stator-side values based on voltages and/or currents in the rotor windings. For example, a digital memory in the estimator unit 604 may store one or more mathematical models of the stator-rotor system and use these models in conjunction with digital logic to determine estimated stator signal parameters.

Examples of control functions that may be performed based on $V_S$ include one or more of the following. A phase of a stator AC voltage is estimated, and the rotor current/voltage waveform is controlled in quadrature to control power transfer (e.g., to maximize power transfer). A frequency of the stator AC voltage is estimated, and the rotor current/voltage waveform is controlled to have a frequency matching the frequency of the stator AC voltage or to have a different predefined relationship with the stator AC voltage. An amplitude of the stator AC voltage is estimated, and the rotor voltage waveform is controlled to have an amplitude matching the amplitude of the stator AC voltage or twice the amplitude of the stator AC voltage, or to have a different predefined relationship with the stator AC voltage.

It may not be necessary to measure or estimate both $V_S$ and $I_S$; rather, in some implementations only one of these values is measured or estimated, and control functions are performed based on that measurement or estimation.

FIG. 6B shows a detailed example of a self-synchronizing control scheme. A rotor winding 600 is coupled to an active rectifier circuit 602 that rectifies currents in the rotor winding 600. An estimator unit 606 is configured to measure or estimate rotor current $I_R$ and rotor voltage $V_R$ and, based on these values, determine an estimated stator AC voltage $V_S$, an estimated stator AC injection frequency $f_s$, and an estimated stator AC injection phase $\varphi_s$.

Based on the injection frequency $f_s$, a converter unit 608 determines a corresponding rotor current set point $I_{R,Sp}$. The determination is made based on a predetermined relationship between $f_s$ and $I_{R,Sp}$. For example, in some implementations more power is transferred at lower stator AC injection frequencies, such that the predetermined relationship dictates $I_{R,Sp}$ having an inverse relationship to $f_s$.

The rotor current set point $I_{R,Sp}$ and the measured or estimated rotor current $I_R$ are fed into a comparator 610 that provides an input to a gate drive unit 612, the input being used by the gate drive unit 612 to cause the rotor current to match the rotor current set point. For example, in some implementations, the rotor phase $\varphi_R$ is adjusted to increase or decrease a relative phase between the stator AC voltage and rotor voltage/current based on the estimated stator AC injection phase $\varphi_S$. The relative phase adjusts an amount of power transferred and therefore regulates the rotor current.

The gate drive unit 612 controls switching elements (e.g., transistors) in the active rectifier circuit 602, e.g., by modulations of transistor gate or transistor base voltages.

In this example, the estimated stator AC voltage $V_S$ is not fed directly into the gate drive unit 612, the comparator 610, or another rotor logic unit; however, in some implementations $V_S$ is also, or instead, used in logic operations used to control elements of the active rectifier circuit 602.

In various implementations, other logic operations besides the ones in this example may be used to cause the rotor currents/voltages to have a particular magnitude, frequency, phase, or other parameter, based on measured or estimated rotor currents and/or voltages induced by stator voltages. Estimator units may take, as input, data besides measured or estimated $V_R$ and $I_R$; for example, instead of or in addition to measuring or estimating these values, a rotor circuit may detect polarity-switching events in $V_R$ and/or $I_R$ and make estimations based on those events. In addition, besides the example estimated stator-side parameters $V_S$, $f_s$, and $\varphi_s$, other stator-side parameters may be estimated, e.g., stator current $I_S$ or stator current/voltage polarity switching events. Phase-locked loop methods may be used to synchronize the rotor frequency to the stator frequency, to set a particular relative phase of the rotor frequency, or to perform other rotor-side controls.

Figure 7B:
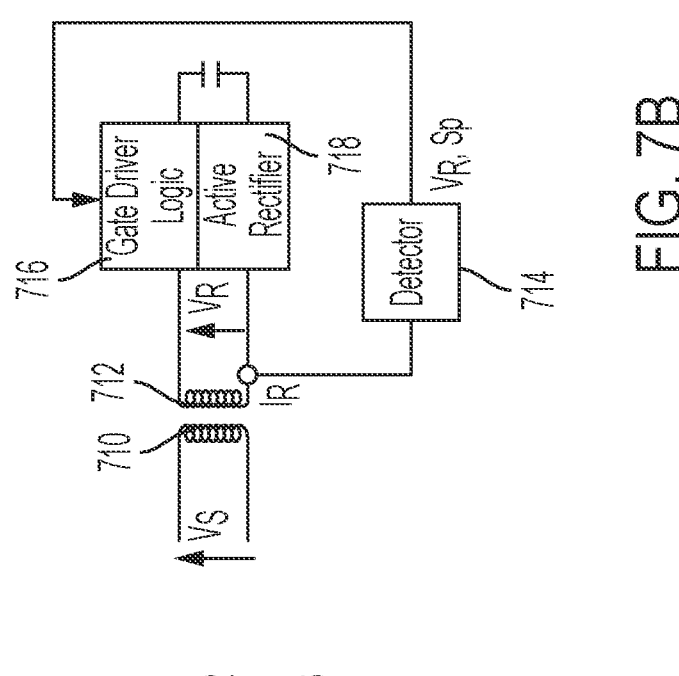
FIG. 7B is a schematic diagram of an example rotor control circuit topology that can be used with aspects of this disclosure
Figure 7A:
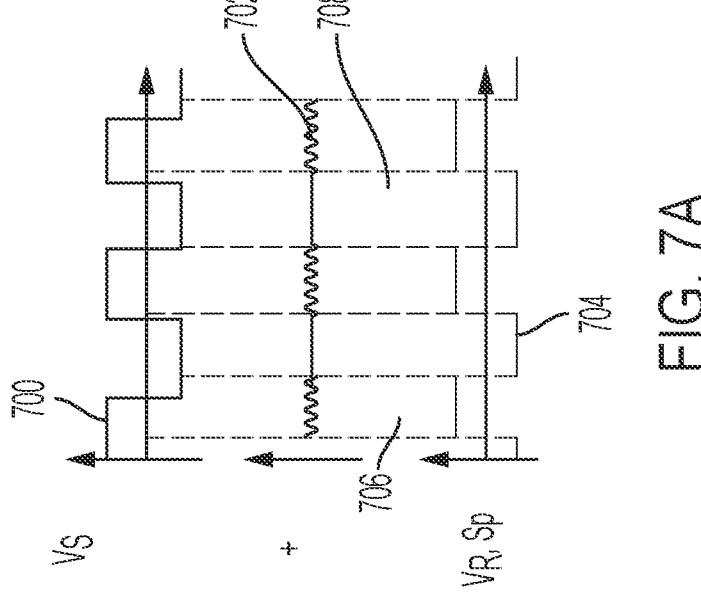
FIG. 7A is a plot of voltages over time for components of an example electric machine

FIG. 7A shows an example of stator-side voltages used in a signal-driven rotor control scheme. Stator-side power transfer voltages 700 are used to perform power transfer to rotor windings, as described throughout this disclosure. However, in addition to the power transfer voltages 700 (which could equally be, for example, torque control voltages, in various implementations), an additional data signal 702 is embedded in the stator winding voltage and, in this example (not universally), along the same controllable axis as the power transfer voltages 700. The data signal is used by a detector unit in the rotor to control a resulting rotor voltage set point 704. In this example, both power transfer and data signal transmission are performed over the D-axis in the synchronous reference frame, and both couplings are to the same rotor winding 712. However, as noted above, this need not be the case in general.

The data signal 702 is configured to have a significantly higher frequency than the power transfer voltage 700 that is also coupled along the same controllable axis as the data signal 702. For example, in some implementations the power transfer voltage or torque control voltage has a frequency between 100 Hz and 500 Hz, and the data signal has a frequency between 1 kHz and 10 kHz. In addition, the frequency of the data signal may be less than two times a switching frequency of the stator inverter, e.g., less than $\frac{1}{10}$ of the switching frequency of the stator inverter.

Data signals and power transfer signals need not have a particular frequency relationship to torque control signals and the underlying movement (e.g., rotational frequency) of the rotor. For example, data signals and power transfer signals need not be higher-order harmonics of torque control signals. Rather, the drive frequency (frequency of torque control signals) may be independent of frequencies of other signals (e.g., power transfer signals and data signals), and changes in motor operating state need not be reflected in corresponding changes in, for example data signals. For example, changing rotor speeds can correspond synchronously to changing torque control speeds, while data signal frequencies and/or power signal frequencies can be maintained constant or can be modulated for FM data transmission.

For example, during a first mode of operation, the torque control signal may have a frequency $f_1$; during a second mode of operation, the torque control signal may have a frequency $f_2$ different from $f_1$; and data signals and/or power transfer signals during both modes of operation may have a constant frequency or a frequency that modulates from a constant frequency to perform FM data transfer.

This decoupling of the different stator-rotor interactions provides enhanced flexibility to rotor-side circuit designs, which need not be restricted to signal transfer based on rotor operating condition.

In the example of FIG. 7A, the data signal 702 transmits binary on/off data to a rotor winding. When the data signal 702 is on/active (e.g., during timespan 706), the rotor voltage set point 704 is controlled to be positive. When the data signal 702 is off/inactive (e.g., during timespan 707), the rotor voltage set point 704 is controlled to be negative. Therefore, the data signal 702 causes the rotor voltage set point 704 (and therefore the rotor voltage, ignoring non-idealities and switching delays) to have a frequency matching the power transfer voltage 700 with a 90° phase lag.

Operationally, the example control scheme of FIG. 7A may be implemented by including a high-pass or band-pass filter in a detector unit in the rotor, such that the detector unit can isolate the data signal 702 from the power transfer voltage 700 and adjust the rotor voltage set point 704 accordingly.

The example of FIG. 7A includes simple binary data transmission to control a polarity of rotor voltage. However, many other types of data may be sent using the methods described here. For example, besides mere polarity information, actual set point values for rotor current, rotor voltage, rotor frequency, and/or rotor phase could be sent by appropriate configuration of stator-side data signals and complementary configuration of rotor-side detector units and other switching and logic elements. The data signal may be in one or more of a variety of formats. For example, amplitude modulation (AM) and/or frequency modulation (FM) may be used to transmit data in the data signal from the stator to the rotor.

FIG. 7B shows a schematic diagram of an example topology implementing the example signal-driven rotor control scheme of FIG. 7A. Data signals, which may encode control information among other information, are embedded in a voltage in a stator winding 710 and induce corresponding voltages in a rotor winding 712. A detector unit 714 measures an overall rotor current $I_R$ (in other implementations, other rotor parameters may be measured instead or additionally) and extracts from the overall rotor current a signal current that is indicative of or represents the data signal including the encoded information. The detector unit 714 employs predetermined logic to generate a rotor voltage set point $V_{R,sp}$ based on the signal current. The rotor voltage set point $V_{R,sp}$ is used by a gate drive unit 716 to control switching elements in an active rectifier 718 and, in particular, to cause the switching elements to make the rotor voltage equal to the rotor voltage set point $V_{R,sp}$.

The detector unit 714 is configured to correctly extract and interpret detected data signals (i.e., decode the encoded information) and to provide output to the gate drive unit 716 that will be understood by the gate drive unit 716 to control the active rectifier 718. This detector unit 714 may include "hardcoding" through analog circuitry configured to extract particular types of signals from detected rotor currents and/or voltages and to provide corresponding output, configurable digital logic programmed to perform the extraction and output, or a mixture of these elements. For example, a filtering circuit of the detector unit 714 may first isolate the data signals, an analog to digital converter of the detector unit 714 may convert the data signals into a digital data stream, and a microprocessor (e.g., a controller) of the detector unit 714 may analyze the digital data stream to obtain an output (e.g., a rotor voltage frequency set point) and pass the output to the gate drive unit 716, which implements the necessary switching operations to cause rotor operation to conform to the output.

A microprocessor on the rotor might be powered by, for example, one or more capacitors on the rotor, e.g., one or more capacitors included in an active rectifier of the rotor. Because these capacitors are indirectly charged by the stator, they begin in an uncharged state when the motor is off, and the microprocessor therefore is also off. However, in some implementations, the active rectifier acts passively until the capacitors are charged and the microprocessor is powered and able to control switching operations. Features associated with this function are described in more detail in reference to FIG. 20.

Microprocessors may alternatively or additionally be powered by a dedicated low-voltage transformer included in or on the rotor, e.g., an additional coil mounted on the rotor and arranged to couple to a controllable axis that is also used for power transfer. The turn count of the additional coil may be configured to provide the voltage needed by the microprocessors for operation. The power transfer signals therefore also provide separate, dedicated power to the microprocessors to enable active rectification.

In some implementations, microprocessors are alternatively or additionally powered by a rotor power supply, e.g., a battery included in the rotor.

Although this disclosure sometimes refers to data signals as being "embedded" in other signals, in some implementations the data signals (in a D/Q formulation) are not "embedded" in a non-zero signal but, rather, are the only signal along a given controllable axis.

In some implementations, self-synchronized and signal-driven control schemes are used simultaneously or in conjunction with one another. For example, self-synchronization might be used to control rotor voltage frequency, and data signals might be extracted and interpreted to control rotor current set point.

Collectively, the detector unit 714, the gate drive unit 716, and any other units and/or circuits involved in controlling the active rectification (e.g., the comparator 610 and the converter unit 608 shown in FIG. 6B), whether based on controls or in a self-synchronized manner, may be referred to as a rotor control unit.

Figure 8:
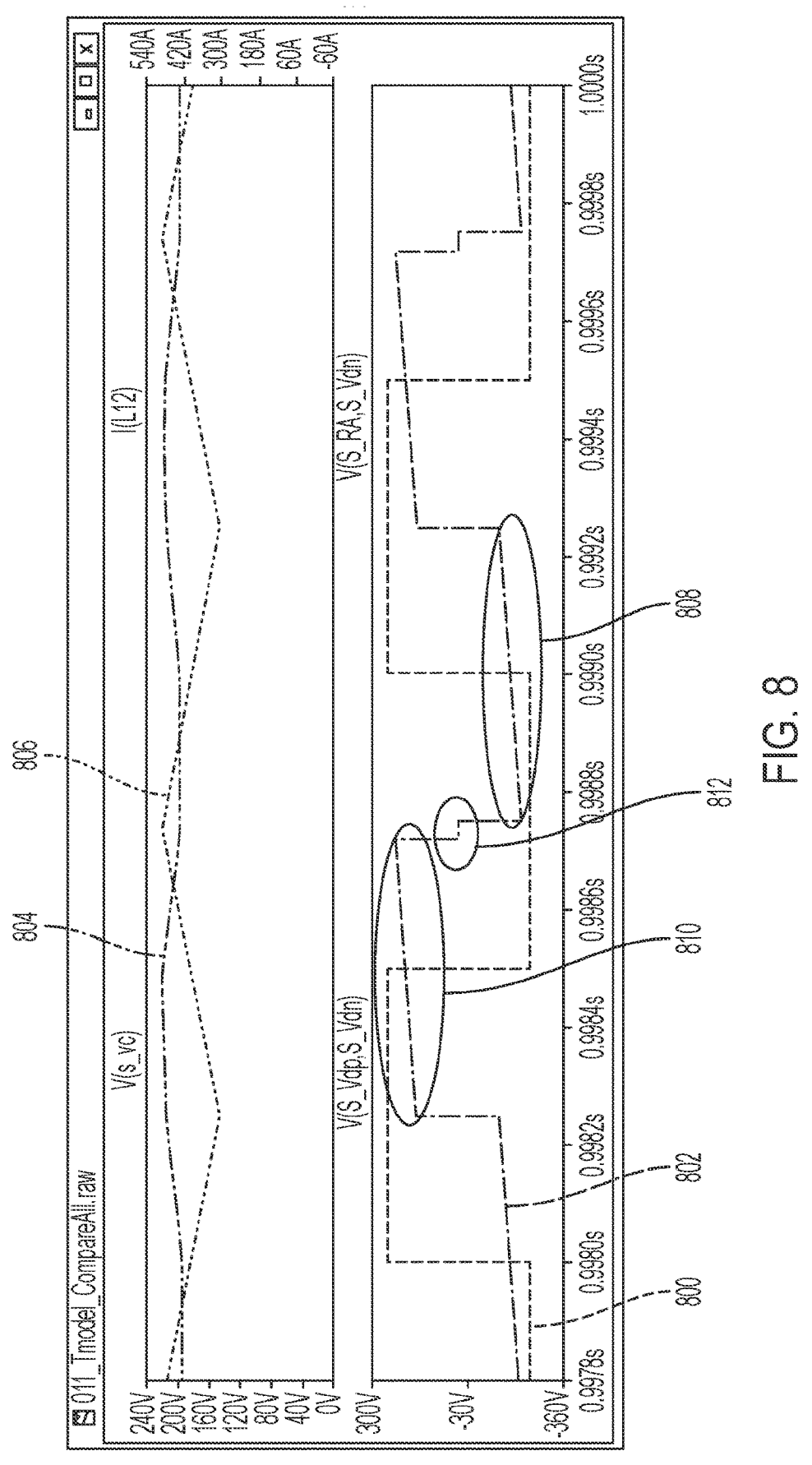
FIG. 8 is a plot of current and voltage over time for components of an example electric machine.

FIG. 8 shows example stator-side and rotor-side currents and voltage for a rotor winding conductively coupled to the active rectifier of FIG. 5B. Specifically, curve 800 shows an example D-axis voltage (e.g., a power transfer signal, also referred to as a D-axis injection voltage), from the stator, sensed by the rotor winding based on generated magnetic fields; curve 802 shows the voltage across the rotor winding, as controlled by the active rectifier; curve 804 shows the current through the rotor winding, as controlled by the active rectifier; and curve 806 shows the voltage across capacitor 508.

As shown in FIG. 8, the D-axis voltage 800 is a 50% duty-cycle square wave. In some implementations, the D-axis voltage 800 is centered at 0 V; however, in some implementations, the D-axis voltage 800 includes a DC offset voltage that contributes to torque production and generates a D-axis current on the stator.

The rotor voltage 802 in this example generally mirrors the D-axis voltage 800, but lags behind by 90° due to the operation of the active rectifier. In addition, the rotor voltage 802 includes (because of the configured switching pattern of the active rectifier) a zero-sequence 808 that shortens the positive sequence 810 of the rotor voltage 802 compared to the negative sequence 812 over each period of the rotor voltage 802.

In general, the phase between the rotor voltage 802 and the D-axis voltage 800 depends on the particular configuration of the active rectifier, and may take on any value that the active rectifier is configured to cause. In some implementations, a phase of about 90° provides improved power transfer to the rotor winding, because power transfer by the injection voltage varies with the sine of the phase. The ability to explicitly control this injection voltage angle is another benefit of active rectification over passive as it can be used not only to maximize power transfer, but also to modulate the magnitude and direction of power transfer between the stator and rotor. In some implementations, controlling this injection angle allows for the preferential selection of certain semiconductor devices on the stator and rotor (e.g., minimizing the volt-ampere rating, which can substantially reduce cost).

Because of the zero-sequence, the average value of the rotor voltage 802 is less than zero, such that a DC voltage component and a DC current component are produced in the rotor winding. In some implementations, the DC voltage and DC current result from the active rectifier setting unequal durations for the positive sequence 810 and the negative sequence 812, without necessarily including a zero-sequence. The DC electrical components correspond to the field generation function of the rotor winding, e.g., generation of the field that couples to stator fields to generate torque.

The rotor current 804 is substantially DC, with a ripple that corresponds to a ripple in the capacitor voltage 806 as the capacitor exchanges energy with the rotor winding. The substantially DC rotor current 804 may be coupled to by Q-axis stator voltages to move the rotor with respect to the stator. In some implementations, the torque and current ripple resulting from active rectification are smaller than those resulting from passive rectification.

As described elsewhere in this disclosure, passive rectification of rotor may require, in some cases, that the rotor current be driven to zero once per injection cycle and then recharged. This process may take, for example, tens of milliseconds. This time represents a loss in total torque delivered, as a primarily repulsive torque is replaced by a smaller, primarily reluctance-driven torque. Because the actively rectified rotor currents, as described in this disclosure, are substantially constant (for steady-state operation of the motor), total torque delivered over time is increased.

In some implementations, eddy currents generated by ripple currents may be reduced. Because rotor current remains more constant, other motor components may be designed more simply or with greater tolerances (e.g., without accounting for variable reluctance). Active control over rotor currents may be implemented so as to actively reduce energy stored in rotor fields, to let the rotor fields intentionally and actively reduce their intensity and put the motor in a lower-power mode. By contrast, field energy decay in a passive system may be based purely on L/R time constants of the system, which are not readily modifiable during operation.

In some implementations, during active field weakening, power can be directed from the rotor to the stator by adjusting the angle of the injection signal (e.g., voltage) between the stator and the rotor such that the rotor voltage leads that of the stator. This can dissipate power from the rotor quickly, as well as capture this power for productive purposes such as regeneration or more effective heat dissipation on the stator side. Active field weakening may be brought about by appropriate data signals that cause the active rectifier to shift the injection angle accordingly. Further, in some instances, the rotor receives excess power from the stator (e.g., more than required to drive the rotor winding(s) and power rotor circuitry). In response, the rotor can transmit power via the rotor winding(s) back to the stator windings (e.g., by adjusting the angle of the injection signal (e.g., voltage) between the stator and the rotor such that the rotor voltage leads that of the stator).

Another advantage of active, as opposed to passive, rectification is that active rectification circuits may be configured to, under certain modes of operation, switch the polarities of rotor windings. For example, an active rectifier imposing current flow in a first direction may switch to imposing current flow in a second, opposite direction, something sometimes not possible with passive rectification. As a result, the controller (e.g., the controller 104) can reconfigure the rotor to, for example, change the number of poles of the rotor. Further details regarding such reconfigurable rotors can be found in U.S. Provisional Patent Application No. 63/188,374, filed May 13, 2021, the entirety of which is hereby incorporated by reference.

In the various embodiments disclosed herein, the rotor with active rectifier may have various topologies describing the organization of one or more rectifiers, one or more controllers, and one or more windings. For example, each of the rotors described herein may include one of the following topologies: (1) the rotor includes one active rectifier and one controller (to control the associated rectifier) per rotor winding; (2) rotor includes a single active rectifier per winding, and a central rotor controller (to control each of the active rectifiers); (3) the rotor includes a central active rectifier shared by the rotor windings and a central rotor controller (to control the central active rectifier); (4) a hybrid of the second or third topologies where groups of windings share an active rectifier and/or a controller (to control the rectifier of the associated group of windings), wherein the groups of windings may be defined such that windings of a similar polarity are grouped together to share the active rectifier and/or controller.

Active Rectification With Multi-Axis Voltage Injection

Figure 9:
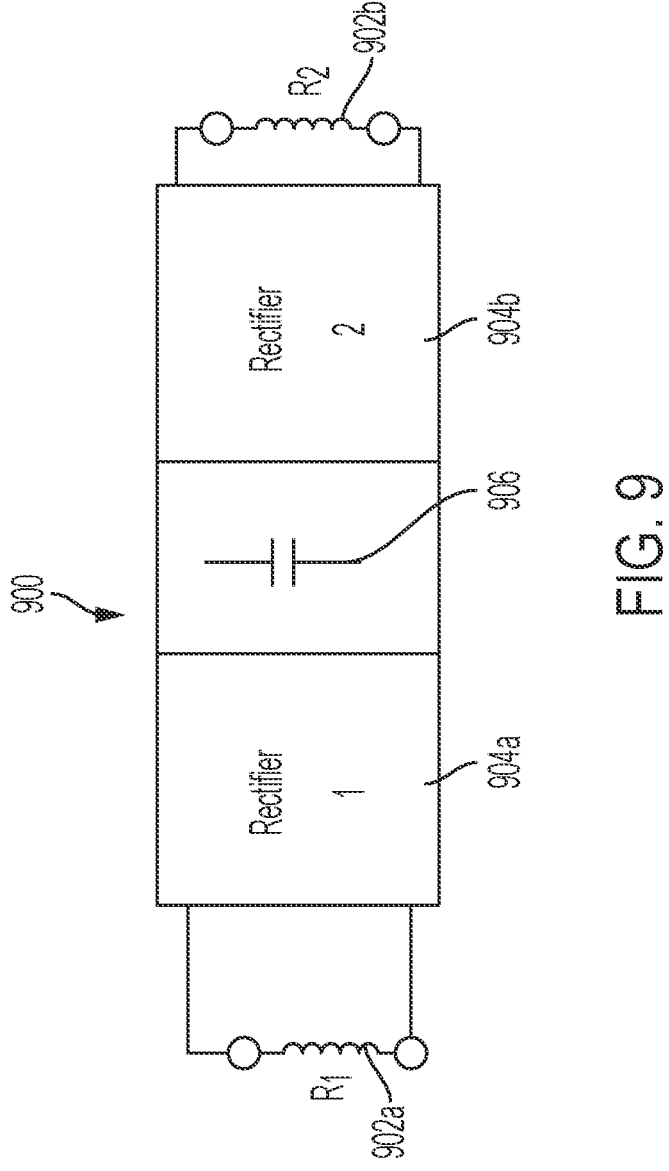
FIG. 9 is a block diagram of an example circuit topology that can be used with aspects of this disclosure.

FIG. 9 shows a schematic diagram of another example topology for an active rectifier 900. As detailed below, the active rectifier 900 may be configured for dual-axis voltage injections, also referred to as 2-axis voltage injections. In this implementation, a first rotor winding 902a is rectified by a first active rectifier sub-circuit 904a, and a second rotor winding 902b is rectified by a second active rectifier sub-circuit 904b. The first rotor winding 902a and the first active rectifier sub-circuit 904a are wired in parallel to the second rotor winding 902b and the second active rectifier sub-circuit 904b. A capacitor network 906 is wired in parallel to both windings 902a, 902b and both active rectifier sub-circuits 904a, 904b.

The first rotor winding 902a and the second rotor winding 902b receive respective D-axis voltage injections (e.g., power transfer voltages) that are approximately equal in magnitude and opposite in phase (e.g., two voltage waveforms with a 180° phase between them). These D-axis voltage injections are set by, for example, the motor controller 104 or by another control unit controlling voltages and currents in the stator windings. As described throughout this disclosure, the description of FIG. 9 may equally describe rotor windings receiving voltage injections on another controllable axis besides the D-axis.

In some implementations, because the D-axis voltage injections received by the rotor windings 902a, 902b are substantially equal and opposite, when the first active rectifier sub-circuit 904a is transferring energy to the capacitor network 906, the second active rectifier sub-circuit 904b is receiving energy from the capacitor network 906. Conversely, when the first active rectifier sub-circuit 904a is receiving energy from the capacitor network 906, the second active rectifier sub-circuit 904b is transferring energy to the capacitor network 906. Therefore, a maximum total instantaneous power transferred to the capacitor network 906 is reduced, compared to if only one rotor winding and only one active rectifier sub-circuit were coupled to the capacitor network 906 (with the same D-axis voltage injection pattern). As such, a smaller capacitor can be used in such topologies than in topologies with a single rectifier and rotor winding being coupled to a single capacitor.

Figure 10:
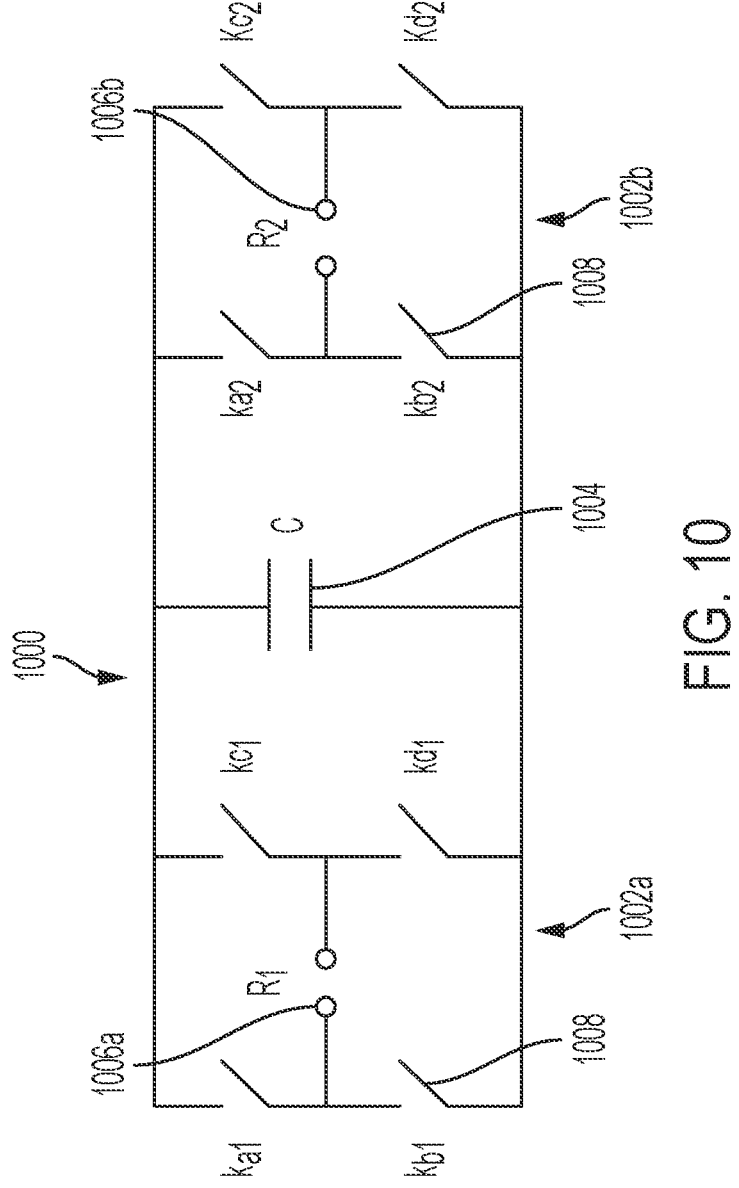
FIG. 10 is a schematic diagram of an example circuit topology, including example active rectifiers, which can be used with aspects of this disclosure.

FIG. 10 shows a practical implementation of an active rectifier 1000 according to the general design of active rectifier 900. The active rectifier 1000 includes two active rectifier sub-circuits 1002a, 1002b, each of which is a full-bridge rectifier as described in reference to FIG. 5B. The active rectifier sub-circuits 1002a, 1002b share a common capacitor 1004 and are coupled to respective rotor windings 1006a, 1006b. Each active rectifier sub-circuit 1002a, 1002b includes a plurality of switches, e.g., switches 1008.

In steady-state motor operation, the switches 1008 in the active rectifier sub-circuits 1002a, 1002b are operated a) such that substantially DC currents are maintained in the respective rotor windings coupled to the active rectifier sub-circuits 1002a, 1002b, and b) such that the respective powers transferred to the capacitor 1004 by the active rectifier sub-circuits 1002a, 1002b are 180° out of phase.

The example circuits of FIGS. 9-10 may be interpreted in terms of pole pair design of a motor. A pole pair corresponds to exposure to a given flux from the stator. Rotor winding 1006a is included in a first pole pair, and rotor winding 1006b is included in a second pole pair. Stator voltage phases are configured such that the windings from the two pole pairs see D-axis voltage injections that are 180° out of phase.

Active rectifiers that simultaneous transfer energy to and withdraw energy form a common capacitor network (e.g., the active rectifiers 900, 1000), in some implementations, decrease the maximum total instantaneous power transferred to the common capacitor. As such, the total capacitance necessary in the active rectifier is decreased, compared to if separate capacitances were used for separate windings or if different power profiles were transferred to/from the capacitor. In some implementations, the total common capacitance may be reduced by ten times, twenty times, or more. In some implementations, capacitor voltage ripple is reduced in comparison to systems with a single coil and rectifier tied to a single capacitor, reducing stress and losses in the active rectifier.

In addition, in some implementations, torque ripple (as represented by, for example, the rotor current ripple shown in FIG. 8) may be decreased because rotor current ripple may, to a significant degree, cancel out between the two active rectifier sub-circuits. The decrease in torque ripple may lead to lower losses, lower operation noise, and/or simpler necessary control methods.

Figure 12:
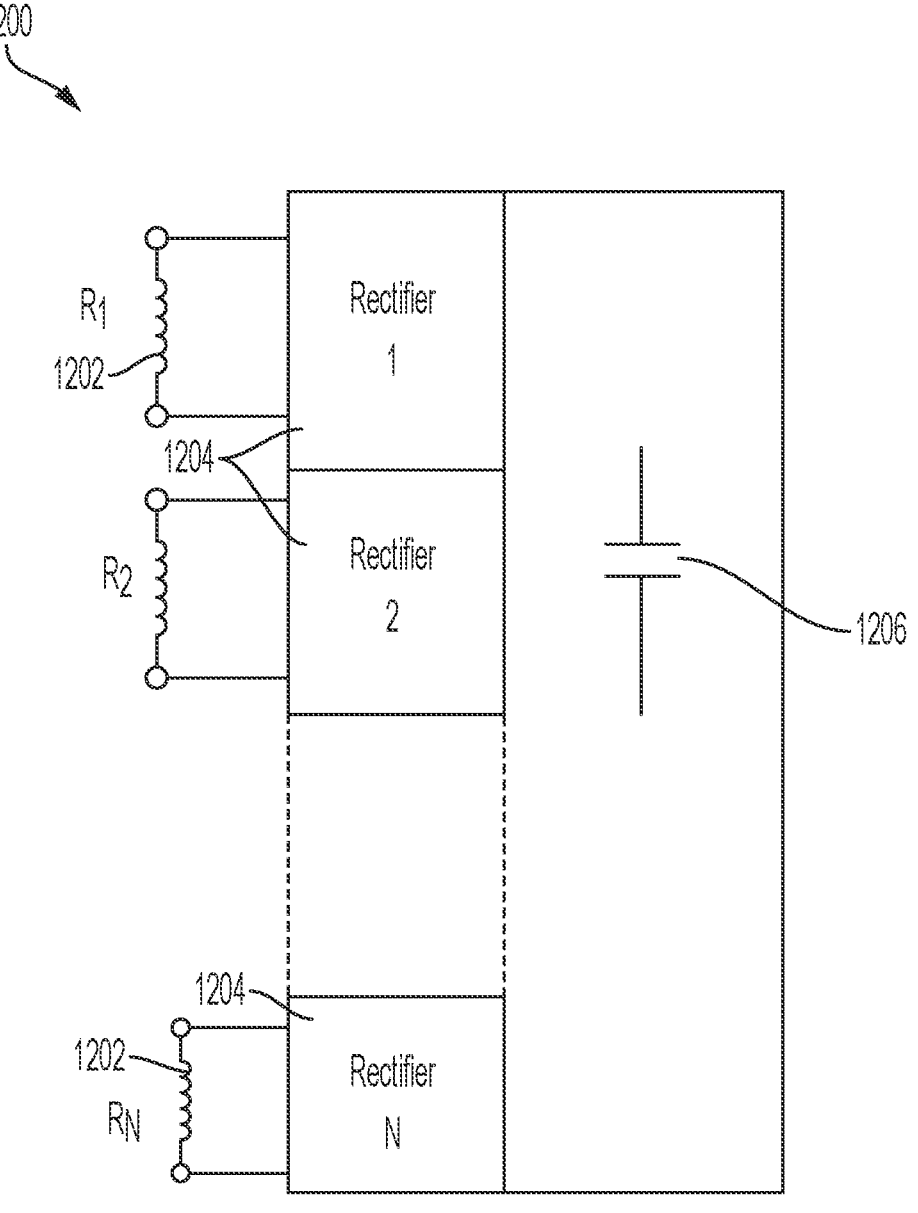
FIG. 12 is a schematic diagram of an example rotor circuit topology with n winding coils and n rectifiers.
Figure 19:
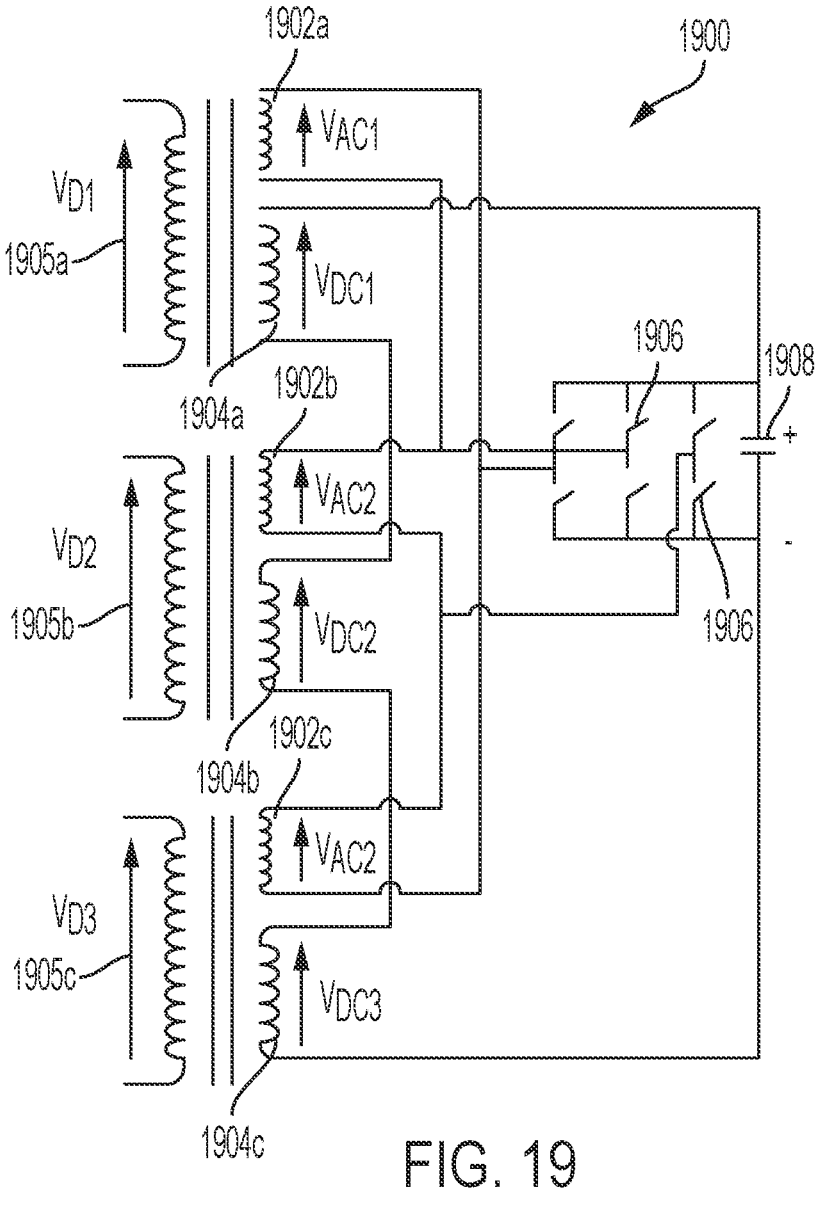
FIG. 19 is a schematic diagram of a circuit topology that can be used with aspects of this disclosure.

This effect may be similarly seen in implementations of this disclosure in which multiple windings, exposed to different field fluxes, are conductively coupled, e.g., implementations as shown in FIGS. 12, 16, and 19. Each injection generates torque ripple, but the equally phase-separated axes (e.g., 360°/n phases or interleaving) mean that the sum of the torque ripple cancels out.

Figure 11:
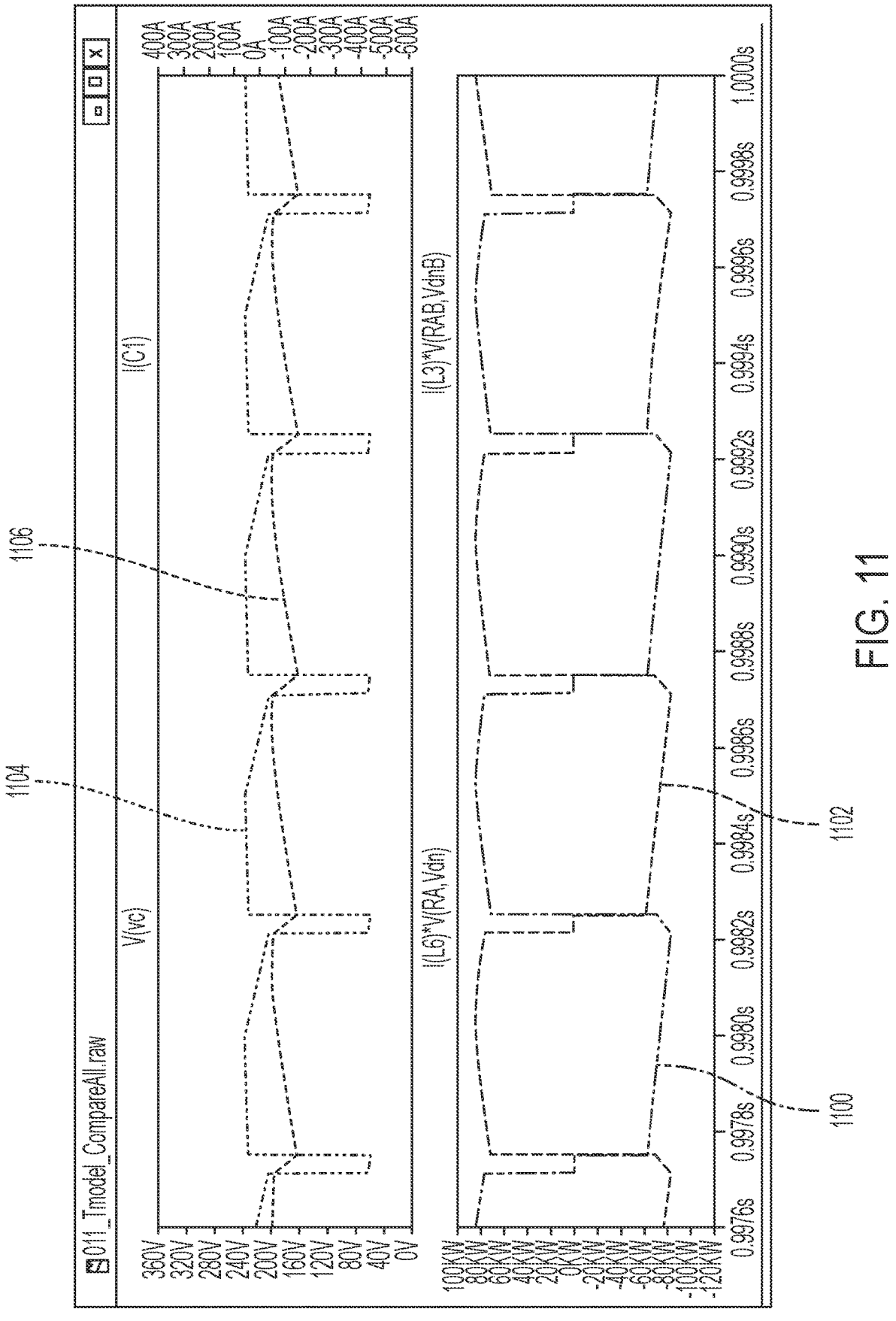
FIG. 11 is a plot of current and voltage over time for components of an example electric machine.

FIG. 11 shows example circuit waveforms corresponding to steady-state operation of the example active rectifier 1000. Curve 1100 shows D-axis power transferred from the stator to the first active rectifier sub-circuit 1002a via rotor winding 1006a; curve 1102 shows D-axis power transferred from the rotor to the second active rectifier sub-circuit 1002b via rotor winding 1006b; curve 1104 shows the sum of curves 1100 and 1102 (in other words, the total power transferred to the common capacitor 1004); and curve 1106 shows voltage on the capacitor 1006. As described in reference to FIGS. 9-10, curves 1100 and 1102 are 180° out of phase; curves 1100 and 1102 each also include a zero-sequence, as described in reference to FIG. 8.

Because of the configuration of the active rectifier 1000 and the electrical signals transferred to and within the active rectifier 1000, as described in reference to FIGS. 8-9, a maximum instantaneous value of the capacitor power 1104 is decreased. In addition, in some implementations, the ripple of the capacitor voltage 1106 is decreased, and/or the total capacitance of the capacitor 1006 is decreased.

The example active rectifier circuit topologies of FIGS. 9-10, and their corresponding stator-side voltage patterns, can be generalized to a case of n coupled rotor windings sharing a common capacitor and excited by n respective D-axis voltages. The n D-axis voltages are phased 360°/n apart from one another, and active rectifiers (or active rectifier sub-circuits) coupled to each rotor winding transfer power to the common capacitor by signals that are also phased 360°/n apart from one another. Therefore, peak total power transmitted to the capacitor is decreased, and advantages are provided to motor operation and design as described in reference to FIGS. 10-11. In some implementations, the n D-axis voltages are interleaved with one another.

FIGS. 9-11 show examples of circuits and corresponding signals in the n=2 case (i.e., with a dual-axis or two-axis voltage injection).

For some implementations of the n=3 case, three rotor windings are conductively coupled to one another via respective active rectifier sub-circuits and by a common capacitor. A corresponding stator implements three-axis injections to excite the three rotor windings, the three injection axes phased 120° apart. Note that "three-axis injection" refers to an overall configuration of the stator and rotor and is distinct from descriptions of "controllable axes" such as the Q-axis, the D-axis, and the z-axis.

FIG. 12 shows a schematic of an example active rectifier circuit 1200 for n coupled rotor windings 1202. Each rotor winding 1202 is actively rectified by a corresponding active rectifier sub-circuit 1204, the active rectifier sub-circuits 1204 wired in parallel to one another and sharing a common capacitor network 1206, which includes one or more capacitors. Each active rectifier sub-circuit 1204 implements active rectification of currents in the respective coupled rotor winding 1202, the active rectification being such that the powers transmitted to the capacitor network 1206 by of the n active rectifier sub-circuits 1204 are out of phase with one another by 360°/n degrees. In some implementations, each rotor winding shown in FIG. 12 is from a different pole pair of the rotor, and there are at least n pole pairs in the rotor. In some implementations, the transferred powers are interleaved with one another.

Active Rectification With Multi-Axis, Split-Coil Injection

As described throughout this disclosure, active rectification may be implemented by semiconductor devices acting as switches. However, in some cases, the semiconductor devices (e.g., switches 504a-504d in FIG. 5C) may be exposed to relatively high instantaneous power levels.

Specifically, in some cases, the actively-rectified rotor winding current (for example, curve 804 in FIG. 8) includes a relatively large DC component and a relatively small AC (ripple) component. Meanwhile, in some cases, the actively-rectified rotor winding voltage (for example, curve 802 in FIG. 8) includes a relatively large AC component and a relatively small DC component. The relatively large AC component of the rotor winding voltage allows for effective power transfer from the stator windings to the rotor windings, while the relatively small DC component of the rotor winding voltage may be produced by, for example, a zero-sequence introduced into the rotor winding voltage signal.

Because power is voltage times current (V×A), if the respective AC and DC components of current and voltage are not separated, then the large DC current component and the large AC voltage component together lead to high peak power in the active rectifier circuit compared to average power processed in the active rectifier, which is equal to rotor winding DC voltage times rotor winding DC current. For example, in some implementations, the peak power is more than ten times the average power. This means that components of the active rectifier circuit (e.g., semiconductor devices) must have correspondingly high power ratings, increasing component size. In addition, the high peak power, in some implementations, represents correspondingly high loss, e.g., conduction losses.

However, in some implementations, the active rectifier (and, in some implementations, stator-side voltages) are configured such that the AC and DC components of the rotor currents and voltages are separated. Therefore, active rectifier circuit components carry either a) the relatively large DC current and the relatively small DC voltage, or b) the relatively small AC current and the relatively large AC voltage. This causes the peak V×A across each component to be reduced, compared to designs in which active rectifier circuit components carry both the relatively large DC current and the relatively large AC voltage. As described in further detail below, FIGS. 13-16 show respective active rectifier circuits that can separate the AC and DC current and voltage components.

Figure 13:
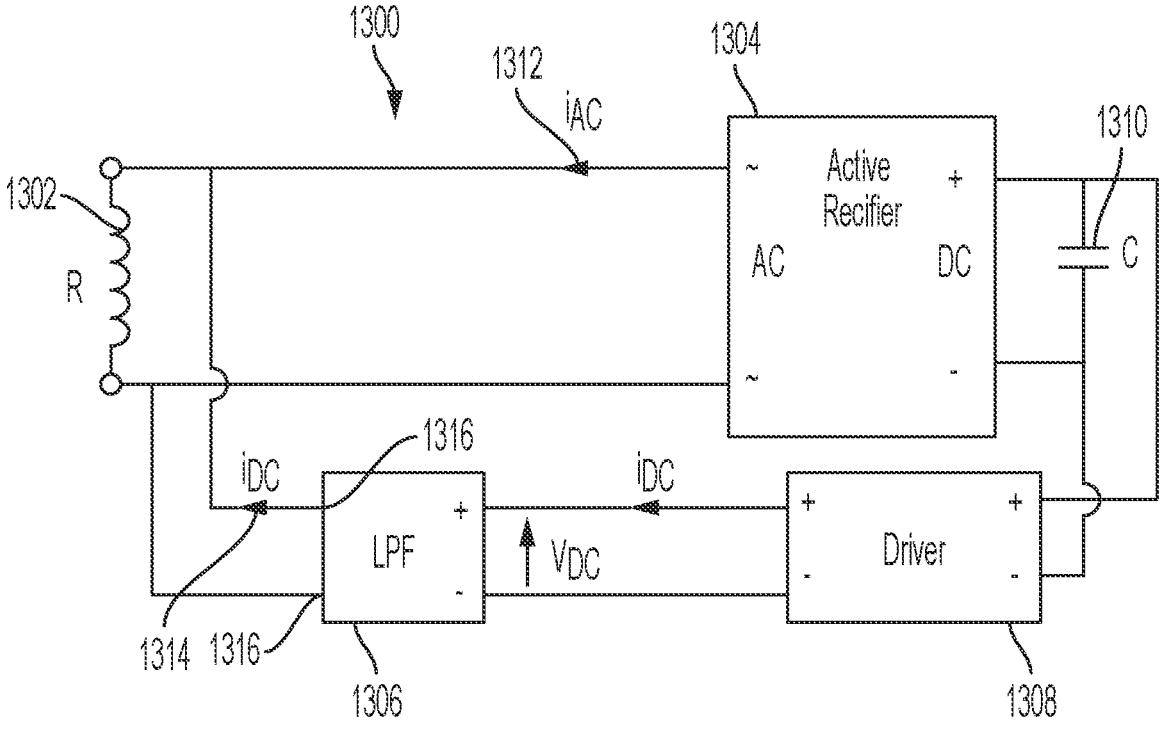
FIG. 13 is a schematic diagram of a circuit topology that can be used with aspects of this disclosure.

FIG. 13 shows an example active rectifier circuit 1300 that separates the AC and DC current and voltage components. A rotor winding 1302, coupling to D-axis power transfer signals from the stator, is terminated with two parallel inputs: an active rectifier sub-circuit 1304 and a low-pass filter 1306. Together, the active rectifier sub-circuit 1304 isolates an "AC side" of the circuit 1300 (the AC side including the rotor winding 1302) from a "DC side" of the circuit 1300, which includes the low-pass filter 1306. A capacitor 1310 stores energy during the active rectification process and smooths ripple in the rotor winding current.

The active rectifier sub-circuit 1304 may be implemented as described throughout this disclosure, e.g., by an asymmetric bridge or a full-bridge including one or more active switches that switch based on data signals received at the rotor windings from the stator windings.

In some implementations, a driver circuit 1308 on the DC side of the circuit 1300 allows the DC electrical components to be controlled separately from the capacitor 1310, e.g., to maintain a first voltage over the capacitor 1310 and a second, different DC voltage on the DC side of the circuit 1300.

In operation, the active rectifier sub-circuit 1304 imposes a substantially AC current 1312 on the rotor winding 1302, such that semiconductor devices within the active rectifier sub-circuit 1304 are exposed to lower current stress. A DC current 1314 is transmitted from the active rectifier sub-circuit 1304 through the low-pass filter 1306 and to the rotor winding 1302, this DC current 1314 coupling with Q-axis magnetic fields to produce electromotive forces on the rotor.

In some implementations, the input impedance at the input ports 1316 of the low-pass filter 1306 is high at the D-axis injection frequency (e.g., the frequency of D-axis power transfer voltage injection signals from the stator); otherwise, power transfer between the stator and rotor may be negatively affected, e.g., effectively shorted across the input ports 1316. For example, in some implementations, the input impedance at the input ports 1316 is higher than the impedance of the total leakage inductance in the system, including the stator D-axis leakage inductance and the rotor leakage inductance, which may increase power transfer. The system can be understood as a voltage divider between the total leakage inductance and the input impedance.

The stator D-axis leakage inductance may be represented as a combination of a leakage inductance in series with the stator winding and a leakage inductance parallel to the stator winding; the rotor leakage inductance includes at least a leakage inductance in series with the rotor winding.

As described throughout this disclosure, the description of FIG. 13 may equally describe rotor windings receiving voltage injections on another controllable axis besides the D-axis.

Figure 14:
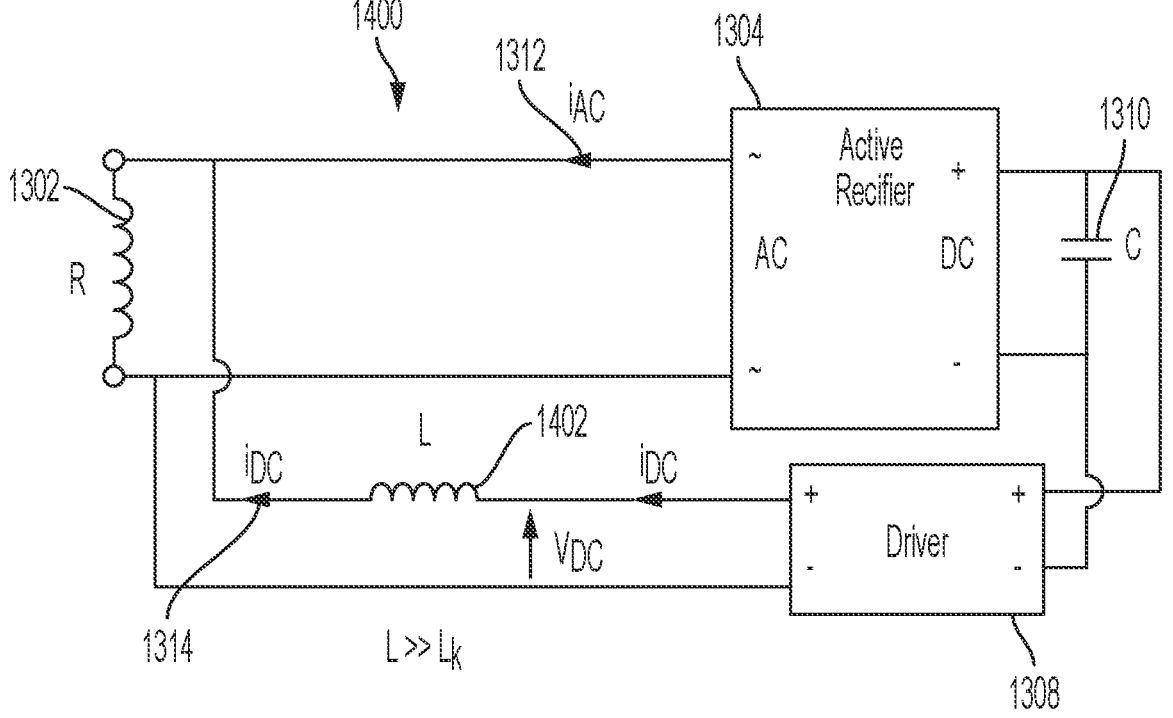
FIG. 14 is a schematic diagram of a circuit topology that can be used with aspects of this disclosure.

One specific example of the active rectifier circuit 1300 is shown in FIG. 14. In this example active rectifier circuit 1400, an inductor 1402 implements low-pass filtering; the implementations of FIGS. 13 and 14 are otherwise substantially similar with the exception of any differences described herein.

The inductor 1400 has an inductance that is significantly greater than (e.g., at least about ten times greater than) the impedance of the total leakage inductance in the system, in order to act as a primary reservoir of energy to implement efficient low-pass filtering.

Figure 15:
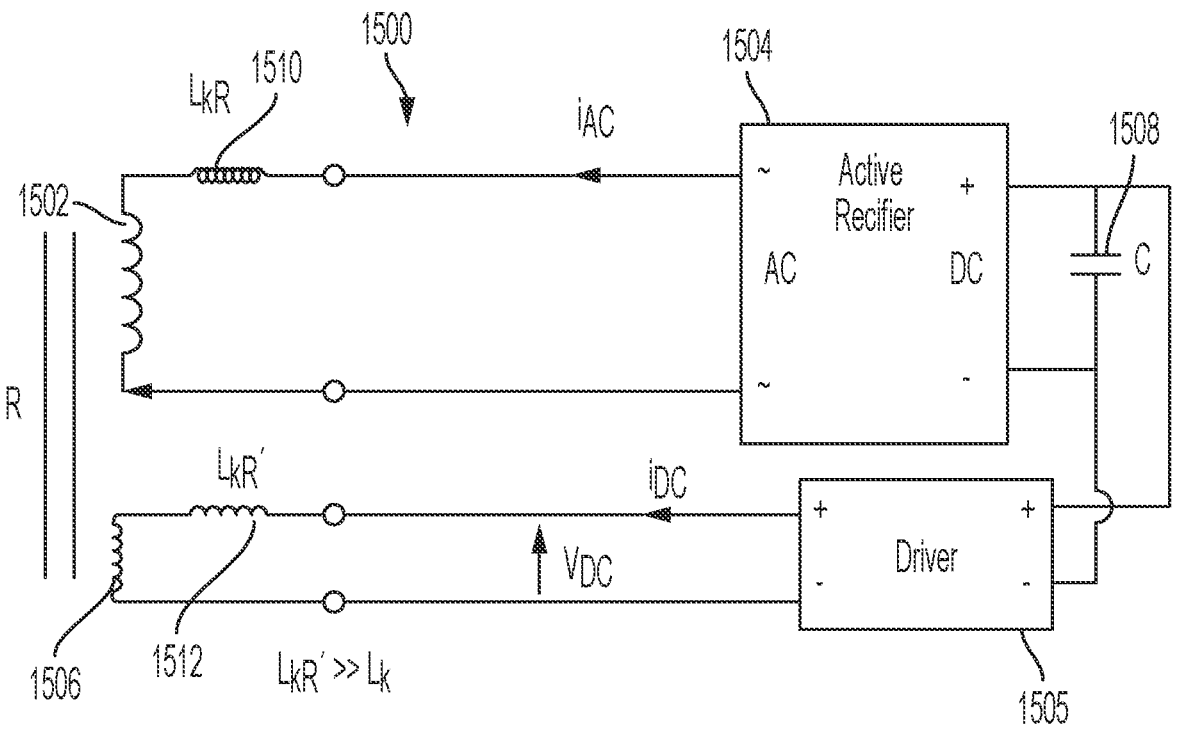
FIG. 15 is a schematic diagram of a circuit topology that can be used with aspects of this disclosure.

FIG. 15 shows an example implementation of an active rectifier circuit 1500 in which a low-pass filtering mechanism is embedded in the circuit design by appropriate selection of leakage inductances. Specifically, a first rotor winding 1502 is terminated by an active rectifier sub-circuit 1504, and a second rotor winding 1506 is terminated by a DC output of the active rectifier sub-circuit 1504 (in some implementations, with an intervening driver circuit 1505). As described throughout this disclosure, a capacitor network 1508 stores and releases energy during the active rectification process.

The two rotor windings 1502, 1506 are, in some implementations, wound alongside one another, e.g., wound around the same rotor pole, such that the two rotor windings 1502, 1506 are exposed to the same D-axis voltages from the stator (are included in a pole pair).

The first rotor winding 1502 and the second rotor winding 1506 are each characterized by respective leakage inductances 1510, 1512, which, although shown as discrete components in FIG. 15, are, in some implementations, embedded in the design of the respective rotor windings 1502, 1506. For example, the leakage inductances may be determined by the length and width(s) of the air gap between the stator and the rotor, by a shape of rotor and/or stator poles, by a configuration of pole slots, or by a combination of these elements. The leakage inductance 1512 of the second rotor winding 1506 is significantly greater than (e.g., at least about ten times greater than) the leakage inductance 1510 of the first rotor winding 1502. The leakage inductance 1512 of the second rotor winding 1406 is also significantly greater than (e.g., at least about ten times greater than) the total stator-side D-axis leakage inductance.

As described throughout this disclosure, the description of FIG. 15 may equally describe rotor windings receiving voltage injections on another controllable axis besides the D-axis.

FIG. 16 shows an example implementation of an active rectifier circuit 1600 that separates AC and DC current and voltage components. In this implementation, a first rotor pole is energized by a first AC rotor winding 1602a and a first DC rotor winding 1604a. A second rotor pole is energized by a second AC rotor winding 1602b and a second DC rotor winding 1604b. The pairs of rotor windings 1602a, 1604a and 1602b, 1604b are each wound around a respective different rotor pole, e.g., wound circumferentially around respective portions of magnetic material. Being exposed to the same field flux, windings 1602a, 1604a are included in a first pole pair, and windings 1602b, 1604b are included in a second pole pair.

The first pair of rotor windings 1602a, 1604a is excited by a first stator-side D-axis voltage 1605a, and the second pair of rotor windings 1602b, 1604b is excited by a second stator-side D-axis voltage 1605b. In some implementations, the two D-axis voltages 1605a, 1605b have reversed polarities, e.g., are 180° out of phase with one another, as described in reference to FIGS. 9-11.

The AC rotor windings 1602a, 1602b are conductively coupled in series with opposite polarity (e.g., the winding directions of the windings are opposite one another, or the winding directions are in the same direction but the electrical couplings between the windings connect winding ends such that the polarities are opposite) with respect to their respective D-axes.

Remaining nodes of the AC rotor windings 1602a, 1602b (e.g., the nodes that do not couple the AC rotor windings 1602a, 1602b in series with one another) are terminated at an input 1612 of an active rectifier sub-circuit 1606. The active rectifier sub-circuit 1606 is conductively coupled to a capacitor network 1608 and to a driver sub-circuit 1610.

The DC rotor windings 1604a, 1604b are conductively coupled in series with matching polarity with respective to their respective D-axes. Besides this series coupling, the DC rotor windings 1604a, 1604b are also coupled to an output 1614 of the driver sub-circuit 1610.

This example circuit 1600, in combination with the opposite-polarity D-axis voltages, implements effective separation of the AC and DC components of the rotor winding voltages and currents. First, the active rectifier sub-circuit 1606 imposes an AC voltage and current in the AC rotor windings 1602a, 1602b; these AC signal components perform stator-to-rotor power transfer. In addition, although the AC rotor windings 1602a, 1602b are wired in series with opposite polarities, the applied D-axis voltages also have opposite polarities, such that the respective voltages in the AC rotor windings 1602a, 1602b add constructively. Therefore, the total AC voltage at the input 1612 of the active rectifier sub-circuit 1606 has twice the peak amplitude of the AC voltages in each of the AC rotor windings 1602a, 1602b.

Second, because the DC rotor windings 1604a, 1604b are wired in series with matching polarities, AC components in these windings 1604a, 1604b cancel out with one another. The DC voltage output from the driver sub-circuit 1610 (conductively coupled to and drawing energy from the active rectifier sub-circuit 1606 and the capacitor network 1608) provides a DC current through the DC rotor windings 1604a, 1604b; this current couples to Q-axis voltages from the stator to move the rotor. In this implementation, no discrete inductor is required. Therefore, circuit cost and/or size may be reduced compared to the implementation of FIG. 13.

In some implementations, the DC rotor windings 1604a, 1604b have higher turn counts than the AC rotor windings 1602a, 1602b. This may promote an increase in winding terminal voltage (while maintaining V/turn) and a reduction in winding terminal current (while maintaining A×turn). Therefore, current and voltage stress on the driver sub-circuit 1610 may be reduced. In some implementations, a driver sub-circuit is not included, and the DC rotor windings 1604a, 1604b are conductively coupled directly to the capacitor network 1508.

The turns ratio can be configured such that peak voltages on the AC side of the circuit 1600 and the DC side of the circuit 1600 are equal or approximately equal (e.g., within 50% of one another, within 25% of one another, or within 10% of one another). This can obviate the need to perform significant voltage step-downs (or step-ups) in the active rectifier sub-circuit 1606 and driver sub-circuit 1610. In some implementations, turns ratios are different from turns ratios that provide these peak voltages.

Furthermore, because the AC and DC electrical components are separated, the peak capacitor power is reduced as described throughout this disclosure, with corresponding reductions in necessary capacitor size, cost, and/or power rating.

Circuit 1600 implements not only effective separation of AC and DC electrical components but also, correspondingly, effective separation of power transfer and field generation functions. Power transfer from stator to rotor is accomplished via the AC rotor windings, while generation of fields that couple to stator-generated fields to generate torque is accomplished via the DC rotor windings.

In some implementations, multi-axis injection is implemented by a separation of common-mode (CM) and differential-mode (DM) stator excitations in separate sets of stator windings. CM stator-excited fields are low-frequency, e.g., DC. Stator CM coils may be coupled in series to enforce CM current. DM fields are medium- or high-frequency fields (e.g., higher frequency than the CM fields), e.g., sinusoidal, trapezoidal, or saw tooth. Stator DM coils may be connected in various arrangements, e.g., star or delta configuration. CM and DM field generation may also be implemented by other methods, e.g., modification of stator coil geometry.

In some implementations, CM and DM stator excitations are used in conjunction with three-phase stator injection and two-axis injection.

As described throughout this disclosure, the description of FIG. 16 may equally describe rotor windings receiving voltage injections on another controllable axis besides the D-axis.

Figure 17A:
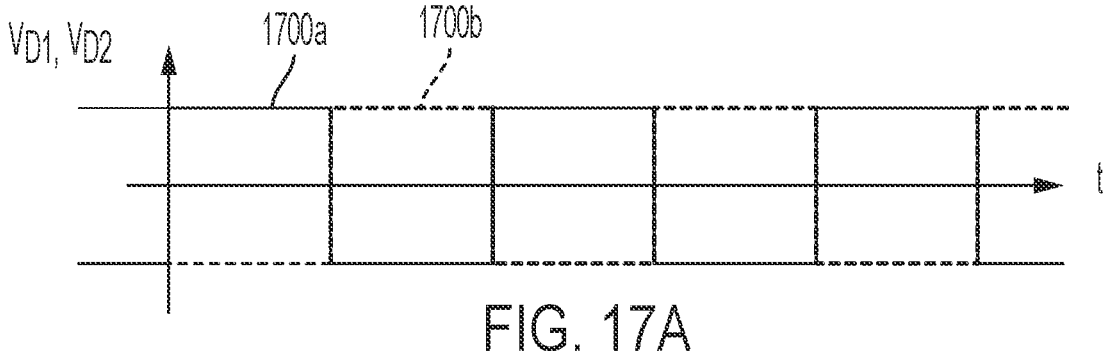
FIGS. 17A-17C are plots of AC and DC voltages over time.
Figure 17B:
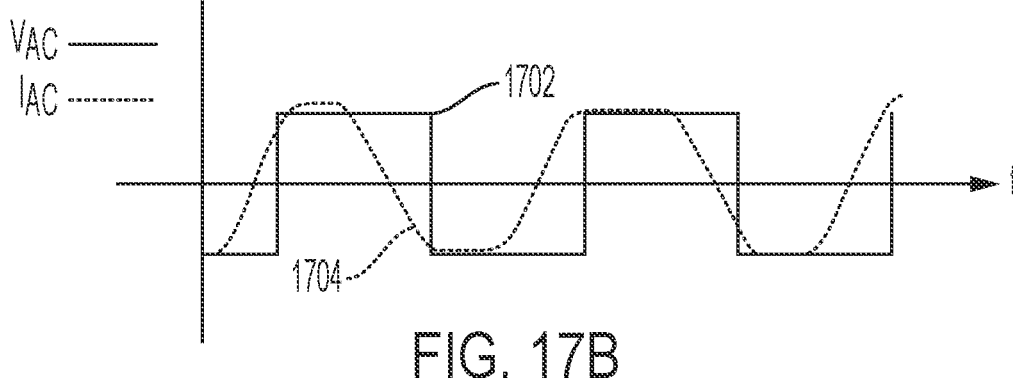
Figure 17C:
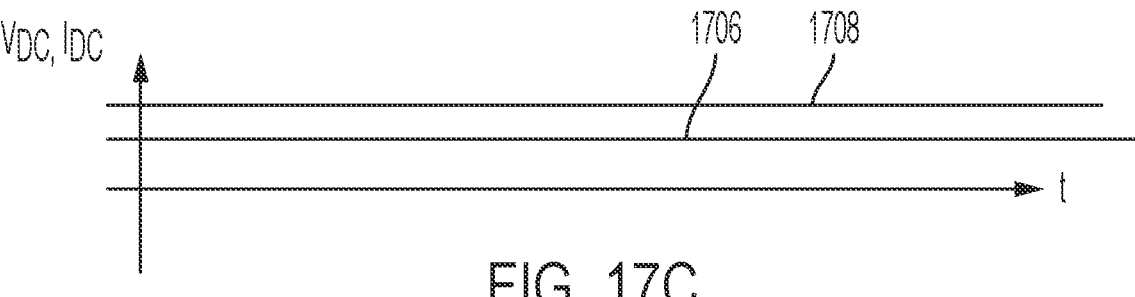

FIGS. 17A-17C show examples of time-dependent voltage and current values for the active rectifier 1600. As shown in FIG. 17A, the first D-axis voltage 1700*a* (corresponding to D-axis injection 1605*a* in FIG. 16) and the second D-axis voltage 1700*b* (corresponding to D-axis injection 1605*b* in FIG. 16) are 360°/2=180° out of phase.

As shown in FIG. 17B, because the AC rotor windings 1602*a*, 1602*b* are wired in series with opposite polarities, the out-of-phase D-axis voltages 1700*a*, 1700*b* do not cancel out; rather, the active rectifier sub-circuit 1606 causes the net voltage 1702 from the AC rotor windings 1602*a*, 1602*b*, corresponding to the voltage at the input 1612 of the active rectifier sub-circuit 1606, to be a 50% duty-cycle square wave with twice the peak amplitude of the D-axis voltages 1700*a*, 1700*b*.

The trapezoidal AC current 1704 results from the combination of two input square wave voltages in the inductive system including windings 1602*a*, 1602*b*.

As shown in FIG. 17C, the current 1706 through the DC rotor windings 1604*a*, 1604*b*, is substantially DC, because signals from the AC rotor windings 1602*a*, 1602*b* are rectified by the active rectifier sub-circuit 1606, and because the series wiring of the DC rotor windings 1604*a*, 1604*b*, with matching polarities, causes reflected AC voltages from the DC rotor windings 1604*a*, 1604*b* to cancel out. Likewise, the net voltage 1708 from the DC rotor windings 1604*a*, 1604*b*, corresponding to a voltage at the output 1614 of the driver sub-circuit 1610, is also substantially DC.

Because the AC and DC components of the currents and voltages are separated, peak power on the semiconductor components is reduced, leading, in some implementations, to reduced component size and cost and reduced losses.

In addition, in the implementation of FIG. 16 (and for implementations with more than two injection axes, as described in reference to FIG. 19), because windings corresponding to multiple injection axes share an active rectifier sub-circuit 1606, total semiconductor component count may be reduced, in some implementations correspondingly reducing parasitic losses.

Also, because, in some implementations, DC currents at the input 1612 of the active rectifier sub-circuit 1606 are zero or approximately zero, and because current leads voltage at this input 1612 as shown in FIG. 17B, the circuitry required for soft-switching in the active rectifier sub-circuit

1606 may be reduced. The leading current (e.g., current 1704) charges up capacitances in the active rectifier sub-circuit 1606 as the voltage switches from high to low or low to high, reducing current spikes in the switches of the active rectifier sub-circuit 1606.

Figure 18:
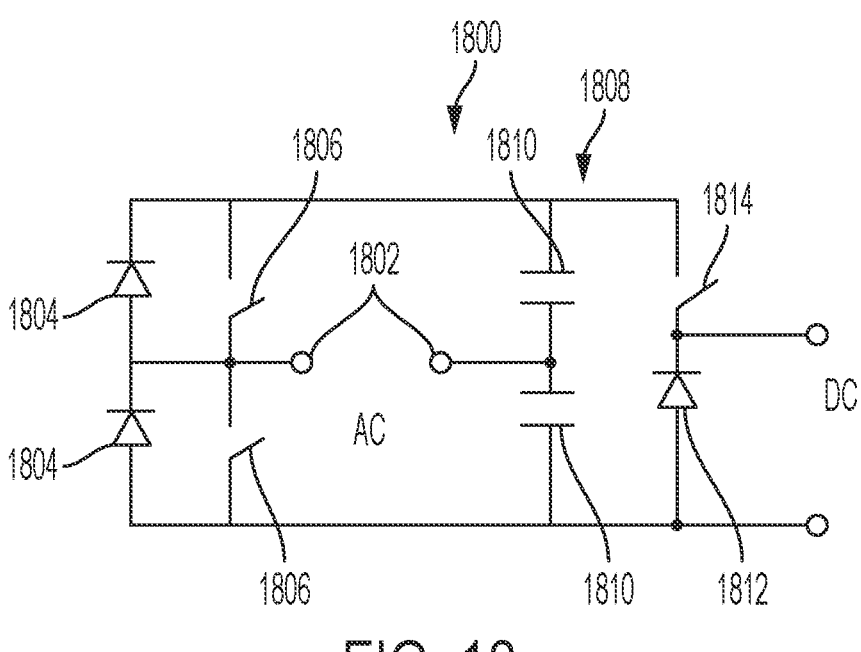
FIG. 18 is a schematic diagram of a circuit topology that can be used with aspects of this disclosure.

FIG. 18 shows an example circuit 1800 implementing the active rectifier sub-circuit 1606, the capacitor network 1608, and the driver sub-circuit 1610. The series-wired AC rotor windings 1602*a*, 1602*b* are terminated at the AC input 1802. Two diodes 1804 and two switches 1806 (the switches 1806 controlled, for example, based on data signals embedded in the D-axis voltages) implement active rectification of the AC signals using the capacitor network 1808, which in this implementation includes two capacitors 1810.

Another diode 1812 and another switch 1814, the driver sub-circuit, allow a coupled DC winding (e.g., DC windings 1604*a*, 1604*b*) to be controlled independently of the capacitor network voltage, e.g., a voltage on the capacitor network 1608, by coupling/decoupling the DC winding from the capacitors. In the absence of the driver sub-circuit, the DC winding voltage is equal to the capacitor voltage. With the driver sub-circuit, a large voltage may be maintained on the capacitor network, benefiting power transfer.

The example implementation described in reference to FIGS. 16-18 can be extended to more than two D-axis injection axes. In some implementations, n D-axis injection axes energize n corresponding pairs of AC rotor windings and DC rotor windings. The AC rotor windings are wired in series with alternating polarities, and the DC rotor windings are wired in series with matching polarities. The AC rotor windings are conductively coupled to a common active rectifier sub-circuit and a common capacitor network in a delta configuration (e.g., as shown in FIG. 19), such that DC currents are output to the DC rotor windings.

In some implementations, the n D-axis voltages sum to zero or approximately zero: for example, in some implementations, the n D-axis voltages are matching signals out of phase with one another by 360°/n. In addition, in some implementations, the sum of voltages applied to the AC rotor windings by the active rectifier sub-circuit is zero or approximately zero. In some implementations, the voltages applied to the AC rotor windings are interleaved.

FIG. 19 shows an example active rectifier 1900 using three-axis injection to energize three pairs of rotor windings. In particular, three AC rotor windings 1902*a*, 1902*b*, and 1902*c* are wired together in series with opposite polarities with respect to their respective D-axes, and three DC rotor windings 1904*a*, 1904*b*, and 1904*c* are wired together in series with matching polarities with respect to their respective D-axes. Three-axis stator-side D-axis voltage injections 1905*a*, 1905*b*, and 1905*c* are 360°/3=120° out of phase with one another.

In some implementations, windings 1902*a* and 1904*a* are included in a first pole pair, windings 1902*b* and 1904*b* are included in a second pole pair, and windings 1902*c* and 1904*c* are included in a third pole pair.

In this implementation, and for other AC/DC-separated circuits described in this disclosure, a number of pole pairs need not equal a number of stator phases and/or axes. For example, in some implementations, a rotor includes more pole pairs than exist stator phases and/or axes. In some implementations, a rotor includes more pole pairs than exist stator phases and/or axes, and at least some of the rotor pole pairs are wound in parallel.

Six switches (e.g., switches 1906) implement active rectification of currents through the AC rotor windings 1902*a*,

1902*b*, and 1902*c*, with a capacitor 1908 storing energy during the active rectification.

As described throughout this disclosure, the description of FIG. 19 may equally describe rotor windings receiving voltage injections on another controllable axis besides the D-axis.

The example active rectifier of FIG. 19, along with other examples of active rectifiers having n>2, may have some or all of the advantages described in reference to the n=2 case in FIGS. 16-18. For example, because AC and DC components are effectively separated, peak power requirements are reduced, reducing component weight, size, and/or cost. Losses in the active rectifier circuit may be reduced. A number of total components may be reduced. Total capacitor cost and/or size may be reduced.

In addition, the various active rectifiers described in this disclosure, including the example active rectifiers of FIGS. 5A-5B, 9-10, 12-16, and 19, may provide some or all of the advantages of active rectification described throughout this disclosure. For example, active rectification may provide decreased torque ripple and increased power efficiency.

Active Rectifier Circuit With Voltage Governor

As noted above, because active rectifiers according to some implementations obtain power from, ultimately, the stator, they begin motor operation in an unpowered state. For example, it might not be possible to perform active switching operations at the start of motor operation, because the energy needed to control the switching operations is not present, e.g., capacitors in the active rectifier are uncharged or power is not yet being transferred by a dedicated rotor winding acting as a transformer. Because of the lack of active control, overvoltages may damage circuit components or impede rotor function.

Figure 20A:
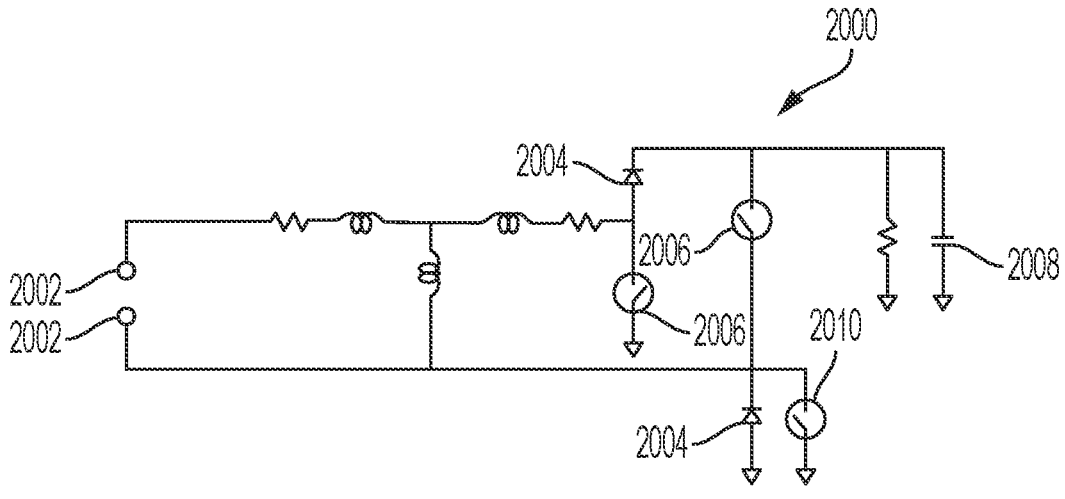
FIG. 20A is a schematic diagram of a circuit topology that can be used with aspects of this disclosure.

To prevent or reduce such overvoltages and other voltage spikes (e.g., transient voltages at the switching frequencies), in some implementations an active rectifier includes a voltage governor. FIG. 20A shows a schematic of an example asymmetric bridge active rectifier circuit 2000. A rotor winding at nodes 2002 is coupled to diodes 2004 and two actively-controlled switches 2006 that, together with passive components of the circuit 2000, implement active rectification. Other configurations of circuits including voltage governors may also be implemented, including different arrangements and combinations of passive components.

The maximum voltage seen by switches of the circuit 2000 is the voltage over capacitor 2008. In the absence of active gate control, the actively-controlled switches 2006 are uncontrolled in an open, closed, and/or floating configuration, depending on the implementation, and in any event are not switching in synchronicity so as to actively rectify current. In the example of FIG. 20A, the actively-controlled switches 2006 are held open.

To control the capacitor voltage 2008 and prevent it from exceeding a predetermined maximum value in the absence of active gate control, the circuit 2000 includes a governor switch 2010 that shorts the rotor winding if a voltage over the governor switch 2010 exceeds the maximum value. The governor switch 2010 may include a mix of transistors and/or passive components that are not dependent on an external controller or gate driver.

In some active rectification implementations, switches in active rectifiers may be implemented such that, when in an unpowered state, the switches act passively. For example, in some implementations a bipolar junction transistor rectifies current across two terminals in the absence of active control. Therefore, upon motor startup, the "active rectifier" acts as a passive rectifier until active control is available.

Figure 20B:
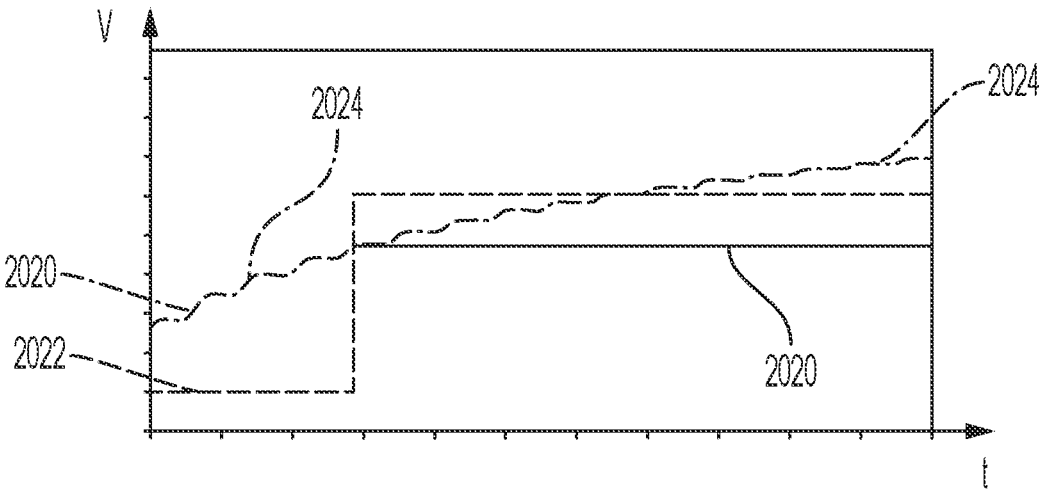
FIG. 20B is a plot of voltages over time.

FIG. 20B shows example circuit waveforms corresponding to transient operation of the example active rectifier 2000 and another active rectifier circuit without voltage regulation (not shown). Curve 2020 shows voltage over the capacitor 2008 with the governor switch 2010 included in the circuit 2000; curve 2022 shows on/off states of the governor switch 2010 in the circuit 2000; and curve 2024 shows voltage over the capacitor 2008 in the absence of the governor switch. In the absence of the governor switch 2010, the voltage over the capacitor 2008 is seen to rise continuously, causing possible overvoltages (the voltage over the capacitor 2008 would eventually reach the reflected bus voltage). By contrast, curve 2020 is limited to a maximum value.

Other implementations of voltage governors and active rectifier circuit topology to prevent active rectifier overvoltages in the absence of active switching are also within the scope of this disclosure.

Besides the components and sub-circuits described here, active rectifiers coupled to rotor windings may include other components. For example, in some implementations, active rectifiers include analog and/or digital componentry to measure circuit parameters, e.g., capacitor voltage and/or rotor current, and to, in some implementations, perform control functions besides those described explicitly in this disclosure. In some implementations, active rectifiers include one or more communication devices, e.g., to exchange analog and/or digital signals within the rotor, between the rotor and the stator, or between the rotor and another controller component.

Various implementations of this disclosure have been described in reference to D-axis coupling (e.g., implementations described in reference to FIGS. 6-19). However, equivalent implementations are within the scope of this disclosure for couplings along any one or more of the controllable axes that may exist within a motor, e.g., along the Q-axis or along another axis that may be established.

Motor Structure for Active Rectification Circuitry

Figure 21A:
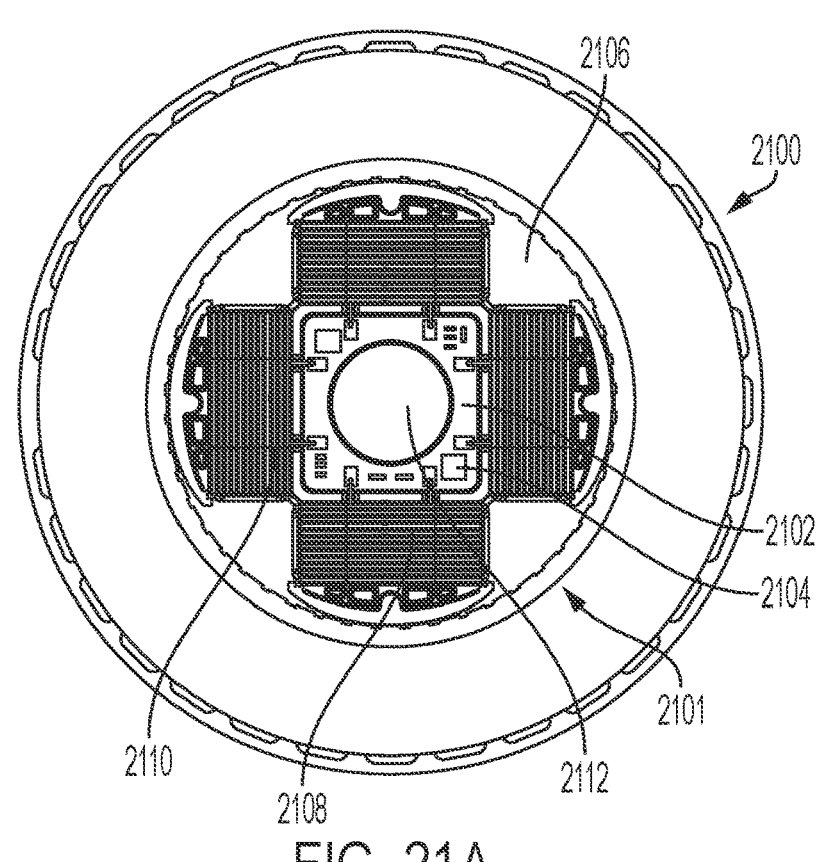
FIGS. 21A-21B are side and perspective views, respectively, of a motor including an actively-rectified rotor.
Figure 21B:
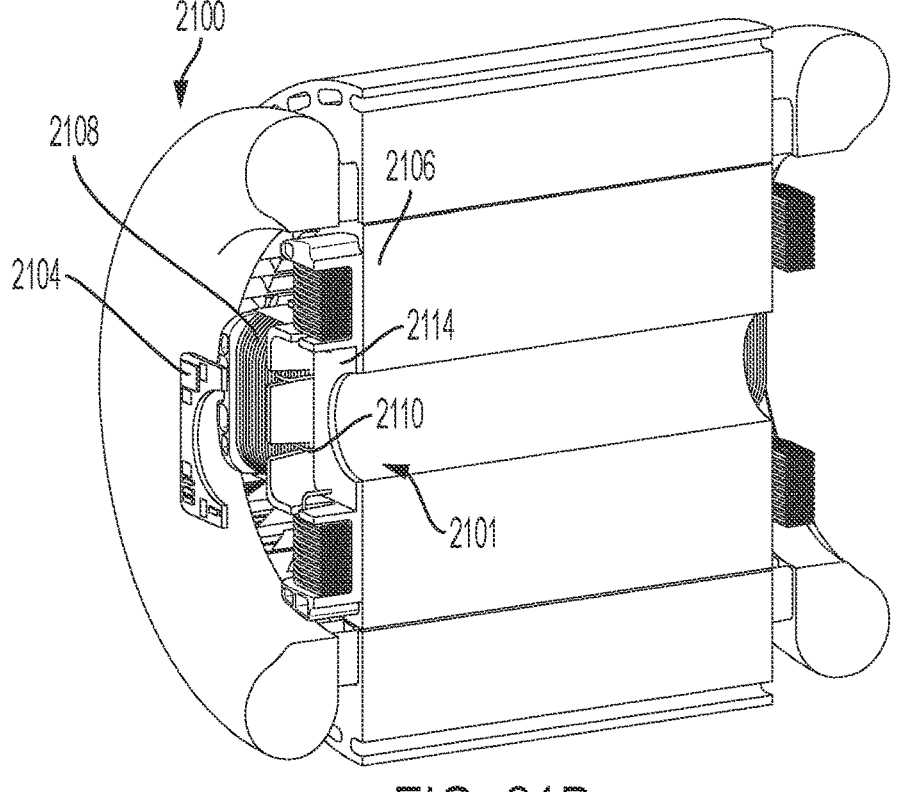

FIGS. 21A-21B shows an example mechanical implementation of a motor 2100 including an actively-rectified rotor 2101. A printed circuit board (PCB) 2102 includes circuit elements 2104, e.g., analog circuit elements, digital circuit elements, passive circuit elements, active circuit elements, and/or integrated circuits of an active rectifier and rotor control unit. The PCB 2102 is arranged axially on a core 2106 of the rotor 2101 and is conductively connected to rotor windings 2108 by interconnects 2110, e.g., wires or cables. The PCB 2102 defines a hole 2112 through which the motor axle may pass.

In some implementations, as shown in FIG. 21B, the PCB 2102 is disposed in an enclosure 2114 that secures the PCB 2102 in place.

Other configurations and placements for active rectifier circuits are also possible. For example, in some implementations the active rectifier circuit is included in a PCB that is disposed radially rather than axially on the rotor. In some implementations, portions of the active rectifier are distributed throughout multiple areas of the rotor, e.g., on two opposite axial surfaces of the rotor core.

Figures 21C, 21D, 21E:
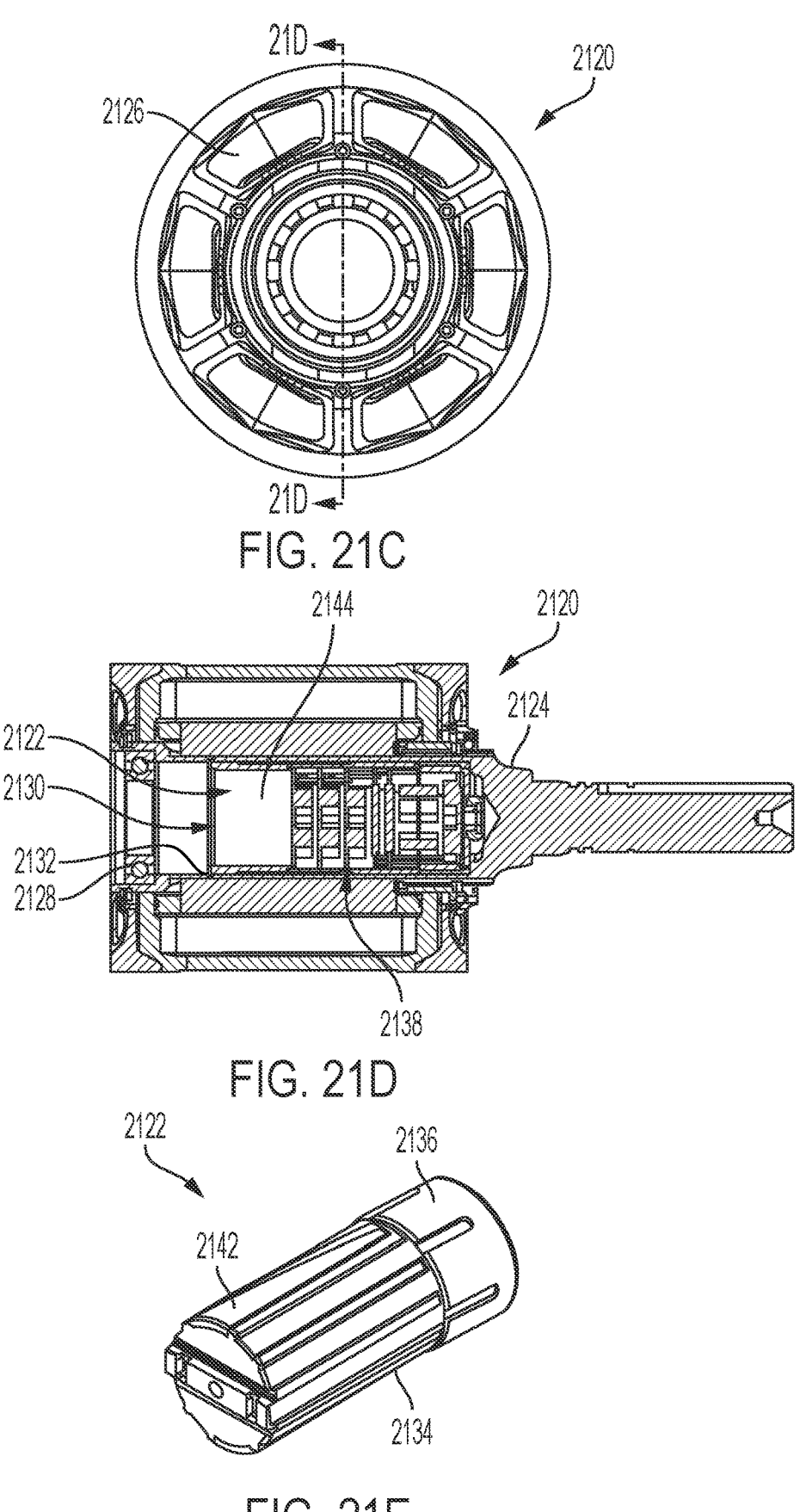
FIGS. 21C-F are views of a rotor including an active-rectifier.
Figure 21F:
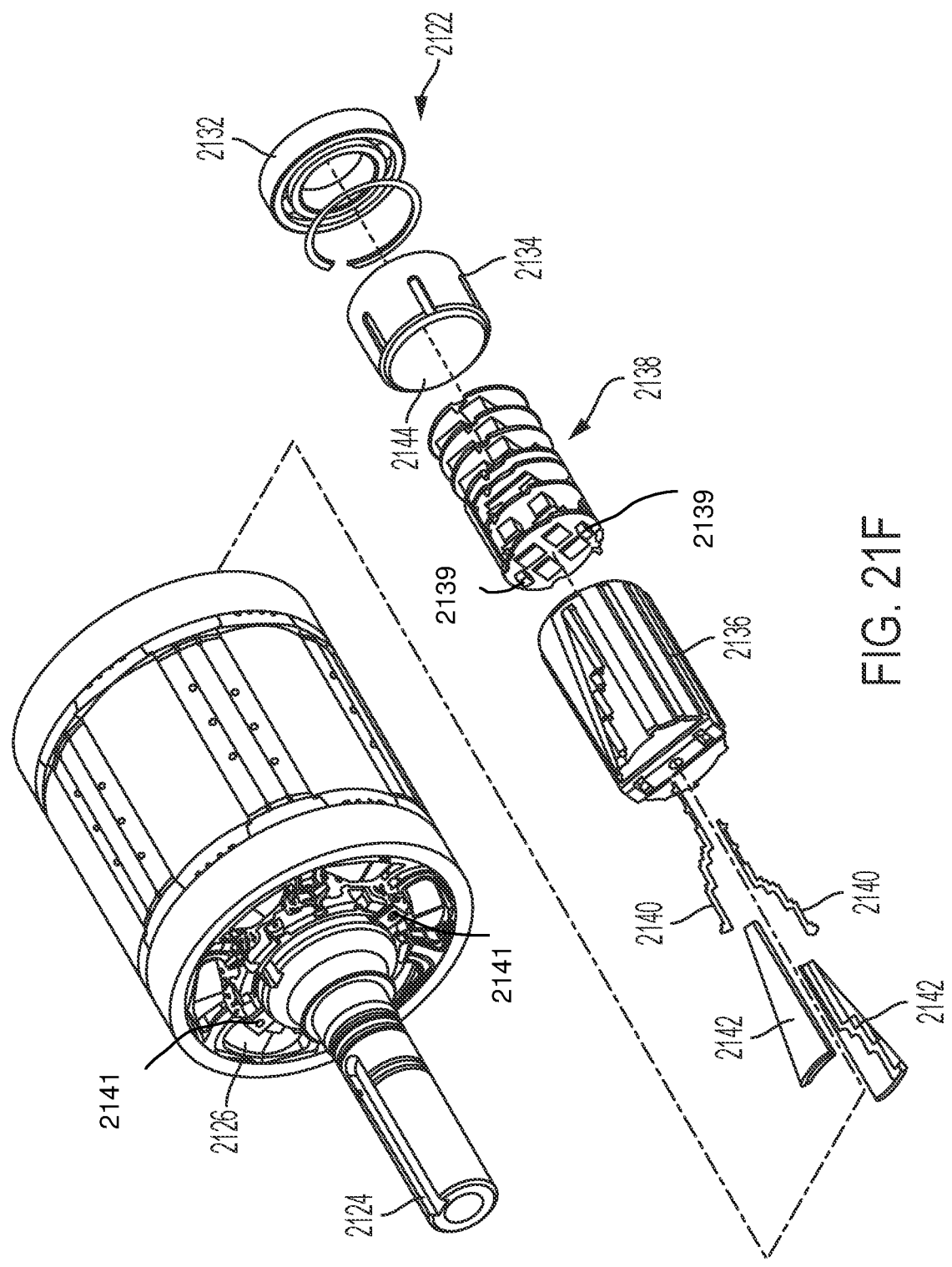

FIGS. 21C-F illustrate another example mechanical implementation of an actively-rectified rotor 2120 for use in a motor, such as the electric machine 300 of FIG. 3. More particularly, the rotor 2120 includes an active rectifier assembly 2122 integrated into a rotor shaft 2124 of the rotor 2120. FIG. 21C is an axial view of the rotor 2120; FIG. 21D is a cross-sectional view taken along the lines A-A of the axial view of FIG. 21C; FIG. 21E is a perspective view of the active rectifier assembly 2122; and FIG. 21F is an exploded view of the rotor 2120. With reference to FIG. 21C, the rotor 2120 includes six rotor windings 2126. With reference to FIG. 21D, the rotor shaft 2124 is fixedly coupled to the rotor 2120 such that the rotor shaft 2124 rotates with the rotor 2120. The rotor shaft 2124 and the rotor 2120 rotate about a bearing 2128 that has a stationary portion rotationally fixed with respect to a stator of the electric machine incorporating the rotor 2120. The rotor shaft 2124 further includes a cavity 2130 that is selectively accessible via removal and attachment of a cap or retainer 2132 at the shaft housing. The cavity 2130 receives and retains the active rectifier assembly 2122 such that the active rectifier assembly 2122 is also fixedly coupled to the rotor 2120 (e.g., via adhesive, friction, the cap 2132, a key, seat, retainer, or other mechanism for physical attachment, etc.). Accordingly, the active rectifier assembly 2122 is rotationally fixed with respect to the rotor 2120 and the rotor shaft 2124, such that the active rectifier assembly 2122 rotates with the rotor 2120 and the rotor shaft 2124.

Turning to FIG. 21E, the active rectifier assembly 2122 forms a cartridge including a main body 2134, capacitor, and cap or housing 2136. In the exploded view of FIG. 21F, a stack of printed circuit board (PCBs) 2138 including the circuit elements (e.g., analog circuit elements, digital circuit elements, passive circuit elements, active circuit elements, and/or integrated circuits) of an active rectifier and rotor control unit is illustrated. In other words, the PCB stack 2138 includes the active rectifier and rotor control unit of the active rectifier assembly 2122 of the rotor 2120. The active rectifier and rotor control unit may be any of the active rectifier and rotor control units described herein (e.g., with respect to FIG. 6A-B, 7B, 9, 10, 12-16, 18-19, or 20A). For example, the active rectifier may include an h-bridge (full or asymmetric) with switches (e.g., MOSFETS, IGBTs, GaN transistors, etc.) and/or diodes, and the rotor control unit may include a local microcontroller (MCU) with low voltage power supply. The active rectifier and/or rotor control unit, and, thus, the PCB stack 2138, is/are conductively connected to the rotor windings 2126 by interconnects 2139 at the PCB stack 2138, e.g., conductors passed through a passage in the shaft to access the rotor windings. In some embodiments, the rotor windings may be linked at a PCB or interconnect 2141 located outside the shaft 2124, which then interfaces to the PCB stack 2138 (and the components thereon) through the interconnect at 2139. Within the PCB stack 2138, low voltage connectors are present, alongside high voltage bus bar interconnects 2140. The bus bars 2140 may be covered and retained by respective insulative plates 2142, which may be retained in position by adhesive, ultrasonic welding, or mechanical retention by the cartridge component housing 2136. Alternatively, in certain embodiments, bus bar interconnects may be located inside 2136 along with the PCB stack 2138. The active rectifier assembly 2122 may further include an energy storage element, such as a capacitor 2144, and/or capacitors on one or more of the PCBs of the PCB stack 2138 (e.g., in the illustrated example, three rightmost PCBs of the PCB stack 2138 include film capacitors). In other examples, the active rectifier assembly 2122 includes, in addition to or instead of the capacitor 2144, an inductor, supercapacitor, or secondary (rechargeable) battery. Additionally, in certain embodiments these energy storage devices may be used in combination. The energy storage element is coupled to the active rectifier of the PCB stack 2138 for storing electrical energy wirelessly transferred by the stator and captured by the active rectifier, as described herein. The various circuit boards of the PCB stack 2138 may be connected to each other through connectors, contacts, harnesses, soldering, or the like.

At least in some embodiments, the cartridge form factor of the active rectifier assembly 2122 enables drop-in assembly and replacement, as well as effective voltage isolation between the components and boards. The cartridge may also be sealed, or sealed within the cavity 2130, to prevent fluid ingress into the active rectifier assembly 2122, thereby enabling of use of direct cooling flow throughout and across active rectifier assembly 2122. Thus, the embodiment of FIGS. 21C-F, as well as the embodiment of FIGS. 21G-J that follows, may allow for one or more of the following: (1) improved cooling—direct liquid cooling (submerged or sprayed), (2) isolation from the machine cavity, (3) smaller forces on the active rectifier circuitry, (4) increased power density, or (5) improved maintenance and assembly ease based on the subassembly cartridge.

Figures 21G, 21H, 21I:
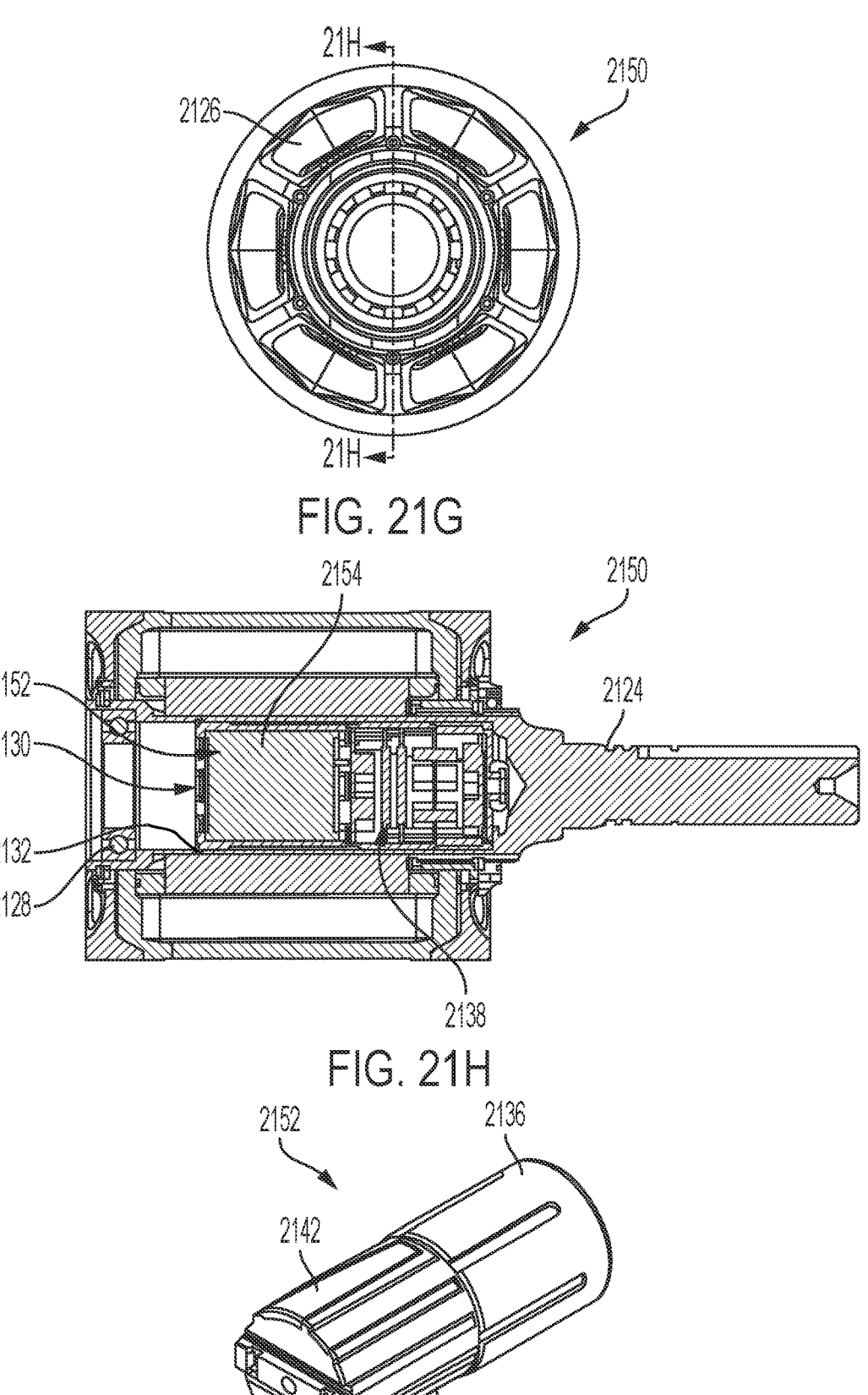
FIGS. 21G-J are views of another rotor including an active-rectifier.
Figure 21J:
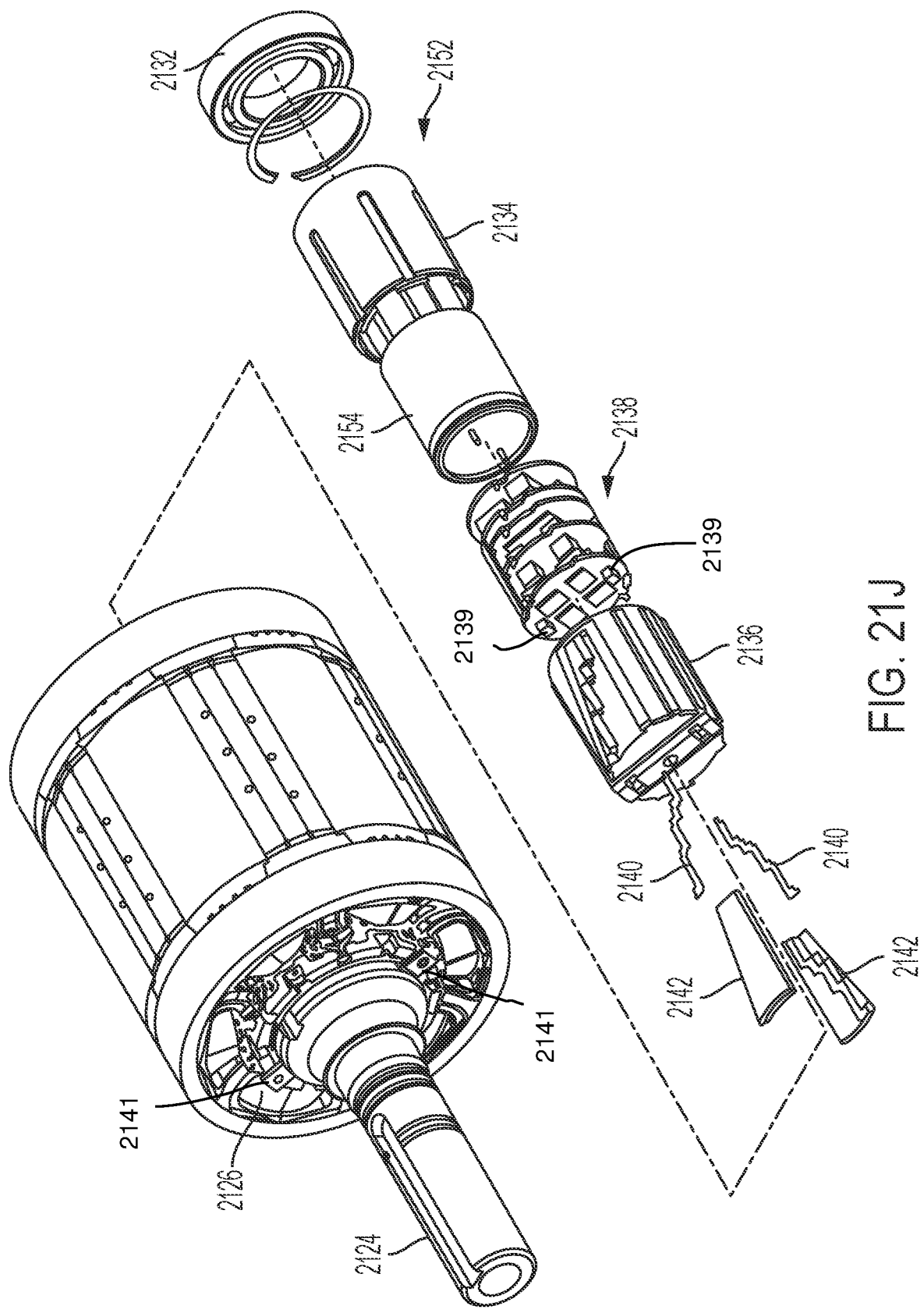

FIGS. 21G-J illustrate another example mechanical implementation of an actively rectified rotor 2150 for use in a motor, such as the electric machine 300 of FIG. 3. More particularly, the rotor 2150 includes an active rectifier assembly 2152. FIG. 21G is an axial view of the rotor 2150; FIG. 21H is a cross-sectional view taken along the lines A-A of the axial view of FIG. 21G; FIG. 21I is a perspective view of the active rectifier assembly 2152; and FIG. 21J is an exploded view of the rotor 2150.

The embodiment of FIGS. 21G-J is similar to the embodiment of FIGS. 21C-F, except for the inclusion and accommodation of a larger capacitor 2154 (see FIGS. 21H and 21J) in place of the capacitor 2144 shown in FIGS. 21D and 21F. Accordingly, like numerals are used to label the components of the rotor 2150 as was used to label the components of the rotor 2120, and a similar description as provided above applies to the similarly numbered components of the rotor 2150.

Motor Control

Figure 22:
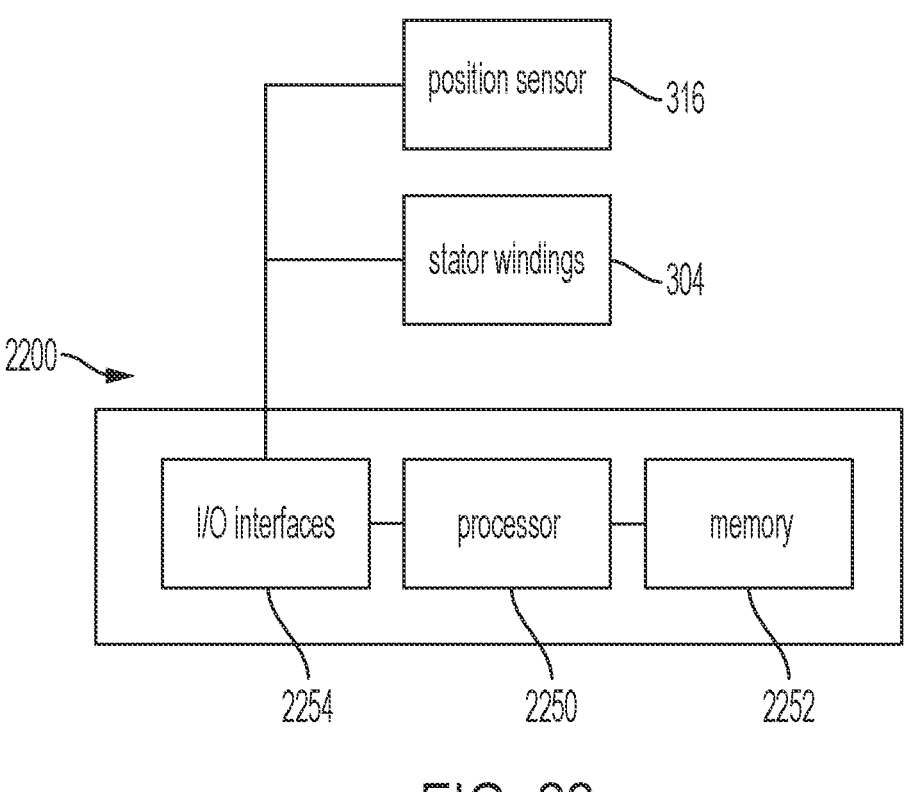
FIG. 22 is a block diagram of an example controller that can be used with aspects of this disclosure.

FIG. 22 is a block diagram of an example controller 2200 that can be used with aspects of this disclosure. Controller 2200 can be used in addition to or in lieu of motor controller 104 previously described. In the former instance, controller 2200 and motor controller 104 can be combined into a single, integrated controller, or controller 2200 and motor controller 104 can be separate, discrete controllers. The controller 2200 can, among other things, monitor parameters of the electric machine 300 and send signals to actuate and/or adjust various operating parameters of the electric machine 300. It should be noted that the active rectifier 311 (e.g., of FIGS. 3A and 3B) can include any of the active circuitry described within this disclosure and may be controlled by the controller 2200, e.g., to actuate and/or adjust operating parameters of the electric machine 300. Further, although primarily described with respect to the electric machine 300, the controller 2200 can be used in conjunction with any of the electric machines described herein (e.g., including the electric motor 102) in a similar manner as with the electric machine 300. In other words, the controller 2200 can, among other things, monitor parameters of the electric machines, actuate and/or adjust various operating parameters of the electric machines (e.g., by, among other things, controlling the active rectifier of these electric machines). The active rectifier of these machines can take the form of any of the active rectifiers described herein.

As shown in FIG. 20, the controller 2200, in certain instances, includes a processor 2250 (e.g., implemented as one processor or multiple processors) and a memory 2252 (e.g., implemented as one memory or multiple memories) containing instructions that cause the processors 2250 to perform operations described herein. The processors 2250 are coupled to an input/output (I/O) interface 2254 for sending and receiving communications with components in the electric machine 300, including, for example, a rotor position sensor or a current sensor. In certain instances, the controller 2200 can additionally communicate status with and send actuation and/or instruction signals to one or more of the various electric machine components (including power or drive signals to the stator) of the electric machine 300 as well as other sensors (e.g., temperature sensors, vibration sensors, and other types of sensors) provided in the electric machine 300. The communications can be hard-wired, wireless, or a combination of wired and wireless. In some implementations, the controller 2200 can be a distributed controller with different portions located within different locations, for example, different parts of a vehicle. Additional controllers can be used in conjunction with controller 2200 as stand-alone controllers or networked controllers without departing from this disclosure.

The controller 2200 can have varying levels of autonomy for controlling the electric machine 300. For example, the controller 2200 can begin sensing a change in load and/or speed, and an operator adjusts the power frequency, current magnitude, and/or current angle. Alternatively, the controller 2200 can begin sensing a change in load and/or speed, receive an additional input from an operator, and adjust the frequency, current magnitude, and/or current angle with no other input from an operator. Alternatively, the controller 2200 can begin sensing a change in load and/or speed and adjust the frequency, current magnitude, and/or current angle with no input from an operator.

For example, in operation, the controller 2200 can be a controller configured to energize the stator windings and produce the stator magnetic field within the stator by sending an instruction signal to the stator windings 304. For example, the controller 2200 can generate control signals (e.g., respective pulse-width modulated (PWM) control signals) for switching elements to control application of current from a power supply to the stator windings (e.g., as described further below with respect to switch controllers and switching elements of FIGS. 25-26). The controller can be configured to produce the stator magnetic field by sending a current through the stator at a current angle and magnitude, and actively adjusting the current angle and magnitude depending upon operation conditions of the electric machine 300. Alternatively or in addition, the controller 2200 can receive a position stream from the position sensor 316. The position stream is representative of the rotor position. The position stream can be an analog or digital electrical or electromagnetic signal. Responsive to receiving the position stream, the controller 2200 can determine the presence, absence, or severity of any torque ripple that is present. The controller 2200 can then adjust a current angle and/or current magnitude responsive to determining a torque ripple is present.

In some implementations, the current phasor angle 318 is increased ahead of the rotor pole 308 in the direction of movement during high torque conditions. That is, in instances where greater current per torque unit is required can lead to an increased current phasor angle 318. In general, as the current phasor angle 318 increases, the rotor coils 310 become more active (more current flowing through the coils) due to a lessened D-axis component. In other words, the field of each rotor winding decays faster as the current phasor angle 318 increases. The greater activity within the coils can lead to increased torque ripple without mitigation; however, a current amplitude can be increased during the increase the D-axis component experienced by each pole, counter acting the potential negative torque produced by the increased current phasor angle 318. Alternatively or in addition, the current phasor angle 318 is decreased during high-speed, low torque operations. Alternatively or in addition, the current angle can become negative during braking operations. Regardless of the operating mode used, the controller 2200 is capable of adjusting the current angle and/or the current amplitude to meet the present demands of the electric machine 300 in a given situation. The controller 2200 is capable of communicating with the rotor, through the stator, at a wide range of frequencies, for example, between 50 and 1000 Hertz (Hz). In some implementations, the communication occurs between 100 and 1000 Hz. Regardless, the system is able to communicate changes faster than traditional systems. For example, a traditional squirrel-cage induction machine communicates at substantially 7 Hz. The ability for higher frequency transmission allows for the controller 2200 to actively reduce torque ripple, regardless of operating condition, and to quickly adjust to changes in operating conditions.

Alternatively or in addition, the controller 2200 can communicate to and control the active rectifier 311 on the rotor. As such, a current through the rotor winding can be actively adjusted alternatively or in addition to the phasor current angle and/or magnitude.

FIG. 23 is a flowchart of a method 2300 that can be used with aspects of this disclosure. All or part of method 2300 can be performed by the controller 2200, the motor controller 104, an active rectifier, and/or a rotor control unit, consistent with this disclosure. Stator currents are sent through stator windings in a stator of a motor, the stator currents producing magnetic fields that directly couple to rotor windings in a rotor of the motor to cause movement of the rotor with respect to the stator (2302). One or more data signals are embedded in the stator currents, the data signals configured to produce modulation of the magnetic fields produced by the stator currents (2304). The modulation is such that, when the modulation is received by one or more rotor windings of the rotor windings, an active rectifier is controlled responsive to the received modulation.

FIG. 24 is a flowchart of a method 2400 that can be used with aspects of this disclosure. All or part of method 2400 can be performed by the controller 2200, the motor controller 104, an active rectifier, and/or a rotor control unit, consistent with this disclosure. Stator windings of a stator are energized to produce a stator magnetic field within the stator (2402). A corresponding rotor magnetic field within ferromagnetic material within a rotor pole is modified by the stator magnetic field by establishing a magnetic flux (2404). A force tangential to the rotor is generated by a shift in the stator magnetic field (2406). The rotor is moved by the generated tangential force (2408). A data signal is generated by the energized stator windings (2410). The data signal is such that, when the data signal is received by at least one rotor winding, an active rectifier is controlled responsive to the received data signal, to control a delay of energization of flux in an air gap, the air gap being defined between an inner surface of the stator and an outer surface of the rotor, and, responsive to the received data signal, a decay of a magnetic flux within the rotor is controlled by current within the at least one rotor winding in response to the magnetic field shift.

Figure 25:
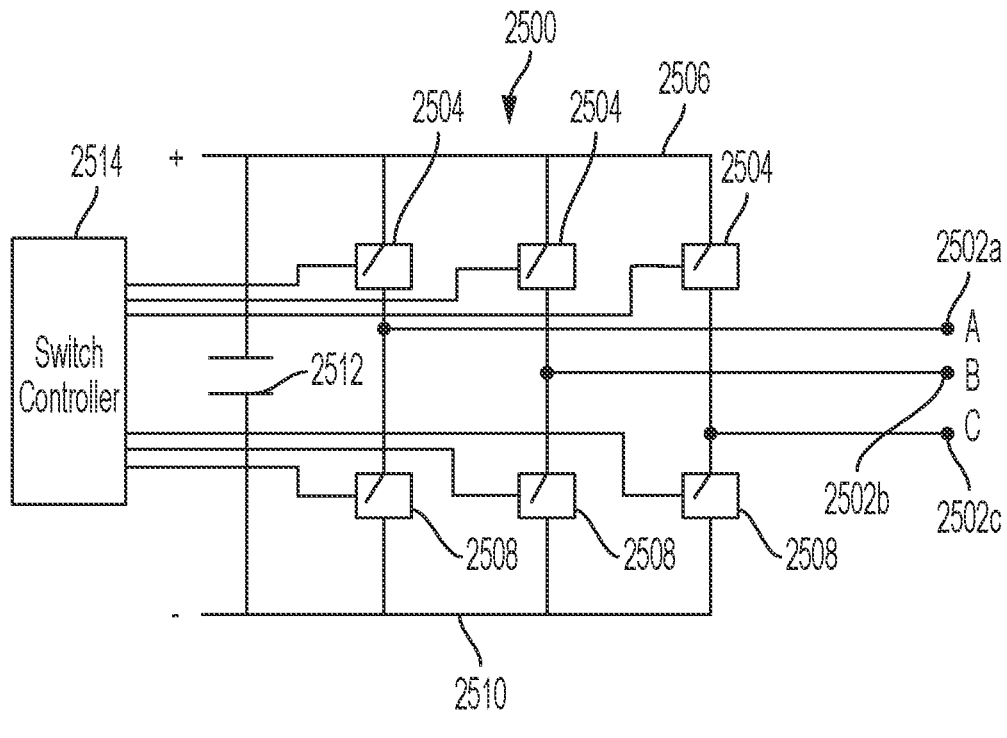
FIG. 25 is a schematic diagram of an inverter circuit topology that can be used with aspects of this disclosure.
Figure 26:
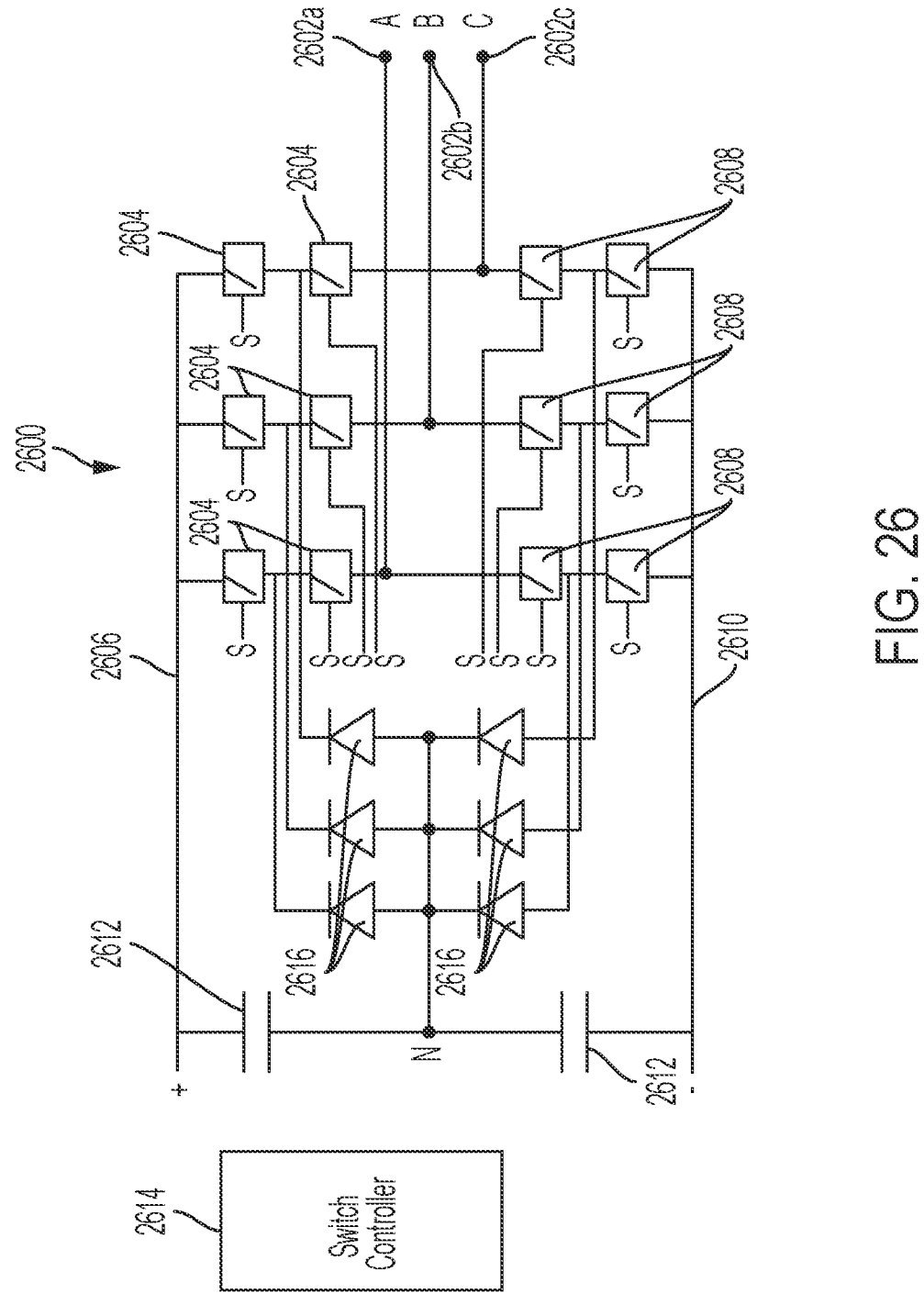
FIG. 26 is a schematic diagram of an inverter circuit topology that can be used with aspects of this disclosure.

FIGS. 25-26 show example inverters 2500, 2600 configured to implement power switching. The inverters 2500, 2600 may be implemented as part of, for example, motor controller 104, the controller 2200, and/or as part of a stator or rotor, as described throughout this disclosure.

In the example of FIG. 25, the inverter 2500 is a three-phase two-level inverter. Stator windings A, B, and C (not shown, conductively coupled at nodes 2502a, 2502b, 2502c) are switchably conductively coupled, by switches 2504, to a positive voltage rail 2506, and are also switchably conductively coupled, by switches 2508, to a negative voltage rail 2510. The stator windings themselves may be configured in, for example, a wye configuration or a delta configuration. The rails 2506, 2510 are conductively coupled by a capacitor 2512. In some implementations, the rails 2506, 2510 corresponding to currents sources instead of voltage sources.

A switch controller 2514 actively controls the switches 2504, 2508 to implement three-phase power in the stator windings (e.g., to cause movement of a rotor) and/or to transmit signals to the rotor using appropriate voltages/currents in the stator windings. In some embodiments, the switch controller 2514 may be incorporated into the controller 104 or the controller 2200.

FIG. 26 shows an example three-level neutral point clamp (NPC) inverter 2600, which operates as described for inverter 2500 except where indicated otherwise. Stator windings A, B, and C (not shown, conductively coupled at nodes 2602a, 2602b, 2602c) are switchably conductively coupled, by paired switches 2604, to a positive voltage rail 2606, and are also switchably conductively coupled, by paired switches 2608, to a negative voltage rail 2610. Paired diodes 2616 are conductively coupled between respective sets of paired switches 2604, 2608. The switches 2604, 2608 are controlled by a switch controller 2614. In some embodiments, the switch controller 2614 may be incorporated into the controller 104 or the controller 2200.

In the example inverter 2600, the stator windings A, B, and C are conductively coupled to a neutral point N (e.g., in a star configuration); the conductive coupling to the neutral point N may be direct or with one or more interceding electrical elements. The neutral point N is also conductively coupled within each pair of diodes 2616. Two capacitors 2612 conductively couple the neutral point N to the positive and negative voltage rails 2606, 2610. As noted for the inverter 2500, in some implementations the rails 2606, 2610 represent a current source instead of a voltage source.

In some examples, one or more of the controllers 104, 2200, 2514 or 2614 include or are implemented as a multiple input, multiple output (MIMO) controller that, for example, includes two inputs to receive current errors on the R and D axes (e.g., $I_{R\_Error}=I_{R\_Desired}-I_{R\_Measured}$; $I_{D\_Error}=I_{D\_Desired}-I_{D\_Measured}$) and two outputs to control voltage on the R and D axes. Here, $I_{R\_Desired}$ and $I_{D\_Desired}$ may be pre-set values and/or values translated from an input torque or speed operating point value input to the motor system (e.g., received from a user input device or retrieved from a memory), where the translation from speed or torque to desired currents (or voltages) may be performed by a lookup table, dynamic feedback controller, or model-based controller. $I_{R\_Desired}$ and $I_{D\_Desired}$ may also incorporate or have embedded therein any desired data signal or power transfer signal (which may be generally referred to as $I_{R\_excitation}$ and $I_{D\_excitation}$ signals) to be transmitted from the stator to the rotor, or from the rotor to the stator, as described herein. $I_{R\_Measured}$ may be obtained from a current sensor or estimator on the rotor and communicated to the controller wirelessly via the data signals communicated from the rotor winding to the stator windings, as described herein (e.g., via modulations applied by the active rectifier along a control channel or axes). Alternatively, this may be directly measured on the rotor through a sensor, estimator, or observer. $I_{D\_Measured}$ may be obtained by transforming current measurements or estimates for the phases of the stator to the RDQN reference frame (e.g., using the Clarke and Park transforms). The R-axis voltage output of the MIMO controller may be wirelessly communicated to the rotor as a data signal using the techniques described herein, and may be used to control the active rectifier to achieve the desired voltage level on the rotor winding (e.g., as described above with respect to FIG. 7B). Alternatively, in certain embodiments, the $I_{R\_excitation}$ may be imposed by the stator to the rotor where the rotor signal is passed through a pattern embedded in the stator signal ($I_{D\_excitation}$). The $I_{D\_excitation}$ signal will cause the rotor circuit (e.g., active rectifier) to control the rotor winding(s) to cause the rotor to be in quadrature (i.e., 90° out of phase) to that signal. In response to the rotor being in quadrature to the $I_{D\_excitation}$ signal, the $I_{R\_excitation}$ signal would effectively result on the rotor winding(s). This signal transmission may be described as a secondary objective and denoted by a magnitude and frequency of desired rotor signal delivered by the stator ($I_{D\_excitation}$), whereby the rotor controller can choose its phase of operation relative to the stator signal alongside its primary IR operation. Primary operation may be described as establishing a magnetic field that may result in torque. Conversely, a secondary objective is a signal on either the stator and/or rotor that results in a transfer of energy from the stator to the rotor, or alternatively a signal between the two, but without a significant change in torque or magnetic field energy. The D-axis voltage output may be transformed from the RDQN reference frame to a stationary reference frame of the stator to provide desired voltage levels for each stator phase (e.g., $V_A$, $V_B$, $V_C$ in a three-phase system). These desired voltage levels may be provided as inputs to a lookup table, function, model, or algorithm that maps desired voltage levels to PWM duty cycles for switching elements that drive stator coils for each phase (see, e.g., switching elements 2504 and 2604 of FIGS. 25 and 26). The controller may then drive these switching elements according to the determined duty cycles. In operation, the MIMO controller may continuously receive and sample the input current errors and generate the output control voltages to drive the rotor and stator (according to their primary and secondary objectives).

Figure 27:
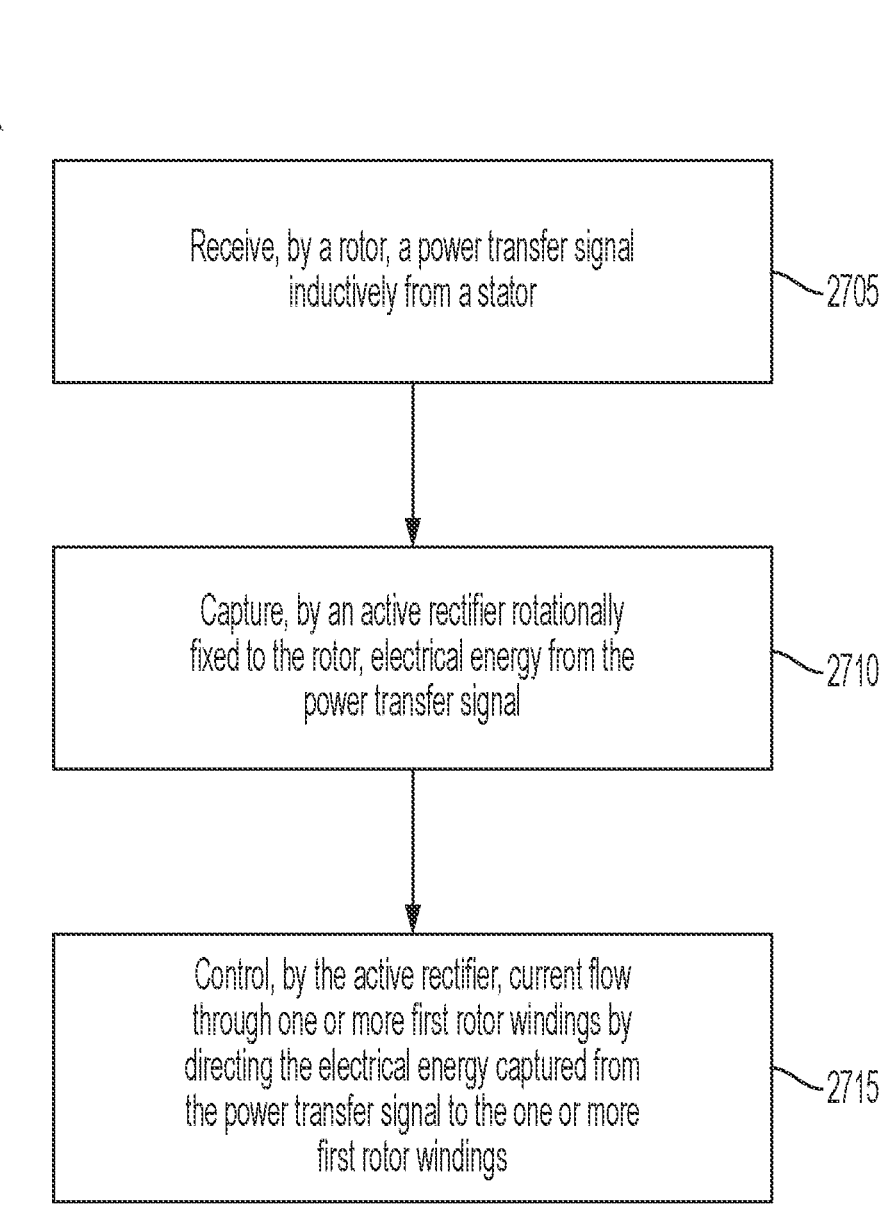
FIG. 27 is a flowchart of a method that can be used with aspects of this disclosure.

FIG. 27 is a flowchart of a method 2700 that can be used with aspects of this disclosure. All or part of method 2700 can be performed by the controller 2200, the motor controller 104, an active rectifier, and/or a rotor control unit, consistent with this disclosure. The method 2700 may also be implemented by other controllers and systems.

In block 2705, a rotor receives a power transfer signal wirelessly from a stator. Here, the stator includes stator windings configured to be energized to define stator poles and the rotor includes rotor windings configured to be energized to define rotor poles. The rotor poles may interact (e.g., magnetically interact or magnetically couple) with the stator poles to produce relative force between the rotor and the stator. The stator may be, for example, the stator 108, the stator 302, or another stator described herein. Similarly, the rotor may be the rotor 106, the rotor 304, the rotor 2101, the rotor 2120, the rotor 2150, or another rotor described herein. The stator windings may be energized via a torque control signal generated by a controller (e.g., the controller 104 or 2200), as described herein, to define the stator poles. For example, the controller may incorporate a switch controller (e.g., the switch controller 2514 or 2614) to drive switching elements of an inverter bridge to apply the torque control signal to the stator windings (see, e.g., FIGS. 25 and 26). The torque control signal may be generated along one or more control channels or axes of the motor (e.g., D-axis, Q-axis, N-axis, M-axis, K-axis, etc.). The stator poles and rotor poles are associated with respective magnetic fields that interact, resulting in a torque on the rotor (e.g., to rotate the rotor).

Further, the stator pole and rotor poles may interact to establish a field in the air gap, as well as current on the rotor. This establishing of current on the rotor may be done through transmission of signals between the stator and the rotor, where, in order to transmit the power transfer signal from the stator to the rotor, the controller may drive the stator windings using one or more of the techniques described throughout this disclosure. For example, the power transfer signal may be injected along a control channel or axis (e.g., D-axis, Q-axis, N-axis, M-axis, K-axis, etc.), resulting in a modulating signal (modulated in amplitude or frequency) through the stator windings along the control channel or axis, which induces the power transfer signal in one or more rotor windings of the rotor. These power signals, and/or data signals, may be passed separately, or in conjunction with the torque control signal.

In block 2710, an active rectifier captures electrical energy from the power transfer signal. Here, the active rectifier is rotationally fixed to the rotor and is conductively coupled to one or more first rotor windings of the rotor windings. The active rectifier may be the active rectifier 311, 500, 510, 602, 718, 900, 1000, 1200, 1300, 1400, 1500, 1600, 1900, 2000, or another active rectifier. To capture the electrical energy, the active rectifier is controlled by corresponding control circuitry (see, e.g., an on-rotor microprocessor or gate drive unit). For example, the control circuitry drives switching elements of the active rectifier (e.g., with respective PWM signals) to cause the electrical energy from the modulating power transfer signal to be stored on one or more discrete, separate energy storage elements (e.g., a capacitor, inductor, battery, super capacitor, etc. as described and shown herein in various circuit diagrams and drawings) and may also include the rotor windings themselves (with the rotor windings acting as an inductor). The energy storage elements may help maintain a rotor bus voltage, e.g., to power the rotor winding(s) for torque production simultaneous with reception of wireless power or data transfer from the stator. Alternatively or additionally, to capture the electrical energy, the control circuitry may drive switching elements of the active rectifier (e.g., with respective PWM signals) to cause the electrical energy from the modulating power transfer signal to continue to flow in the active rectifier and rotor winding(s), causing the active rectifier and rotor winding(s) to act as resonant circuit or a forward converter, where the electrical energy is captured at approximately the same rate the electrical energy is output.

In block 2715, the active rectifier controls current flow through the one or more first rotor windings by directing the electrical energy captured from the power transfer signal to the one or more first rotor windings. To control the current flow, the active rectifier is controlled by the corresponding control circuitry (see, e.g., the on-rotor microprocessor or gate drive unit). For example, the control circuitry drives the switching elements of the active rectifier (e.g., with respective PWM signals) to cause the captured electrical energy to flow from the energy storage element, rotor windings, or resonant circuit through the rotor winding at a desired magnitude and direction. In some examples, the active rectifier is driven to generate a periodic voltage signal (e.g., generally having a square wave shape) on the rotor winding that lags a stator D-axis voltage (see, e.g., FIG. 8). As shown in FIG. 8, this approach generally results in the capture of power while the rotor voltage is at a low portion of the square wave cycle (as shown by the capacitor voltage 806 rising), and drives the rotor winding with captured power when in the high portion of the square wave cycle (as shown by the capacitor voltage 806 falling). Additionally or alternatively, one or more of the other active rectifier control schemes described throughout the application (e.g., with respect to other active rectifier topologies) may also be used in block 2715.

As noted above, the method 2700 may be used with each of the active rectifier embodiments disclosed herein. In some embodiments, the method 2700 includes additional steps to accommodate particular features of specific active rectifier topologies, such as use of multiple active rectifiers and a shared capacitor (see, e.g., FIGS. 9-12), application of a low pass filter (see FIGS. 13-15), separation of AC and DC components (see, e.g., FIGS. 13-19), and application of a governor switch (see, e.g., FIG. 20A).

Additionally, as described above, in some examples, the captured electrical energy may also be applied to power other circuit elements on the rotor (e.g., an on-rotor microprocessor used to control the active rectifier). Further, as described above, in some examples, the active rectifier is controlled to transmit excess power captured by the rotor back to the stator and/or to transmit data to the stator (e.g., rotor position, rotor temperature, rotor current, or other state).

Local flux variations occur naturally as the rotor rotates due to slotting effects and may also be used to transfer power by generating an AC response due to a change in flux linkages. That is, an AC response is generated due to the tooth-pass frequency of the rotor pole passing teeth of the stator (assuming salient and/or concentrated stator windings). In implementations relying on such inherent variations, the high frequency variation/perturbation in the entire magnetic field may be reduced or unneeded. Advantageously, this approach may generate less losses (e.g., switching and core losses); however, these variations are not fully controllable because the tooth-pass frequency is a function of the rotational speed of the rotor. Higher rotational speeds tend to result in more effective AC responses as a function of local slotting effects and flux variations.

In some implementations of the electric machines and methods described herein, a hybrid scheme can be adapted such that a control scheme utilizes an AC imposition or injection (e.g., for wireless power transfer from the stator to the rotor) in addition to local flux variations. This provides a method for explicit control through the AC signal and the benefit of efficiency of the local flux variations (e.g., caused by slotting effects). For example, the injected AC signal can be relied upon at low speed, high torque conditions, or when a large torque step is needed. At higher rotational speeds and lower torque requirements, the local flux variations would be used as the flux demand would not be as high. Further details on such a hybrid control scheme are provided in and with respect to FIG. 20 of co-filed PCT/US22/19041 application, titled "Wirelessly transferring power within an electric machine having AC and DC rotor coils," and claiming priority to U.S. Provisional Application No. 63/157,563, the contents of which are hereby incorporated by reference in their entirety.

References in the claims to groups of windings denoted by different names do not imply that those groups are different or form distinct, separate sets, unless indicated in the claims.

Thus, particular implementations of the subject matter have been described. Other implementations and modifications are within the scope of the following claims and have the benefit of this disclosure. It is intended to embrace all such implementations and modifications and, accordingly, the above description to be regarded as illustrative rather than in a restrictive sense. In some cases, the actions recited in the claims can be performed in a different order and still achieve desirable results. In addition, the processes depicted in the accompanying figures do not necessarily require the particular order shown, or sequential order, to achieve desirable results, and various elements may be added, reordered, combined, omitted, or modified. Further, in some non-limiting examples, certain operations can be executed in parallel, including by dedicated parallel processing devices, or separate computing devices configured to interoperate as part of a large system.

One or more embodiments are described and illustrated in the following description and accompanying drawings. These embodiments are not limited to the specific details provided herein and may be modified in various ways. Furthermore, other embodiments may exist that are not described herein. Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

In some non-limiting examples, aspects of the present disclosure, including computerized implementations of methods, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, non-limiting examples of the invention can be implemented as a set of instructions, tangibly embodied on a non-transitory computer-readable media, such that a processor device can implement the instructions based upon reading the instructions from the computer-readable media. Some non-limiting examples of the invention can include (or utilize) a device such as an automation device, a special purpose or a (specifically programmed and configured) general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to the invention, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular non-limiting examples of the invention. Further, in some non-limiting examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

As used herein, the term, "controller" and "processor" and "computer" include any device capable of executing a computer program, or any device that includes logic gates configured to execute the described functionality. For example, this may include a processor, a microcontroller, a field-programmable gate array, a programmable logic controller, etc. As another example, these terms may include one or more processors and memories and/or one or more programmable hardware elements, such as any of types of processors, CPUs, microcontrollers, digital signal processors, or other devices capable of executing software instructions.

In addition, the phraseology and terminology used herein is for the purpose of description and should not be regarded as limiting. For example, the use of "comprising," "including," "containing," "having," and variations thereof herein is meant to encompass the items listed thereafter and equivalents thereof as well as additional items. Additionally, the terms "connected" and "coupled" are used broadly and encompass both direct and indirect connecting and coupling, and may refer to physical or electrical connections or couplings. The modifier "substantially," when used to modify a particular action, state, or other term (e.g., substantially closed), may refer to an amount that is apparent within the context of its use to one of skill in the art, and which, at least in some embodiments, refers to 90%, 95%, 99%, or 99.5% of the modified term. Furthermore, the phase "and/or" used with two or more items is intended to cover the items individually and both items together. For example, "a and/or b" is intended to cover: a; b; and a and b. Unless otherwise specified or limited, phrases similar to "at least one of A, B, and C," "one or more of A, B, and C," etc., are meant to indicate A, or B, or C, or any combination of A, B, and/or C, including combinations with multiple or single instances of A, B, and/or C.

What is claimed is:

1. An electric machine comprising:
a stator including stator windings configured to be energized to define stator poles;
a rotor including rotor windings configured to be energized to define rotor poles that interact with the stator poles to produce relative force between the rotor and the stator, the rotor configured to be magnetically coupled to the stator to receive a power transfer signal wirelessly from the stator; and
an active rectifier rotationally fixed to the rotor and conductively coupled to one or more first rotor windings of the rotor windings, the active rectifier being configured to:
capture electrical energy from the power transfer signal, and
control current flow through the one or more first rotor windings by directing the electrical energy captured from the power transfer signal to the one or more first rotor windings,
wherein the active rectifier is included in one or more circuit boards mounted on the rotor, and wherein the one or more circuit boards are integrated into a rotor shaft of the rotor.

2. The electric machine of claim 1, further comprising an energy storage element coupled to the active rectifier, wherein the active rectifier is further configured to store the electrical energy captured from the power transfer signal in the energy storage element, and wherein the directing of the electrical energy to the one or more first rotor windings includes drawing the electrical energy stored on the energy storage element and directing the electrical energy drawn to the one or more first rotor windings.

3. The electric machine of claim 1, wherein the rotor further receives a data signal wirelessly from the stator, the data signal encoding control information for the active rectifier, and the active rectifier is further configured to control the current flow through the one or more first rotor windings responsive to the control information.

4. The electric machine of claim 1, wherein
the rotor further includes a rotor control unit configured to estimate an operating state of the stator, based on the power transfer signal, to determine control information; and
the active rectifier is further configured to control the current flow through the one or more first rotor windings responsive to the control information.

5. The electric machine of claim 1, wherein the active rectifier includes controllable switches that are configured to be selectively controlled to capture the electrical energy from the power transfer signal and to control the current flow through the one or more first rotor windings.

6. The electric machine of claim 1, comprising a controller configured to:
control current through the stator windings to energize the stator windings to define the stator poles and to wirelessly transmit the power transfer signal to the rotor.

7. The electric machine of claim 1, wherein the rotor comprises permanent magnets embedded within the rotor.

8. The electric machine of claim 1, wherein each rotor winding associated with one of the rotor poles is conductively coupled to a singular corresponding active rectifier.

9. The electric machine of claim 1, comprising a rotor control unit configured to:
extract, from the power transfer signal received wirelessly from the stator, a data signal indicative of an operating setpoint for the rotor; and
control switching operations of the active rectifier responsive to the operating setpoint.

10. The electric machine of claim 1, comprising a rotor control unit configured to:
estimate, based on the power transfer signal received wirelessly from the stator, an operating state of the stator; and
control switching operations of the active rectifier responsive to the estimated operating state.

11. The electric machine of claim 1, wherein n rotor windings of the rotor windings are conductively coupled to one another, and wherein the electric machine further comprises a controller configured to:
apply, to the stator windings, a voltage including n voltage components, each voltage component coupling to a respective one of the n rotor windings by magnetic fields produced by a current corresponding to the voltage component,
wherein the n voltage components are each characterized by a distinct phase, the distinct phases being separated from one another by about 360/n degrees.

12. The electric machine of claim 11, wherein the n rotor windings are included in different respective pole pairs of the rotor.

13. The electric machine of claim 11, wherein the active rectifier comprises a shared capacitor conductively coupled to each of the n rotor windings, the shared capacitor storing energy while the active rectifier controls the direction of current flow in each of the n rotor windings.

14. The electric machine of claim 11, wherein the rotor comprises n additional rotor windings,
wherein each of the n additional rotor windings is included in a pole pair with a corresponding one of the n rotor windings, and
wherein the n rotor windings are conductively coupled to the n additional rotor windings by the active rectifier.

15. The electric machine of claim 1, comprising
a low-pass filter conductively coupled to the active rectifier and to the one or more first rotor windings.

16. The electric machine of claim 15, wherein a DC output of the low-pass filter is conductively coupled to a DC output of the active rectifier.

17. The electric machine of claim 1, wherein the active rectifier is configured to produce a substantially DC current in a first subset of the rotor windings and a substantially oscillating current in a second, different subset of the rotor windings.

18. A method of controlling a motor, the method comprising:
receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;
capturing, by an active rectifier rotationally fixed to the rotor, electrical energy from the power transfer signal, wherein the active rectifier is conductively coupled to one or more first rotor windings of the rotor windings;
controlling, by the active rectifier, current flow through the one or more first rotor windings by directing the electrical energy captured from the power transfer signal to the one or more first rotor windings; and receiving, by the rotor, a data signal wirelessly from the stator windings, the data signal encoding control information for the active rectifier, and a frequency of the data signal is independent of a frequency of a torque control signal sent to the stator windings to produce the relative force.

19. The method of claim 18, further comprising:

storing the electrical energy captured from the power transfer signal, by the active rectifier, in an energy storage element, the energy storage element coupled to the active rectifier, wherein the directing of the electrical energy to the one or more first rotor windings includes drawing the electrical energy stored on the energy storage element and directing the electrical energy that is drawn to the one or more first rotor windings.

20. The method of claim 18, wherein the controlling, by the active rectifier, of the current flow through the one or more first rotor windings is responsive to the control information.

21. The method of claim 18, further comprising:

estimating, by a rotor control unit of the rotor, an operating state of the stator, based on the power transfer signal, to determine control information; and wherein the controlling, by the active rectifier, of the current flow through the one or more first rotor windings is responsive to the control information.

22. The method of claim 18, further comprising:

selectively controlling controllable switches of the active rectifier to capture the electrical energy from the power transfer signal and to control the current flow through the one or more first rotor windings.

23. The method of claim 18, further comprising:

controlling by a controller, current through the stator windings to energize the stator windings to define the stator poles and to wirelessly transmit the power transfer signal to the rotor.

24. The method of claim 23, wherein, to control the current through the stator windings to energize the stator windings to define the stator poles, the controller sends a torque control signal to the stator windings at a current angle measured relative to a closest one of the rotor poles.

25. The method of claim 23, wherein, to control the current through the stator windings to wirelessly transmit the power transfer signal to the rotor, the controller sends the power transfer signal through the stator windings, the power transfer signal being different from the torque control signal.

26. The method of claim 23, further comprising:

controlling, by the controller, the current through the stator windings to send the data signal through the stator windings to wirelessly transmit the data signal to the rotor, the data signal being different from the torque control signal and including control information.

27. The method of claim 24, further comprising:

adjusting, by the controller, the current angle in response to operating conditions; and adjusting, by the controller, a current magnitude of the torque control signal in response to the operating conditions, wherein rotation of the rotor is maintained in synchronicity with magnetic fields of the stator poles produced by the stator windings during operation.

28. The method of claim 18, further comprising:

extracting, by a rotor control unit of the rotor, the data signal, the data signal indicative of an operating setpoint for the rotor from the power transfer signal received wirelessly from the stator; and controlling, by the rotor control unit, switching operations of the active rectifier responsive to the operating setpoint.

29. The method of claim 28, wherein the data signal is embedded in the power transfer signal by amplitude modulation or frequency modulation.

30. The method of claim 18, further comprising:

estimating, by a rotor control unit of the rotor, an operating state of the stator based on the power transfer signal received wirelessly from the stator; and controlling, by the rotor control unit, switching operations of the active rectifier responsive to the estimated operating state.

31. The method of claim 18, wherein n rotor windings of the rotor windings are conductively coupled to one another, and wherein the method further comprising:

applying, to the stator windings, a voltage including n voltage components, each voltage component coupling to a respective one of the n rotor windings by magnetic fields produced by a current corresponding to the voltage component, wherein the n voltage components are each characterized by a distinct phase, the distinct phases being separated from one another by about 360/n degrees.

32. The method of claim 18, comprising filtering signals, by a low-pass filter, between the active rectifier and the one or more first rotor windings, where the low-pass filter is conductively coupled to the active rectifier and to the one or more first rotor windings.

33. The method of claim 18, further comprising:

introducing, by the active rectifier, a zero-sequence into a periodic voltage induced in the one or more first rotor windings by the stator windings.

34. The method of claim 18, further comprising:

causing, by the active rectifier, in the one or more first rotor windings, a periodic voltage shifted about 90 degrees compared to a corresponding periodic voltage in the stator windings.

35. The method of claim 18, further comprising:

producing, by the active rectifier, a non-zero DC current as the current flow through the one or more first rotor windings.

36. The method of claim 18, wherein magnetic fields associated with the stator poles and produced by the stator windings include a D component substantially in-line with a corresponding rotor pole, and a Q component 90° ahead of the corresponding rotor pole within an electrical reference frame, and wherein the power transfer signal is included in modulations of the D component, in modulations of the Q component, or in modulations of both the D component and the Q component.

37. The method of claim 18, wherein magnetic fields associated with the stator poles and produced by the stator windings include a D component substantially in-line with a corresponding rotor pole, a Q component 90° ahead of the corresponding rotor pole within an electrical reference frame, and a z component orthogonal to the D component and the Q component, and wherein the power transfer signal is included in modulations of the z component.

38. The method of claim 18, wherein the power transfer signal provides a wireless transfer of power for energizing the one or more first rotor windings, wherein the power transfer signal is received wirelessly along a first controllable axis on which the stator and rotor are inductively coupled, and wherein the data signal is received wirelessly along a second, different controllable axis on which the stator and rotor are coupled.

39. The method of claim 18, wherein the power transfer signal provides a wireless transfer of power for energizing the one or more first rotor windings and the rotor further receives the data signal wirelessly from the stator windings, the data signal encoding control information for the active rectifier, wherein the power transfer signal and the data signal are received wirelessly along a first controllable axis on which the stator and rotor are wirelessly magnetically coupled, the first controllable axis being an axis of a rotational reference frame.

40. The method of claim 18, wherein the power transfer signal is received wirelessly by the rotor along a controllable axis on which the stator and rotor are magnetically coupled based on modulated amplitudes of magnetic fields of the stator, modulated frequencies of magnetic fields of the stator, or both.

41. The method of claim 18, further comprising:

producing, by the active rectifier, a substantially DC current in a first subset of the rotor windings and a substantially oscillating current in a second, different subset of the rotor windings.

42. The method of claim 18, further comprising applying n periodic voltages to the stator windings, wherein the n periodic voltages are timed to couple respectively, by stator currents associated with the n periodic voltages, to n rotor windings, the n rotor windings conductively coupled to one another, and wherein the n periodic voltages are each characterized by a distinct phase, the distinct phases being separated from one another by about 360/n degrees.

43. The method of claim 18, further, wherein the active rectifier is controlled to apply low-pass filtering to voltages in the one or more first rotor windings.

44. An electric machine comprising:

a stator including stator windings configured to be energized to define stator poles;

a rotor including rotor windings configured to be energized to define rotor poles that interact with the stator poles to produce relative force between the rotor and the stator, the rotor configured to be magnetically coupled to the stator to receive a power transfer signal wirelessly from the stator, wherein each rotor winding associated with one of the rotor poles is conductively coupled to a singular corresponding active rectifier; and an active rectifier rotationally fixed to the rotor and conductively coupled to one or more first rotor windings of the rotor windings, the active rectifier being configured to:

capture electrical energy from the power transfer signal, and control current flow through the one or more first rotor windings by directing the electrical energy captured from the power transfer signal to the one or more first rotor windings.

45. An electric machine comprising:

a stator including stator windings configured to be energized to define stator poles;

a rotor including rotor windings configured to be energized to define rotor poles that interact with the stator poles to produce relative force between the rotor and the stator, the rotor configured to be magnetically coupled to the stator to receive a power transfer signal wirelessly from the stator;

an active rectifier rotationally fixed to the rotor and conductively coupled to one or more first rotor windings of the rotor windings, the active rectifier being configured to:

capture electrical energy from the power transfer signal, and control current flow through the one or more first rotor windings by directing the electrical energy captured from the power transfer signal to the one or more first rotor windings; and a rotor control unit configured to:

extract, from the power transfer signal received wirelessly from the stator, a data signal indicative of an operating setpoint for the rotor; and control switching operations of the active rectifier responsive to the operating setpoint.

46. An electric machine comprising:

a stator including stator windings configured to be energized to define stator poles;

a rotor including rotor windings configured to be energized to define rotor poles that interact with the stator poles to produce relative force between the rotor and the stator, the rotor configured to be magnetically coupled to the stator to receive a power transfer signal wirelessly from the stator;

an active rectifier rotationally fixed to the rotor and conductively coupled to one or more first rotor windings of the rotor windings, the active rectifier being configured to:

capture electrical energy from the power transfer signal, and control current flow through the one or more first rotor windings by directing the electrical energy captured from the power transfer signal to the one or more first rotor windings; and a rotor control unit configured to:

estimate, based on the power transfer signal received wirelessly from the stator, an operating state of the stator; and control switching operations of the active rectifier responsive to the estimated operating state.

47. An electric machine comprising:

a stator including stator windings configured to be energized to define stator poles;

a rotor including rotor windings configured to be energized to define rotor poles that interact with the stator poles to produce relative force between the rotor and the stator, the rotor configured to be magnetically coupled to the stator to receive a power transfer signal wirelessly from the stator;

an active rectifier rotationally fixed to the rotor and conductively coupled to one or more first rotor windings of the rotor windings, the active rectifier being configured to:

capture electrical energy from the power transfer signal, and control current flow through the one or more first rotor windings by directing the electrical energy captured from the power transfer signal to the one or more first rotor windings; and a low-pass filter conductively coupled to the active rectifier and to the one or more first rotor windings.

48. An electric machine comprising:

a stator including stator windings configured to be energized to define stator poles;

a rotor including rotor windings configured to be energized to define rotor poles that interact with the stator poles to produce relative force between the rotor and the stator, the rotor configured to be magnetically coupled to the stator to receive a power transfer signal wirelessly from the stator; and an active rectifier rotationally fixed to the rotor and conductively coupled to one or more first rotor windings of the rotor windings, the active rectifier being configured to:

capture electrical energy from the power transfer signal, and control current flow through the one or more first rotor windings by directing the electrical energy captured from the power transfer signal to the one or more first rotor windings, wherein the active rectifier is configured to produce a substantially DC current in a first subset of the rotor windings and a substantially oscillating current in a second, different subset of the rotor windings.

49. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings;

controlling, by the active rectifier, current flow through the one or more first rotor windings by directing the electrical energy captured from the power transfer signal to the one or more first rotor windings;

extracting, by a rotor control unit of the rotor, a data signal indicative of an operating setpoint for the rotor from the power transfer signal received wirelessly from the stator; and controlling, by the rotor control unit, switching operations of the active rectifier responsive to the operating setpoint.

50. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings;

controlling, by the active rectifier, current flow through the one or more first rotor windings by directing the electrical energy captured from the power transfer signal to the one or more first rotor windings; and filtering signals, by a low-pass filter, between the active rectifier and the one or more first rotor windings, where the low-pass filter is conductively coupled to the active rectifier and to the one or more first rotor windings.

51. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings;

controlling, by the active rectifier, current flow through the one or more first rotor windings by directing the electrical energy captured from the power transfer signal to the one or more first rotor windings; and introducing, by the active rectifier, a zero-sequence into a periodic voltage induced in the one or more first rotor windings by the stator windings.

52. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings;

controlling, by the active rectifier, current flow through the one or more first rotor windings by directing the electrical energy captured from the power transfer signal to the one or more first rotor windings; and causing, by the active rectifier, in the one or more first rotor windings, a periodic voltage shifted about 90 degrees compared to a corresponding periodic voltage in the stator windings.

53. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings; and controlling, by the active rectifier, current flow through the one or more first rotor windings by directing the electrical energy captured from the power transfer signal to the one or more first rotor windings, wherein the power transfer signal is received wirelessly by the rotor along a controllable axis on which the stator and rotor are magnetically coupled based on modulated amplitudes of magnetic fields of the stator, modulated frequencies of magnetic fields of the stator, or both.

54. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings;

controlling, by the active rectifier, current flow through the one or more first rotor windings by directing the electrical energy captured from the power transfer signal to the one or more first rotor windings; and producing, by the active rectifier, a substantially DC current in a first subset of the rotor windings and a substantially oscillating current in a second, different subset of the rotor windings.

55. A method of controlling a motor, the method comprising:

receiving, by a rotor, a power transfer signal wirelessly from a stator, the stator including stator windings configured to be energized to define stator poles and the rotor including rotor windings configured to be energized to define rotor poles that interact with the stator poles to produce relative force between the rotor and the stator;

capturing, by an active rectifier rotationally fixed to the rotor, electrical energy from the power transfer signal, wherein the active rectifier is conductively coupled to one or more first rotor windings of the rotor windings; and controlling, by the active rectifier, current flow through the one or more first rotor windings by directing the electrical energy captured from the power transfer signal to the one or more first rotor windings, wherein the active rectifier is controlled to apply low-pass filtering to voltages in the one or more first rotor windings.

\* \* \* \* \*